(12) United States Patent
Liu et al.

(10) Patent No.: US 11,841,822 B2
(45) Date of Patent: Dec. 12, 2023

(54) FRACTAL CALCULATING DEVICE AND METHOD, INTEGRATED CIRCUIT AND BOARD CARD

(71) Applicant: CAMBRICON TECHNOLOGIES CORPORATION LIMITED, Beijing (CN)

(72) Inventors: Shaoli Liu, Beijing (CN); Guang Jiang, Beijing (CN); Yongwei Zhao, Beijing (CN); Jun Liang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 60 days.

(21) Appl. No.: 17/560,490

(22) Filed: Dec. 23, 2021

(65) Prior Publication Data

US 2022/0114133 A1    Apr. 14, 2022

Related U.S. Application Data

(62) Division of application No. 17/606,838, filed as application No. PCT/CN2020/087043 on Apr. 26, 2020.

(30) Foreign Application Priority Data

| Apr. 27, 2019 | (CN) | 201910347027.0 |
| Jun. 21, 2019 | (CN) | 201910544723.0 |

(Continued)

(51) Int. Cl.
*G06F 15/76* (2006.01)
*G06F 9/38* (2018.01)

(52) U.S. Cl.
CPC .......... *G06F 15/76* (2013.01); *G06F 9/3818* (2013.01); *G06F 9/3836* (2013.01)

(58) Field of Classification Search
CPC ...... G06F 15/76; G06F 9/3818; G06F 9/3836; G06F 17/16; G06N 3/063
See application file for complete search history.

(56) References Cited

U.S. PATENT DOCUMENTS

| 3,343,135 A | 9/1967 | Freiman et al. |
| 5,421,029 A | 5/1995 | Yoshida |

(Continued)

FOREIGN PATENT DOCUMENTS

| CA | 1065492 A | 10/1979 |
| CA | 2053941 A1 | 9/1992 |

(Continued)

OTHER PUBLICATIONS

Chakraborty et al, "Layered fractal neural net: computational performance as a classifier" (Year: 1997).*

(Continued)

*Primary Examiner* — Farley Abad
(74) *Attorney, Agent, or Firm* — The PL Law Group, PLLC

(57) ABSTRACT

A fractal computing device according to an embodiment of the present application may be included in an integrated circuit device. The integrated circuit device includes a universal interconnect interface and other processing devices. The calculating device interacts with other processing devices to jointly complete a user specified calculation operation. The integrated circuit device may also include a storage device. The storage device is respectively connected with the calculating device and other processing devices and is used for data storage of the computing device and other processing devices.

10 Claims, 19 Drawing Sheets

(30) Foreign Application Priority Data

| Jun. 21, 2019 | (CN) | 201910544726.4 |
|---|---|---|
| Jun. 21, 2019 | (CN) | 201910545270.3 |
| Jun. 21, 2019 | (CN) | 201910545271.8 |
| Jun. 21, 2019 | (CN) | 201910545272.2 |

(56) References Cited

U.S. PATENT DOCUMENTS

| | | |
|---|---|---|
| 5,542,058 A | 7/1996 | Brown, III et al. |
| 5,542,059 A | 7/1996 | Blomgren |
| 5,748,978 A | 5/1998 | Narayan et al. |
| 5,768,437 A | 6/1998 | Monro et al. |
| 6,240,508 B1 | 5/2001 | Brown, III et al. |
| 6,460,068 B1 | 10/2002 | Novaes |
| 2001/0014940 A1 | 8/2001 | Munson |
| 2003/0101324 A1 | 5/2003 | Herr et al. |
| 2003/0110201 A1* | 6/2003 | Tanaka .................. G06F 9/3885 712/E9.071 |
| 2008/0091909 A1 | 4/2008 | Hwang |
| 2009/0055596 A1 | 2/2009 | Wallach |
| 2015/0212972 A1 | 7/2015 | Boettcher et al. |
| 2017/0168819 A1 | 6/2017 | Brown et al. |
| 2017/0347065 A1 | 11/2017 | Krishnan et al. |
| 2018/0329868 A1 | 11/2018 | Chen et al. |
| 2019/0042262 A1 | 2/2019 | Espig et al. |
| 2019/0073586 A1 | 3/2019 | Chen et al. |
| 2019/0073590 A1 | 3/2019 | Wu et al. |

FOREIGN PATENT DOCUMENTS

| | | |
|---|---|---|
| CN | 101021779 A | 8/2007 |
| CN | 105159903 A | 12/2015 |
| CN | 105630733 A | 6/2016 |
| CN | 105893319 A | 8/2016 |
| CN | 107861757 A | 3/2018 |
| CN | 108197705 A | 6/2018 |
| CN | 108363670 A | 8/2018 |
| CN | 108710943 A | 10/2018 |
| EP | 0 239 097 A2 | 9/1987 |
| EP | 1821199 A1 * | 8/2007 ............... G06F 1/32 |
| EP | 1821199 A1 | 8/2007 |
| GB | 2161001 A | 1/1986 |
| JP | H07-219769 A | 8/1995 |
| JP | H11-149561 A | 6/1999 |
| JP | 2001-014161 A | 1/2001 |
| WO | WO 91/11765 A1 | 8/1991 |
| WO | WO 01/23993 A1 | 4/2001 |
| WO | WO 2010/126025 A1 | 11/2010 |
| WO | WO 2017/185418 A1 | 11/2017 |

OTHER PUBLICATIONS

European Search Report For EP121216623.5 dated Apr. 21, 2022 from European patent office in a counterpart European patent application. (all the cited references are listed in this IDS).

European Search Report For EP 21216615.1, dated Jul. 12, 2022 from European patent office in a counterpart European patent application. (all the cited references are listed in this IDS).

Heemskerk Jan N.H et al, "MindShape: a neurocomputer concept based on a fractal architecture", Proceedings of the International Conference on Artificial Neural Networks, Sep. 4, 1992, p. 1483-1486.

* cited by examiner

| | DD | DMA | FFU | LFU | DMA | loop memory segment | | |
|---|---|---|---|---|---|---|---|---|
| | ID | LD | EX | RD | WB | 0 | 1 | 2 |
| T1 | ● | | | | | | | |
| T2 | ⊘ | ● | | | | DMA | | |
| T3 | ⊕ | ⊘ | ● | | | FFU | DMA | |
| T4 | ⊘ | ⊕ | ⊘ | ● | | LFU | FFU | DMA |
| T5 | | ⊘ | ⊕ | ⊘ | ● | DMA | LFU | FFU |
main body instruction 1 ●  main body instruction 2 ⊘  main body instruction 3 ⊕  main body instruction 4 ⊘
FIG. 9
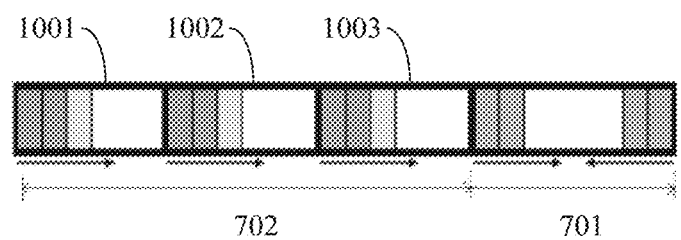
FIG. 10
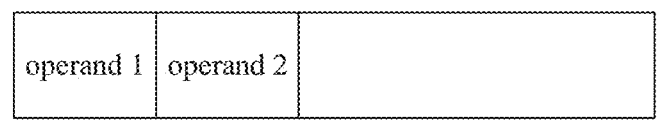
FIG. 11

FRACTAL CALCULATING DEVICE AND METHOD, INTEGRATED CIRCUIT AND BOARD CARD

CROSS REFERENCE TO RELATED APPLICATIONS AND CLAIM OF PRIORITY

This application is a divisional application of application Ser. No. 17/606,838, filed on Dec. 8, 2021, which is a National Stage entry from International Application No. PCT/CN2020/087043, filed Apr. 26, 2020, which claims priority to the benefit of Chinese Patent Application Nos. 201910544723.0 filed on Jun. 21, 2019, 201910544726.4 filed on Jun. 21, 2019, 201910545271.8 filed on Jun. 21, 2019, 201910545270.3 filed on Jun. 21, 2019, 201910545272.2 filed on Jun. 21, 2019 and 201910347027.0 filed on Apr. 27, 2019 in the Chinese Intellectual Property Office, the entire contents of which are incorporated herein by reference.

BACKGROUND

1. Technical Field

The present disclosure generally relates to the neural network filed, and more particularly to a fractal calculating device, a method, an integrated circuit, and a board card.

2. Background Art

Machine learning technology has been widely used in emerging businesses, such as image recognition, text recognition, speech recognition, facial recognition, video analysis, advertising recommendation, and games. In recent years, many dedicated machine learning calculating devices of different sizes have been deployed in various embedded devices, servers, and data centers. People's daily life has already become inseparable from machine learning technology.

Most machine learning calculating devices has been focusing on performance optimization. Between 2012 and 2018 alone, the power efficiency of machine learning calculating devices has increased by more than 1,200 times. Although the energy efficiency of machine learning calculating devices has been increasing rapidly, the limited development of programming efficiency has hindered the popularization of machine learning technology. Even though existing calculating devices have high peak performance, simplified hardware control management and software stacks are still crucial to the actual performance of machine learning calculating devices. In addition, the characteristics of existing machine learning calculating devices including heterogeneity, parallelism, and hierarchy also affect the programming efficiency.

Therefore, a machine learning calculating device with a homogeneous and serial hierarchical structure and with a same instruction set is urgently needed.

SUMMARY

In order to at least partially solve the technical problems mentioned in the background art, the solution of the present disclosure provides a fractal calculating device, a method, an integrated circuit, and a board card.

A first aspect of the present disclosure provides a fractal calculating device. The device includes a plurality of layers of calculation units. Each layer of calculation units may include a functional unit and a memory. The functional unit is configured to perform tasks. The memory is configured to store data related to the tasks.

A second aspect of the present disclosure provides a calculation unit that calculates data according to an input instruction. The calculation unit is divided into a pipeline with M stages, including a serial decomposer and a local memory. The serial decomposer is configured to decompose the input instruction into N serial instructions, and generate intermediate data that reflects the dependency relationship of the N serial instructions. The local memory includes a static memory segment and a loop memory segment. The static memory segment is configured to store the intermediate data, and the loop memory segment is configured to store sub-data required to execute the N serial instructions. The sub-data is for calculating data generated in each stage in the pipeline with M stages. The sub-data is a part of the data.

A third aspect of the present disclosure provides a fractal calculating device configured to calculate data according to an input instruction. The device includes a plurality of layers of calculation units. Each layer of calculation units may include an instruction decoding unit, a data loading unit, an operation execution unit, an operation reduction unit, and a data writing back unit. The instruction decoding unit is configured to decode the input instruction into local instructions, fractal instructions, and direct memory access instructions. The data loading unit is configured to load sub-data of the data from a memory of an upper layer to the local memory according to the direct memory access instruction. The operation execution unit is configured to execute a task corresponding to the sub-data according to the fractal instruction to generate a calculation result. The operation reduction unit is configured to reduce the calculation result according to the local instruction. The data writing back unit is configured to write the reduced calculation result back to the memory of the upper layer.

A fourth aspect of the present disclosure provides a fractal calculating device. The device includes a plurality of layers of calculation units. Each layer of calculation units may include a serial decomposing unit, an instruction decoding unit, and an operation execution unit. The serial decomposing unit is configured to receive an upper layer of fractal instruction from an upper layer of calculation units, and decompose the upper layer of fractal instruction into a plurality of serial sub-instructions. The instruction decoding unit is configured to decode the plurality of serial sub-instructions into local fractal instructions according to the hardware resources of the calculation units. The operation execution unit is configured to issue the local fractal instructions to a lower layer of calculation units to generate a calculation result.

A fifth aspect of the present disclosure provides a fractal calculating method. The method includes: responding to an upper layer of fractal instruction from an upper layer of calculation units, and decomposing the upper layer of fractal instruction into a plurality of serial sub-instructions; decoding the plurality of serial sub-instructions into local fractal instructions according to the hardware resources of the calculation unit; and issuing the local fractal instructions to a lower layer of calculation units to generate a calculation result.

A sixth aspect of the present disclosure provides a method for performing neural network calculations on input data according to an instruction. The method includes: dividing the instruction into a plurality of fractal instructions; dividing the input data into a plurality of pieces of fractal data, where each fractal data corresponds to a fractal instruction;

providing a plurality of local instructions of a fractal reconfigurable instruction set; decomposing each fractal instruction into an ordered set, where the ordered set is formed by sequentially arranging at least one of the plurality of local instructions; executing the local instructions in the ordered set of corresponding fractal instructions on the fractal data to generate intermediate data; and reducing the intermediate data to complete the neural network calculations.

An eighth aspect of the present disclosure provides a fractal calculating device configured to perform operation according to an instruction. The device includes a plurality of middle-layer of calculation units and a leaf calculation unit. Each middle-layer calculation unit includes: a controller configured to decompose the instruction into a plurality of fractal instructions, where each fractal instruction performs a specific operation; and a plurality of fractal functional units, each of which sends one of the plurality of fractal instructions respectively to a middle-layer calculation unit of a next layer. The leaf calculation unit includes: a controller configured to decompose the fractal instructions into local instructions; and a functional unit configured to execute the local instructions.

A ninth aspect of the present disclosure provides a calculating device. The device includes: at least two layers of calculating nodes, where each calculating node includes a memory component, a processor, and a next layer of calculating node. The processor in any calculating node is configured to decompose an input instruction of the any calculating node to obtain parallel sub-instructions, and send the parallel sub-instructions to a calculating node at a next layer of the any calculating node. The any calculating node is further configured to load operands required for executing the parallel sub-instructions from the memory component of a calculating node at a previous layer to the memory component of the any calculating node, so that the calculating node at the next layer of the any calculating node can perform the parallel sub-instructions according to the operands.

A tenth aspect of the present disclosure provides a method for obtaining an operand. The method includes: looking up in a data address information table whether an operand has been stored in a local memory component; if the operand has been stored in the local memory component, determining a storage address in the local memory component where the operand is stored according to a storage address in an external storage space where the operand is stored and the data address information table; and assigning the storage address of the operand in the local memory component to an instruction that is configured to obtain the operand.

An eleventh aspect of the present disclosure provides a calculating device. The calculating device includes: a plurality layers of calculating nodes. Each calculating node includes a local memory component, a processor, and a next layer of calculating node. When the processor needs to load an operand from the memory component of a previous-layer calculating node of a current calculating node to the local memory component, the processor needs to look up in a data address information table whether the operand is already stored in the local memory component; if the operand is already stored in the local memory component, the processor determines a storage address in the local memory component where the operand is stored according to a storage address in an external storage space where the operand is stored and the data address information table, and assigns the storage address of the operand in the local memory component to an instruction that is configured to obtain the operand.

A twelfth aspect of the present disclosure provides a calculating device. The calculating device includes a plurality layers of calculating nodes. Each calculating node includes a local memory component, a processor, a next layer of calculating node, and a memory controller. The processor is connected to the next layer of calculating node and the memory controller. The processor is configured to receive an input instruction, decompose the input instruction to obtain a plurality of sub-instructions, and send the plurality of sub-instructions to the next layer of calculating node. The memory controller is configured to load a second operand of a first operand corresponding to the plurality of sub-instructions from the memory component of a previous-layer calculating node of a random calculating node to the local memory component. The next layer of calculating node is configured to execute the plurality of sub-instructions according to operators of the plurality of sub-instructions and second operands of the plurality of sub-instructions. The input instruction and the plurality of sub-instructions have the same format.

A thirteenth aspect of the present disclosure provides an integrated circuit device. The device includes the aforementioned fractal calculating device and a board card including the aforementioned integrated circuit device.

The hierarchical structure of the calculating device is constructed based on a multi-layer iteration approach. The structure of each calculating node of the calculating device is the same. The calculating nodes of different layers and computers of different sizes have the same programming interface and instruction set architecture so that they are able to execute a program of the same format. Implicitly data loading between layers saves users from the need to manage memory space, simplifies the complexity of user programming, and makes it easy to expand the calculating device or the port programs between different calculating devices.

This disclosure provides a series of homogeneous, sequential, multi-layer, and layer-similar machine learning calculating technology solutions that can be driven by the same instruction set, which are simply in control and highly efficient.

BRIEF DESCRIPTION OF THE DRAWINGS

By reading the following detailed description with reference to the accompanying drawings, the above-mentioned and other objects, features and technical effects of the exemplary embodiments of the present disclosure will become easier to understand. In the accompanying drawings, several embodiments of the present disclosure are shown in an exemplary but not restrictive manner, and the same or corresponding reference numerals indicate the same or corresponding parts of the embodiments.

FIG. 9 is a schematic diagram of a pipeline according to another embodiment of the present disclosure;

FIG. 10 is a schematic diagram showing the division of memory components according to another embodiment of the present disclosure;

FIG. 11 is a schematic diagram of a static memory segment according to another embodiment of the present disclosure:

DETAILED DESCRIPTION

Technical solutions in examples of the present disclosure will be described clearly and completely hereinafter with reference to the accompanied drawings in the examples of the present disclosure. Obviously, the examples to be described are merely some rather than all examples of the present disclosure. All other examples obtained by those skilled in the art based on the embodiments of the present disclosure without creative efforts shall fall within the protection scope of the present disclosure.

It should be understood that terms such as "first", "second", "third", and "fourth" in the claims, the specification, and drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

As being used in this specification and the claims, the term "if" can be interpreted as "when", or "once", or "in response to a determination" or "in response to a case where something is detected" depending on the context.

The specific embodiments of the present disclosure are described in details below in reference to the drawings.

This disclosure proposes a new framework for a machine learning calculating device, which has technical effects of easy to program and high-efficiency operation. This framework organizes various components of the calculating device in a fractal manner. "Fractal" was originally a geometric term which refers to the morphological features that space is filled in a non-integer dimensional manner. It is usually defined as a fragmented geometric shape that can be divided into several parts, each of which is or at least approximates a reduced-size copy of the whole; in other words, the shape has a self-similar property. The term fractal in the computer field refers to the iterative decomposition of the machine. The decomposition has a self-similar pattern of any scale.

Figure 1:
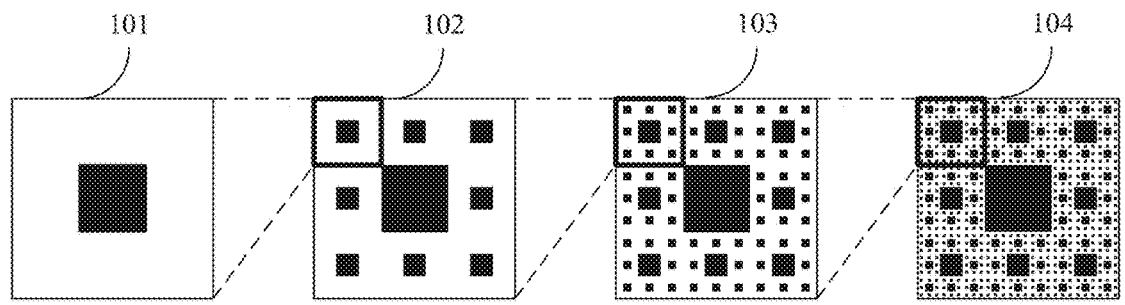
FIG. 1 is a structural diagram of a fractal calculating device.

FIG. 1 is a structural diagram of a fractal calculating device. A calculating device 101, a calculating device 102, a calculating device 103, and a calculating device 104 are all calculation units of different sizes. The calculating device 101 is a fractal unit of the calculating device 102; in other words, the calculating device 102 is mainly made of the calculating devices 101. The calculating device 102 is a fractal unit of the calculating device 103, and the calculating device 103 is a fractal unit of the calculating device 104. It can be understood that the calculating device 104 has the most calculation units. Therefore, the calculating device 104 has the strongest calculating power. Conversely, the calculating device 101 has the weakest calculating power. According to their computing power, these calculating devices are suitable for different solutions of different scales. For example, the calculating device 101 can be applied to a single-core accelerator, the calculating device 102 can be applied to a multi-core chip, the calculating device 103 can be applied to a multi-chip server, and the calculating device 104 can be applied to a multiple-server system. Since this kind of fractal calculating device has the same fractal unit, the highly repetitive structure makes it very easy to control the calculating device.

The technical solution of the present disclosure is a series of isomorphic, serial, multi-layer, and layer-similar machine learning calculating devices that can be driven by a same instruction set. It has a fractal von Neumann architecture to iteratively manage the calculation units of each layer. The calculation units of each layer are also machines driven by the same instruction set and have the von Neumann architecture. The machine learning calculating device of the present disclosure supports fractal computation. A parent node (or called upper calculation unit, upper calculating node) can iteratively decompose an instruction into instructions on child nodes (or called lower calculation unit, lower calculating node). The count of layers directly correlates to the computing scale. Machine learning calculating devices of different computing scales can be used in different scenarios such as embedded systems, desktop computers, data centers, and super computing devices. Therefore, by merely designing a set of instructions for controlling a top layer of calculation units, developers can drive devices of different sizes with easy expansion.

Machine learning is a computational and memory-intensive technology, which is highly parallel at different levels. The present disclosure decomposes machine learning into a variety of operations based on matrices and vectors. For example, a vector-multiplying-matrix operation and a matrix-multiplying-vector operation are aggregated into matrix multiplication operations; a matrix-adding/subtracting-matrix operation, a matrix-multiplying-scalar operation, and a vector elementary arithmetic operations, etc., are aggregated as element-wise operations. Through the decomposition and aggregation of machine learning, the present disclosure proposes seven main computational primitives:

| | | |
|---|---|---|
| inner product | convolution | pooling |
| matrix multiplication | element-wise | sort |
| count | | |

The above computational primitives summarize the main features of machine learning; in other words, the calculation of machine learning can basically be realized by using a combination of these computational primitives, and all of these computational primitives can be computed in a fractal manner.

If an expression f(x) satisfies the following conditions, it can be called a fractal operation.

$$f(X) = g(f(X_A), f(X_B), \ldots)$$

f(•) denotes a target operator; g(•) denotes a retrieving operator, X denotes all operands of f(•), which can be tensor data; and $X_A$, $X_B$, ... denote subsets of operand X.

Based on the relationship between the fractal operands $X_A$, $X_B$, ... and X, fractal operations can be divided into three categories: independent operation, input-dependent operation, and output-dependent operation.

The independent operation means that the fractal operands $X_A$, $X_B$, ... are independent of each other and do not overlap. Each subset can be computed independently, and a final computation result can be obtained by combining partial computation results of the subsets. A vector addition operation is taken as an example to explain the independent operation. It may be supposed that the following formula is to be operated:

$$\vec{Z} = \vec{X} + \vec{Y}$$

Since $\vec{X}$, $\vec{Y}$ can be divided into two independent subsets $[\overrightarrow{X_A}, \overrightarrow{X_B}]$ and $[\overrightarrow{Y_A}, \overrightarrow{Y_B}]$, the aforementioned formula can be deduced as:

$$\vec{Z} = \vec{X} + \vec{Y}$$
$$= (\overrightarrow{X_A} + \overrightarrow{X_B}) + (\overrightarrow{Y_A} + \overrightarrow{Y_B})$$
$$= (\overrightarrow{X_A} + \overrightarrow{Y_A}) + (\overrightarrow{X_B} + \overrightarrow{Y_B})$$
$$= \overrightarrow{Z_A} + \overrightarrow{Z_B}$$

In other words, two subsets can independently complete a local vector addition operation, for example, $\overrightarrow{Z_A} = \overrightarrow{X_A} + \overrightarrow{Y_A}$ and $\overrightarrow{Z_B} = \overrightarrow{X_B} + \overrightarrow{Y_B}$. A final calculation result can be obtained by merely merging results of local operations. In other words, $\vec{Z}$ can also be divided into an independent subset $[\overrightarrow{Z_A}, \overrightarrow{Z_B}]$.

Input dependent operation means that $X_A$, $X_B$, etc., overlap at least partially, and each subset requires some extra copies of input to perform a complete operation, which leads to data redundancy in fractal operations. The so-called data redundancy refers to same data being used repeatedly in the system. For example, when one-dimensional convolution is to be performed, similarly, $\vec{X}$, $\vec{Y}$ is used to represent two operands, where $\vec{X} = [\overrightarrow{X_A}, \overrightarrow{X_B}]$. The operation is divided into two parts, ach part works on an independent part of output, which is $\vec{Z} = [\overrightarrow{Z_A}, \overrightarrow{Z_B}] = \vec{X} * \vec{Y} = [\overrightarrow{X_A}, \overrightarrow{X_B}] * \vec{Y}$. However, based on the characteristics of convolution, since the input of the two operations overlaps, an additional part of $\overrightarrow{X_A}$, $\overrightarrow{X_B}$ (i.e. $\overrightarrow{X_a}$, $\overrightarrow{X_b}$ is required to be computed with the other fractal part, for example, $\overrightarrow{Z_A} = [\overrightarrow{X_A}, \overrightarrow{X_b}] * \vec{Y}$ and $\overrightarrow{Z_B} = [\overrightarrow{X_a}, \overrightarrow{X_B}] * \vec{Y}$. Operands at the input end $\vec{X}$ cannot be fractal independently and are dependent on each other.

The output-dependent operation means that after each fractal unit generates a calculation result, the result needs to be reduced to obtain the final result. Reduction refers to a process of calculating according to certain characteristics of data to reduce the data calculation scale, which is based on the understanding of the content of the data. Reduction is to reduce the data size as far as possible while trying to keep the original appearance of the data, and then to restore or integrate the calculation result based on the characteristics.

For example, when an inner product operation $Z = \vec{X} \cdot \vec{Y}$ is to be divided into smaller units, each calculation unit performs part of the inner product operation, such as $Z_A = \overrightarrow{X_A} \cdot \overrightarrow{Y_A}$ and $Z_B = \overrightarrow{X_B} \cdot \overrightarrow{Y_B}$, but to obtain the final result, these calculation results must be reduced, and the calculation results are mutually dependent during reduction.

The computational primitives may lead to different dependencies according to different decomposition methods, which is as shown in Table 1.

TABLE 1

| Computational primitive analysis | | | | |
|---|---|---|---|---|
| Computational primitive | Decomposition manner | Output dependency | g(·) | Data redundancy |
| inner product | by length | output dependency | add | |
| convolution | by feature | output dependency | add | |

TABLE 1-continued

Computational primitive analysis

| Computational primitive | Decomposition manner | Output dependency | g(·) | Data redundancy |
|---|---|---|---|---|
| convolution | by batch | input dependency | | weight |
| convolution | space | input dependency | | weight, overlap |
| pooling | by feature | dependent | | |
| pooling | space | input dependency | | overlap |
| matrix multiplication | left, vertical | output dependency | add | |
| maxtrix multiplication | right, vertical | input dependency | | left matrix |
| element-wise operation | random | dependent | | |
| sort | random | output dependency | merge | |
| count | random | output dependency | add | |

The length in the decomposition method of the inner product may refer to the decomposition in the length direction of the vector. The operand of the convolution operation can be tensor data represented by NHWC (batch, height, width, channel), and decomposition in the feature direction can refer to decomposition in the C dimension direction. The pooling operation also has the same meaning for the decomposition of the operand in the feature direction. The convolution operation has input dependency in the N-dimensional direction decomposition, and the input redundancy is the weight, which is the convolution kernel. There is also input dependency in the spatial decomposition. The input redundancy includes the overlap between the two tensor data after decomposition in addition to the weight. In the decomposition method of matrix multiplication, the "left" or "right" refers to the decomposition of the left operand or the right operand of the matrix multiplication, and the "vertical" refers to the decomposition in the vertical direction of the matrix. "Element-wise operation" is independent of any decomposition of operands. "Sort" and "count" operations have output dependency on any decomposition of operands.

For example, since the convolution operation can be divided based on the input feature map in the channel dimension and the final output depends on the result of each part, the convolution operation belongs to the output-dependent operation; or for the convolution operation, the input feature map can be obtained by dividing according to the height or width, each part of the output result requires input that overlaps other input to some extent, so the convolution operation is an output-dependent operation. Obviously, the independent operation can easily be mapped to the fractal architecture and fractal computation shown in FIG. 1. The input-dependent operation needs to be converted to an independent operation with input redundancy, which can also be regarded as being independent in principle, while the output-dependent operation requires a reduction procedure.

In Table 1, the present disclosure analyzes the decomposition of computational primitives in the manner of fractals, which shows that it is completely feasible to perform machine learning computations in the manner of fractals. However, the following challenges exist in the designing of the fractal architecture. The present disclosure provides effective solutions for the following topics.

Reduction Operation

The reduction operation g(•), which is an output-dependent operation, is not suitable for the fractal architecture like the independent operation and the input-dependent operation. In order to effectively process g(•), the present disclosure introduces a local calculation unit to each node. The data in the fractal calculation unit of each layer is iteratively aggregated into the local calculation unit of the upper layer, and is effectively reduced by the upper layer of calculation units.

Data Redundancy

In a fractal operation, an input-dependent operation is converted into an independent operation with data redundancy. For this reason, the memory of the calculating device of the present disclosure is organized in divisions, and any part of the memory can be accessed in different time sequences to obtain data.

Communication

Communication between different nodes requires a large number of wiring connections, which leads to excessive chip area and may cause problems of delays and energy consumption. For this reason, according to the solution of the present disclosure, even for an output-dependent operation, it is only required to transfer data from the lower layer of calculation units to the upper layer of calculation units for reduction. Therefore, the calculating device of the present disclosure does not need to communicate between any pair of nodes. Instead, the machine learning computations are stacked in a fractal form, and the signal transmission is limited to the upper and lower layers, thereby simplifying the layout of the circuit.

An embodiment of the present disclosure is a calculating device with calculation units that have a parent-child connection relationship. A calculation unit (parent node) at a highest-level (level 0) decodes and sends an instruction to fractal functional units (child node). Each fractal functional unit repeats the decoding and sending process until the process proceeds to a leaf calculation unit. The leaf calculation unit returns a calculation result to its parent node, and this operation is repeated until the operation proceeds to the highest level calculation unit (parent node).

This embodiment provides a calculating device including multiple layers of calculation units. Each calculation unit includes a controller, an adopted memory component, and a fractal functional unit.

Figure 2:
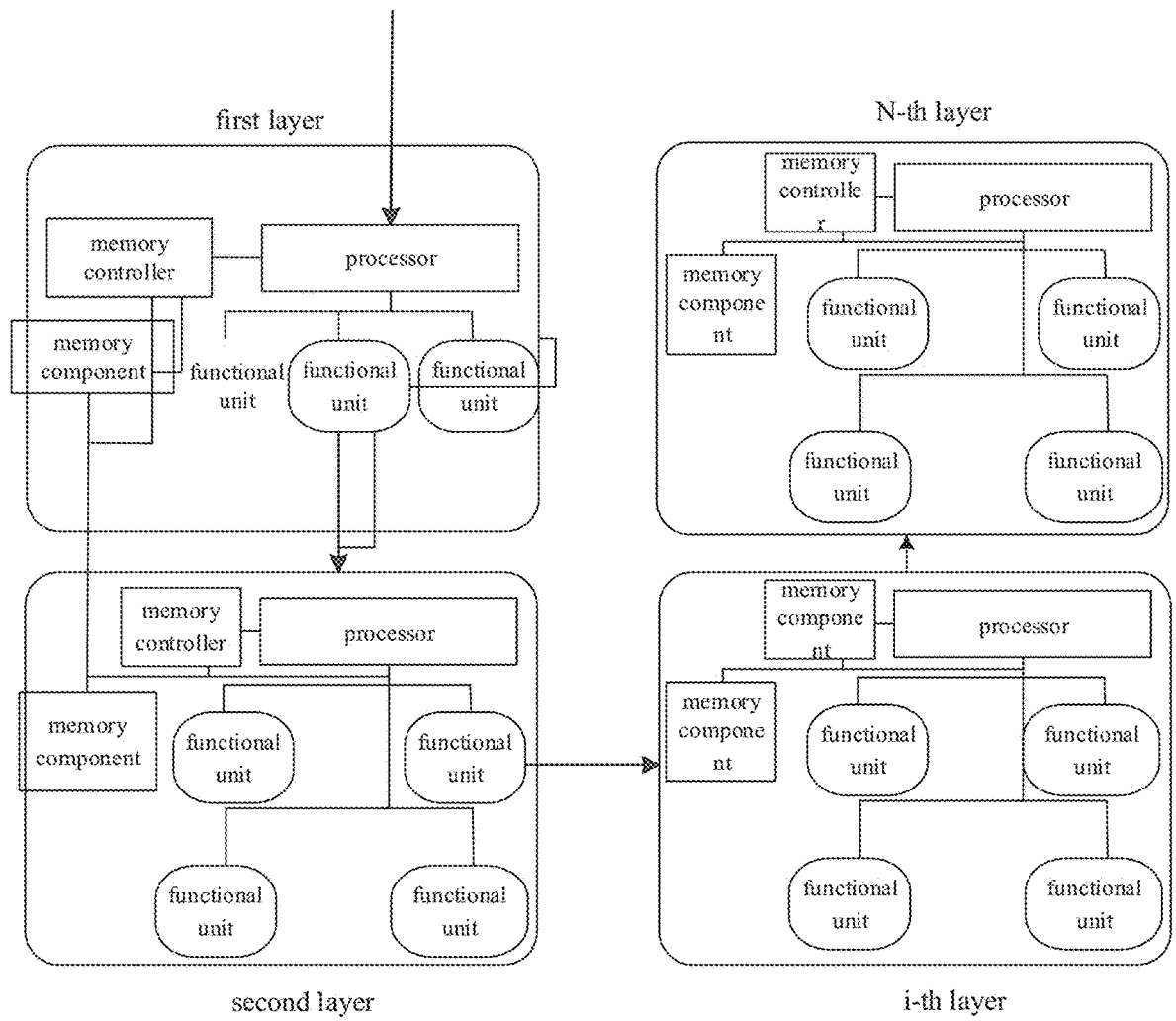
FIG. 2 is a block diagram of a calculating device according to an embodiment of the present disclosure.

FIG. 2 shows a block diagram of the calculating device of this embodiment. As shown in FIG. 2, a first layer of the calculating device may be a calculation unit which may include a controller, a memory component, and a functional unit. The functional unit is a calculation unit of a next layer (second layer). There may be a plurality of calculation units at the second layer, and the specific count of units is not limited in the present disclosure. As shown in FIG. 2, the second layer of calculation units may also include: a controller, a memory component, and a next layer (third layer) of calculation units. Similarly, an i-th layer of calculation units may include: a controller, a memory component, and an i+1-th layer of calculation units, where i is a natural number.

The controller can be realized in a form of hardware, such as a digital circuit, an analog circuit, etc. The physical realization of the hardware structure includes but is not limited to a transistor, a memristor, etc., and the controller can also be realized in a form of software, which is not limited by the present disclosure. The memory component may be a random access memory (RAM), a read-only memory (ROM), a cache (Cache), or the like. The specific form of the memory component is not limited by the present disclosure.

It should be noted that although FIG. 2 only shows an expanded structure of a functional unit in the second layer of calculation units included in the first layer of calculation units (the second layer shown in FIG. 2), it can be understood that FIG. 2 is only a schematic diagram. The expanded structure of another second layer of calculation units may also include a controller, a memory component, and a third layer of calculation units. For simplicity, the expanded structure of other second layers of calculation units is not shown in FIG. 1, the expanded structure of the i-th layer of calculation units is also not shown. Different i-th layers of calculation units may include different or the same count of i+1-th layers of calculation units, which is not limited in the present disclosure.

Figure 3:
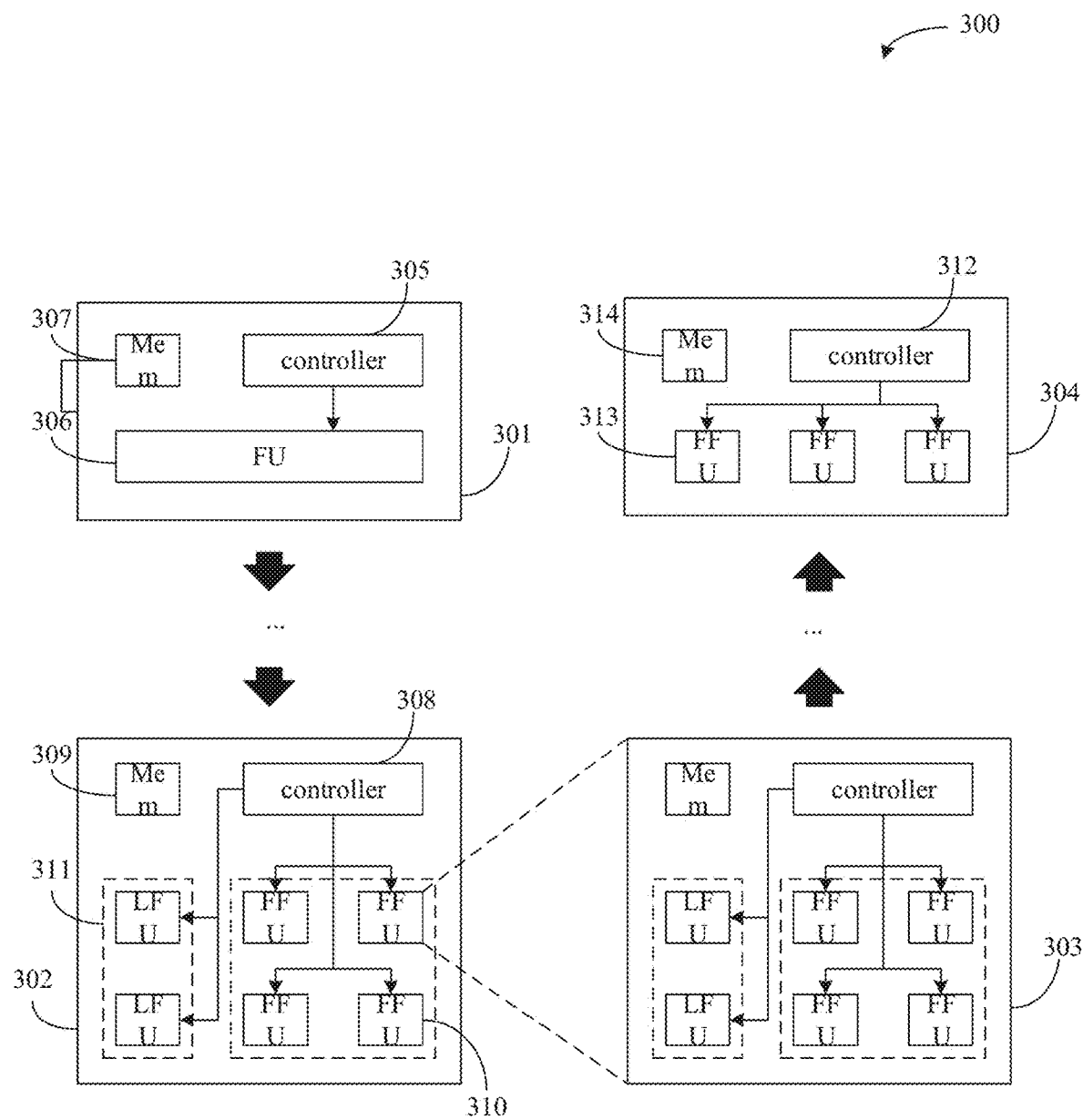
FIG. 3 is a block diagram of a fractal calculating device according to another embodiment of the present disclosure.

Another embodiment of the present disclosure provides another fractal calculating device. A framework of the device is shown in FIG. 3. This fractal calculating device 300 includes a plurality of layers of calculation units, such as a root calculation unit 301, an i-th layer of calculation units 302, an i+1-th layer of calculation units 303, and a leaf calculation unit 304. The root calculation unit 301 is a topmost layer, or can be called the 0-th layer of calculation units. There are a plurality of middle-layer of calculation units under the root calculation unit 301, and these middle-layer of calculation units have the same structure. In FIG. 3, the i-th layer of calculation units 302 and the i+1th layer of calculation units 303 are taken as an example. The leaf calculation unit 304 is a unit in the lowest layer that is specifically configured to perform calculations.

Each layer of calculation units may include a controller, a functional unit and a memory. The controller receives a task sent from an upper layer, assigns the task or decomposes the task into sub-tasks, and then sends the same to the functional unit. The functional unit executes the assigned task. The memory stores data related to these tasks.

The root calculation unit 301 includes a controller 305, a functional unit (FU) 306, and a memory 307. The root calculation unit 301, as the topmost calculation unit, mainly receives a complete calculation instruction, such as a task of performing matrix multiplication. The matrix multiplication instruction and matrix data are stored in the memory 307. According to the calculation instruction, the controller 305 receives the corresponding task, and sends a local instruction to control the functional unit 306 to execute the task, and then the functional unit 306 performs the calculation. In more detail, the functional unit 306 only issues tasks to the middle-layer of calculation units and does not perform specific calculations.

As mentioned above, the middle-layer of calculation units are formed by stacking a plurality of layers of calculation units with the same structure. In the present disclosure, an i-th layer of calculation units 302 is used as an example for illustration. The i-th layer of calculation units 302 may include a controller 308, a memory 309, an FFU (fractal functional unit) 310 and an LFU (local functional unit) 311.

The controller 308 is configured to receive tasks from an upper layer to generate a fractal instruction and a local instruction. In more detail, based on the number of fractal functional unit 310 in a same layer, the controller 308 determines a method and the number of fractal tasks to form sub-tasks, so that each fractal functional unit 310 corresponds to a sub-task, and the controller 308 loads the information to the fractal instruction, and then based on the method and the number of fractal tasks, determines a reduction method, for example, a local task, and finally, the controller 308 loads the reduction information into the local instruction.

The i-th layer of calculation units 302 exemplarily includes four fractal functional units 310. It should be noted that the present disclosure does not limit the number of fractal functional units. Each fractal functional unit 310 receives the fractal instruction sent by the controller 308, and issues a corresponding sub-task according to the received fractal instruction. For the i-th layer of calculation units 302, the fractal functional unit 310 does not perform a specific calculation, but sends a sub-task to an i+1-th layer of calculation units 303. At the same time, the controller of the i+1-th layer of calculation units 303 copies the data required to execute the task from the memory 309 to the memory of the i+1-th layer of calculation units 303.

The i-th layer of fractal calculation unit 302 exemplarily includes two local functional units 311. It should be noted that the present disclosure does not limit the number of local functional units. A local functional unit 311 receives a local instruction from the controller 308 and executes a local task according to the local instruction. The local task includes reduction of all calculation results returned to the fractal functional unit 310.

The memory 309 is configured to store data required to perform sub-tasks.

As shown in FIG. 3, each fractal functional unit 310 is actually a fractal calculation unit of the next layer. After the sub-task of the fractal functional unit 310 of the fractal calculation unit 302 in the i-th layer is distributed to the i+1-th layer of fractal calculation unit 303, the sub-task of the i-th layer of fractal calculation unit 302 is the task of the i+1-th layer of fractal calculation unit 303; based on the aforementioned operation, the i+1-th layer of fractal calculation unit 303 further divides and distributes the task to the next layer of the fractal calculating device until the lowest layer of the fractal calculating device, for example, a leaf calculation unit 304.

The leaf calculation unit 304 also includes a controller 312, a functional unit 313, and a memory 314. The controller 312 generates a fractal instruction according to the received task. Different from the middle layer calculation unit, the functional unit 313 has only a fractal functional unit, which is an accelerator, and the functional unit 313 calculates a sub-task according to the fractal instruction. The leaf calculation unit 304 exemplarily includes three fractal functional units 313. It should be noted that the present disclosure does not limit the number of functional units 313. Taking the aforementioned matrix multiplication as an example, a task of the matrix multiplication is continuously decomposed into a plurality of sub-tasks by each layer. After the sub-tasks reach the leaf calculation unit 304, the functional unit 313 performs a calculation to obtain a calculation result, which is temporarily stored in the memory 314, and the controller 312 returns the calculation result to the calculation unit in an upper layer.

Similarly, the i-th layer of calculation units 302 are used for explanation. The i-th layer of calculation units 302 receive the calculation results of all the fractal functional units 310 and store the results into the memory 309. The local functional unit 311 executes the local task; in other words, the local functional unit 311 reduces the calculation result of the i-th layer. The controller 308 sends the reduced calculation result to the upper layer until a root calculation unit 301 at the top layer to complete the calculation task.

It can be seen from the foregoing that the fractal calculating device 300 of this embodiment has a plurality of layers of calculation units, and the task is split into sub-tasks according to the number of fractal functional units in a same layer; and then the sub-tasks are sent to the next layer and further split until the sub-tasks reach the leaf calculation unit. After the leaf calculation unit executes the calculation, the calculation result is sent back to the upper layer, and the local functional unit of the upper layer performs a reduction operation, and then the reduced calculation result is sent to the upper layer until the root calculation unit to complete the calculation. In other words, the middle layer calculation unit executes the fractal operation and sends the task, reduces the calculation result and uploads the result, and the leaf calculation unit is responsible for specific calculating tasks.

The input instruction received by the root calculation unit 301 may include: an operator and an operand parameter, where the operand parameter is a parameter pointing to the operand of the input instruction, the operand parameter includes global parameters and local parameters, where a global parameter is a parameter indicating the size of the first operand corresponding to the input instruction, and a local parameter is a parameter indicating the starting position of a second operand of the input instruction in the first operand and the size of the second operand. In other words, the second operand can be part or all of the data in the first operand. The processing of the second operand can be realized when the input instruction is executed, and the processing of the second operand is the processing corresponding to the operator of the input instruction.

In the foregoing embodiments, since the structure of each layer of the calculation units is the same, the calculation units can be driven by a same instruction set architecture, which makes it very easy to control the fractal calculating device of the present disclosure. This kind of instruction set is called a fractal instruction set architecture (FISA). The instruction I of the fractal instruction set consists of a triple <O, P, g>, where O represents a specific operation. P is a limited set of operands, and g is a granularity indicator. If and only if the instruction I<O, P, g> has a set of indicators $g_1', g_2', g_3', \ldots$, so that I<O, P, g> can be obtained by computing $I_1'(g_1'), I_2'(g_2'), I_3'(g_3') \ldots$ and other FISA instructions iterations. I<O, P, g> is the fractal instruction. Table 2 shows the fractal instruction set used in the fractal calculating device of the present disclosure.

TABLE 2

Fractal Instruction Set

| Type | Operation | Name |
|---|---|---|
| deep learning | convolution | Cv2D, Cv3D |
|  | pooling | Max2D, Min2D, Avg2D |
|  | local response normalization | Lrn |
| linear algebra | matrix multiplication | MatMul |
|  | Euclidean distance | Euclidian1D |
| sort | merge sort | Sort1D |
| count | count | Count1D |
| reduction | binary element-wise operation | Add1D, Sub1D, Mul1D |
|  | unitary element-wise operation | Act1D |
|  | horizontal | HSum1D, HProd1D |
|  | merge | Merge1D |

For example, it is supposed that the instruction received by the i-th layer of calculation units is C="ADD, A[N][0][N]. B[N][0][N]", where "ADD" represents an operator. A[N][0][N] and B[N][0][N] are operands and operand parameters, the first N represents the size of operands A and B. "0" represents the starting position when performing an addition operation on operands A and B. and the second N represents the size of the operand performing the addition operation. Executing the above instructions can realize the addition of operands A and B.

In some embodiments, any calculating node can decompose the input instruction to obtain a plurality of sub-instructions. The input instruction and the plurality of sub-instructions have the same format, and at least part of the operators of the sub-instructions are the same as the operator of the input instruction.

In some embodiments, after any calculating node receives the input instruction, it can decompose the input instruction according to the number of the calculating nodes in a next layer to obtain a plurality of parallel sub-instructions. Executing a parallel sub-instruction can complete an operation of part of the operand of the operands corresponding to the input instruction, and executing all the parallel sub-instructions can complete an operation corresponding to the input instruction.

The i-th layer calculating node can decompose the received input instruction according to the number of the i+1-th layer calculating node to obtain a plurality of parallel sub-instructions. It is supposed that the i-th layer calculating node includes three calculating nodes in the i+1-th layer, and the above input instruction can be decomposed into at least three parallel sub-instructions:

$$C1 = \text{``ADD}, A[N][0][N/3], B[N][0][N/3]\text{''},$$

$$C2 = \text{``ADD}, A[N][(N/3)+1][N/3], B[N][(N/3)+1][N/3]\text{''},$$

$$C3 = \text{``ADD}, A[N][(2N/3)+1][N/3], B[N][(2N/3)+1][N/3]\text{''},$$

where C1, C2, and C3 have the same format as C, and they are all addition operations.

The i-th layer calculating node may send the decomposed parallel sub-instructions to the i+1-th layer calculating node; and the next layer calculating node may receive the parallel sub-instructions C1. C2, and C3, and perform similar decomposition until the sub-instructions reach the leaf calculating node.

Figure 4:
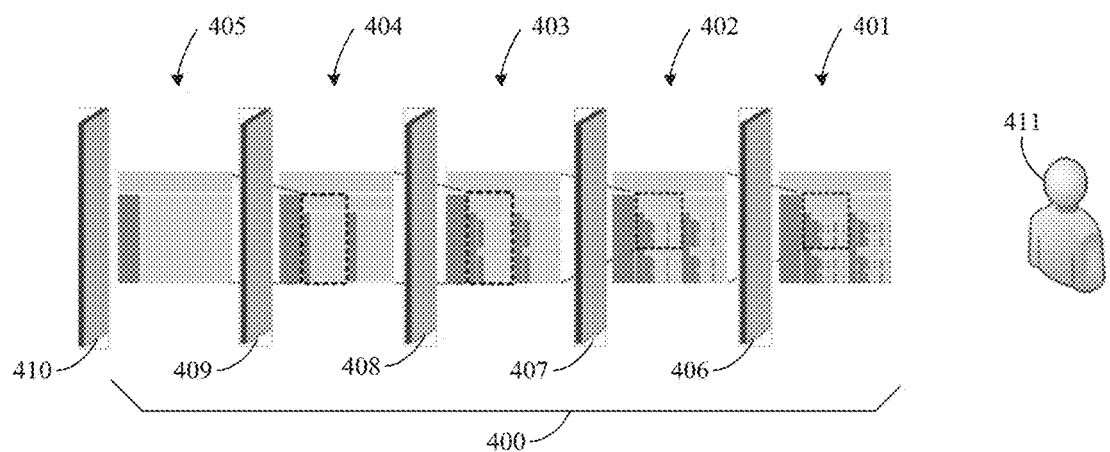
FIG. 4 is a block diagram of a fractal calculating device according to another embodiment of the present disclosure.

The present disclosure provides a fractal calculating device through the foregoing embodiments, combined with a fractal instruction set, which makes it easy to drive a chip including this type of fractal calculating device. FIG. 4 is a block diagram of a fractal calculating device according to another embodiment of the present disclosure. The fractal calculating device 400 includes multi-layer calculation units 401, 402, 403, 404, and 405, and each layer of calculation units are controlled by fractal instruction sets 406, 407, 408, 409, and 410 with the same structure. For a programmer 411, although he wants to control the entire fractal calculating device 400, in fact he can only "see" the topmost root calculation unit 401, and the rest of the layers are hidden behind the fractal instruction set 406. In other words, the programmer 411 only needs to write code based on the fractal instruction set 406 to control the root calculation unit 401, and then the controller of the root calculation unit 401 will generate a fractal instruction based on the fractal instruction set 407 of the same structure, and the controller controls the calculation unit 402 of the next layer. By analogy, each layer of calculation units only needs to generate the fractal instruction to control the next layer of calculation units, so each layer only has contact with the upper and lower layers, the communication is direct and is not disturbed, and the instruction is simple.

In some embodiments, the aforementioned controller is configured to decompose the input instruction of any calculation unit to obtain a plurality of sub-instructions, for example, the input instruction can be decomposed into a plurality of parallel sub-instructions, and the parallel sub-instructions are sent to the controller of any one calculation unit to control the fractal functional unit. The above process is executed in a plurality of stages in a pipeline manner. The calculation unit loads an operand required to execute the parallel sub-instructions from the memory component of the upper layer of calculation units, and the calculation unit executes the corresponding operation according to the input instruction.

The plurality of stages may include: ID (instruction decoding), data LD (loading), operation EX (execution), operation RD (reduction), and data WB (writing back). The pipeline propagates in the order of ID, data LD, operation EX, operation RD, and data WB. It should be noted that the plurality of stages in the embodiment above are only an example of the present disclosure, and do not limit the disclosure in any way. For example, the plurality of stages may also include serial decomposition and the like.

ID refers to a decoding processing of the received input instruction sent by the upper layer (or the input end), which may specifically include: according to a storage requirement of the operand corresponding to the input instruction, allocating the memory space on the memory component of the calculation unit in this layer for the input instruction, and binding an address of the allocated memory space (a local address) to the instruction of the write operand in the input instruction.

Data LD refers to an operation of looking up the storage position of the operand corresponding to the input instruction from the memory of the upper layer of calculation units according to the address of the operand corresponding to the input instruction, reading the operand, and writing the operand to the memory component of the calculation unit of this layer according to the local address.

Operation EX refers to the process of obtaining a calculation result based on the operator and the operand. As mentioned above, since there may be a plurality of fractal functional units, or the capacity of the memory component of the calculation unit in this layer is smaller than the capacity of the memory required to store the data of the input instruction, the controller may also decompose the input instruction.

An operation may be performed to reduce the calculation result of the decomposed instruction, for example, the operation RD, in order to obtain the calculation result of the input instruction.

Data WB refers to an operation of writing the calculation result of the input instruction of the calculation unit in this layer back to the calculation unit in the upper layer.

Figure 5:
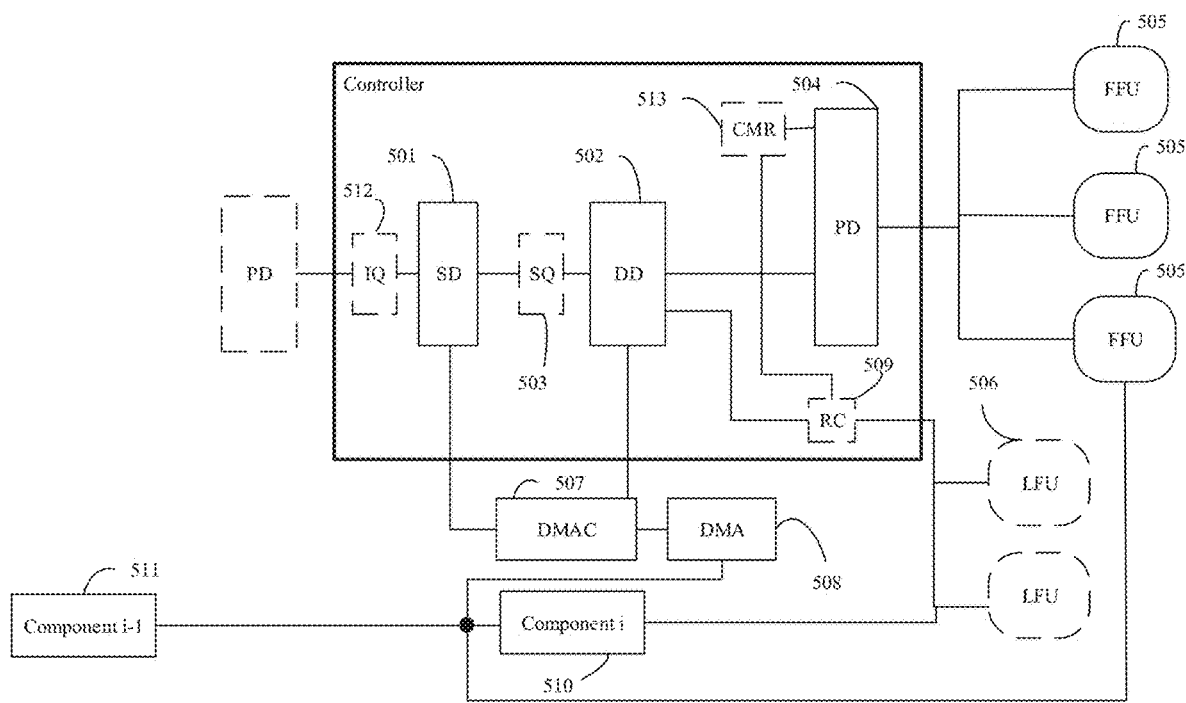
FIG. 5 is a schematic diagram of a pipeline according to another embodiment of the present disclosure.

FIG. 5 is a schematic diagram of a pipeline according to another embodiment of the present disclosure. The following describes the process of executing operations corresponding to the input instruction in a plurality of stages in a pipeline manner shown in FIG. 5 in conjunction with the calculating devices shown in FIG. 3. As shown in FIG. 3, taking the i-th layer of calculation units as an example, the i-th layer of calculation units receive the input instruction of the upper layer (the i−1-th layer) of calculation units, decode the input instruction to obtain the decoded instruction, load data required for running the input instruction, and send the decoded instruction to the next layer (the i+1-th layer) of calculations units; and the next layer (the i+1-th layer) of calculation units execute the decoded instruction according to the loaded data to complete the operation EX stage. Since the capacity of the memory component of the calculation units in this layer may be less than the memory capacity required to store the data of the input instruction, the controller can also decompose the input instruction, and an operation may be performed to reduce the calculation result of the decomposed instruction, for example, the operation RD, in order to obtain the calculation result of the input instruction. If the i-th layer is not the first layer, the controller of the i-th layer of calculation units also need to write the calculation result of the input instruction back to the previous layer (the i−1-th layer) of calculation units. It should be noted that the calculation unit of the next layer (the i+1-th layer) also performs the operation EX in a plurality of stages in a pipeline manner. In other words, after the calculation units in the next layer (the i+1-th layer) receive the instruction (as the input instruction of the calculation units of the next layer (the i+1-th layer)) sent by the controller of the calculation units of this layer (the i-th layer), the calculation units of the next layer (the i+1-th layer) can decode the input instruction, load the data required by the input instruction from the memory component in this layer, and send the decoded instruction to a next layer (the i+2-th layer) of calculation units of the i+1-th layer of calculation units to complete the operation EX. In other words, the next layer (the i+1th layer) calculation unit performs operations in the form of a pipeline in the order of ID, data LD, operation EX, operation RD, and data WB.

The calculating device of the embodiment of the present disclosure constructs the hierarchical structure of the calculating device in a multi-layer iterative manner. The structure of each calculation unit of the calculating device is the same, and calculation units in different layers and calculating devices of different sizes have the same programming interface and instruction set architecture to execute programs in the same format, and implicitly load data between layers. The hierarchical architecture of the calculating device executes the operation corresponding to the input instruction in an iterative pipeline manner, efficiently utilizes the calculation unit of each layer, and improves the operation efficiency.

As shown in FIG. 5, a sub-level instruction queue 503 is connected between the output end of a serial decomposer 501 and the input end of a decoder 502 provided in the present disclosure, and the output end of the serial decomposer 501 is connected to the input end of the sub-level instruction queue 503, the output end of the sub-level instruction queue 503 is connected to the input end of the decoder 502. The controller may further include a parallel decomposer 504, where the input end of the parallel decomposer 504 is connected to the output end of the decoder 502, the output end of the parallel decomposer 504 is connected to the input end of a fractal functional unit 505. The parallel decomposer 504 decomposes the decoded serial sub-instructions in parallel to obtain parallel sub-instructions according to the number of the fractal functional unit 505, and then sends the parallel sub-instructions to the fractal functional unit 505, so that the fractal functional unit 505 runs the parallel sub-instructions in parallel according to the operands corresponding to the parallel sub-instructions. Parallel decomposition may refer to an operation of executing the decomposed parallel sub-instructions in parallel.

The calculation unit of this embodiment is provided with a local functional unit 506, a DMAC (direct memory access controller) 507, and a DMA (direct memory access) 508, and the controller further includes a reduction controller 509. The DMAC 507 can be implemented by a hardware circuit or a software program, which is not limited in the present disclosure.

The DMAC 507 is connected to the DMA 508. A data path is connected between a memory component of any calculation unit and a memory of the upper layer of calculation units and fractal functional unit of any calculation unit. As shown in FIG. 5, a memory component i 510 is connected to a memory component i-1 511, and the memory component i 510 connected to the fractal functional unit 505 may refer to the memory component i 510 connected a memory component i+1 of the calculations unit in the next layer. The DMA 508 can be connected to the data path, and the DMAC 507 can control the DMA 508 according a control signal sent by other components in the calculation unit. The DMA 508 controls the data path to send the operand of the input instruction from one memory to another memory component. For example, the DMAC 507 can control the DMA 508 according to the control signal sent by the decoder 502, and load the operand of the input instruction from the memory component i-1 511 of the upper layer of calculation units to the local memory component i 510; alternatively, the DMAC 507 can write the calculation result of the input instruction from the local memory i 510 back to the memory component i-1 511 of the upper layer of calculation units.

In some embodiments, the DMAC 507 may generate a loading instruction according to the control signal, and send the loading instruction to the DMA 508, and the DMA 508 controls the data path according to the loading instruction to implement data loading.

The DMAC 507 can determine the base address, the starting offset, the amount of loaded data, the jump offset and other parameters according to the control signal, and then generate a loading instruction according to the base address, the start offset, the amount of loaded data, the jump offset and other parameters; the DMAC can also set the number of cycles to load data according to the dimensions of the operand. The base address is the starting address of the operand stored in the memory component. The starting offset is the starting position of the operand to be read in an original operand, and the starting offset can be determined according to the starting position among local parameters. The amount of loaded data can be determined according to the size parameter among local parameters. The jump offset represents the offset between the starting position of the operand to be read next time in the original operand and the starting position of the operand that was read last time in the original operand; in other words, the jump offset is the offset of the starting offset of the data to be read next time relative to the starting offset of the data that was read last time. For example, the starting position may be taken as the starting offset, the size parameter among local parameters may be taken as the number of data loaded at one time, and the size parameter among local parameters may be also taken as the jump offset.

For example, the starting position may be taken as the starting offset, the size parameter among local parameters may be taken as the number of data loaded at one time, and the size parameter among local parameters may be also taken as the jump offset.

In some embodiments, the starting address of the operand to be read can be determined according to the base address and the starting offset; the ending address of the operand to be read can be determined according to the amount of loaded data and the starting address; and the starting address of the operand to be read next time can be determined according to the starting address and the jump offset. Similarly, the ending address of operand to be read this time is determined according to the amount of loaded data and the starting address of the operand to be read next time. The above process is repeated until the number of cycles to load data is reached. The reading operand once and reading operand this time refer to that a same operand is read once or more times, each time part of the operand is read, and both once and this time refer to one time in a plurality of times.

In other words, reading an operand may require a plurality of times. The DMAC 507 may determine the starting address and the ending address of reading operand each time according to the base address, the starting offset, the amount of loaded data, and the jump offset. For example, for each reading process, the starting address of reading operand this time can be determined according to the starting address of reading operand last time and the jump offset; the ending address of reading operand this time can be determined according to the starting address of reading operand this time and the amount of loaded data (and the format of the data). The jump offset can be determined according to the amount of jumped data and the format of the data.

Exemplarily, it is supposed that the operand P is a matrix P[M. N] with M rows and N columns, and the control signal is "Load P[M, N][0, 0][M, N/2]. P'". According to a control signal, the DMAC 507 can set the starting offset of both row and column directions as 0, the amount of loaded data as N/2, the jump offset as N, and the number of cycles as M. In other words. N/2 columns of data is read each time from the first row and first column, and then N/2 columns of data in the second row and the first column is read each time. This process is looped M times until the data loading is completed.

The DMAC 507 is respectively connected to the serial decomposer 501 and the decoder 502; and according to the control signal sent by the serial decomposer 501 or the decoder 502, the DMAC 507 reads the operand from the memory of the upper layer of calculation units, and writes the operand to the memory component of the current calculation unit. In addition to reading and writing data, the DMAC 507 is also responsible for data writing back between different layers of calculation units, for example, the DMAC 507 may write the calculation result of the i+1-th layer of calculation units back to the i-th layer of calculation units.

In some embodiments, a memory component of each calculation unit is also connected to a local functional unit 506 in a same calculation unit. The output end of the decoder 502 is also connected to the reduction controller 509, and the reduction controller 509 is connected to the local functional unit 506. The reduction controller 509 is configured to control the local functional unit 506 to perform reduction in the operation RD stage to obtain the calculation result of the input instruction, and write the calculation result into the memory component i 510. The DMAC 507 may control the DMA 508 to write the calculation result in the memory i 510 back to the memory component i-1 511 of the upper layer of calculation units.

The serial decomposer 501 outputs the serial sub-instructions after serial decomposition to a sub-instruction queue 503, and the decoder 502 obtains the serial sub-instructions from the sub-instruction queue 503. The decoder 502 allocates memory space on the memory i 510 mainly according to the requirement for a main body instruction to store data, and the decoder 502 allocates the memory space on the memory component of the calculation unit in this layer for the serial sub-instructions according to the storage requirement of the operand corresponding to the main body instruction, and binds the address of the allocated memory space (local address) to the instruction that obtains the operand in the main body instruction, so as to realize the decoding process.

The decoder 502 can also send a control signal to the DMAC 507 according to the serial sub-instructions. Then the DMAC 507 can control the DMA 508 according to the control signal to load the operand corresponding to the serial sub-instructions into the allocated memory space. In other words, the DMAC looks up the storage position of the operand corresponding to the serial sub-instructions from the memory component of the upper layer of calculation units according to the address of the operand corresponding to the input instruction recorded in the serial sub-instructions, reads the operand, and writes the storage position of the operand to the memory component of the calculation unit in the current layer according to the local address.

The decoder 502 decodes the serial sub-instructions and sends the decoded serial sub-instructions to the parallel decomposer 504. The parallel decomposer 504 can decompose the decoded serial sub-instructions in parallel according to the number of fractal functional units 505, where the parallel decomposition means that the decomposed parallel sub-instructions can be executed in parallel. For example, it is supposed that the serial sub-instructions are the addition of vectors A and B, where A=(A1, A2, . . . Aj, . . . , An), B=(B1, B2, . . . Bj . . . , Bn), where n represents the number of elements in vectors A and B, n is a positive integer, j represents the serial number of the element, j is a positive integer and j≤n. The parallel decomposer 504 may decompose the serial sub-instructions into a plurality of parallel sub-instructions in parallel according to the number of fractal functional units, and each parallel sub-instruction is responsible for the addition operation of part of the data in the vectors. For example, it is assumed that n=4, the parallel decomposer 504 is connected to 4 fractal functional units 505. The parallel decomposer 504 may decompose the serial sub-instructions in parallel to obtain 4 parallel sub-instructions, where the 4 parallel sub-instructions are the addition of A1 and B1, A2 and B2, A3 and B3, and A4 and B4, respectively, and the parallel decomposer 504 may send the 4 parallel sub-instructions to the fractal functional unit 505. It should be noted that the above examples are only to illustrate examples of parallel decomposition, but do not limit the present disclosure in any way.

Figure 6:
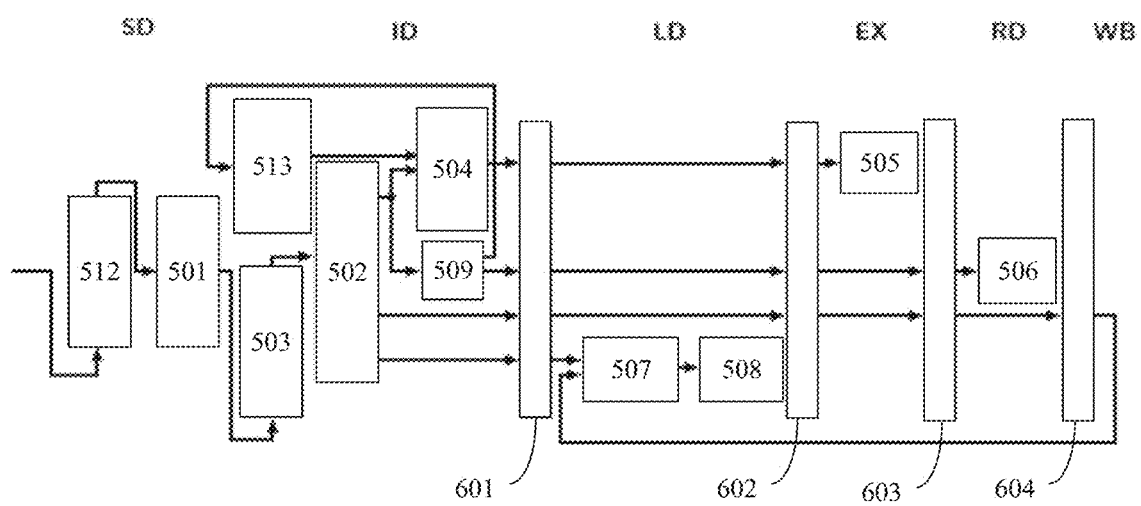
FIG. 6 is a schematic diagram of a pipeline according to another embodiment of the present disclosure.

In some embodiments, the controller in any calculation unit controls the fractal functional unit to perform an operation corresponding to the serial sub-instructions of any calculation unit in a plurality of stages in a pipeline manner. FIG. 6 is a schematic diagram of a pipeline according to another embodiment of the present disclosure.

As shown in FIG. 6, the plurality of stages may include: ID, data LD, operation EX, operation RD, and data WB. The pipeline propagates in the order of: ID, data LD, operation EX, operation RD, and data WB.

The decoder 502 is configured to decode the plurality of sub-instructions (serial sub-instructions). The decoder 502 sends a first control signal to the DMAC 507 according to a head instruction, so that the DMAC 507 controls the DMA 508 to load a shared operand according to the first control signal. For the main body instruction, the decoder 502 may allocate the memory space on the memory of the calculation unit of this layer according to the storage requirement of other operands corresponding to the main body instruction, and bind the address (local address) of the allocated memory space to an instruction that obtains or stores other operands in the main body instruction, so as to realize the decoding process. The decoder 502 may also send a second control signal to the DMAC 507 according to the main body instruction, so that the DMAC 507 controls the DMA 508 to store other operands according to the second control signal.

Figure 7:
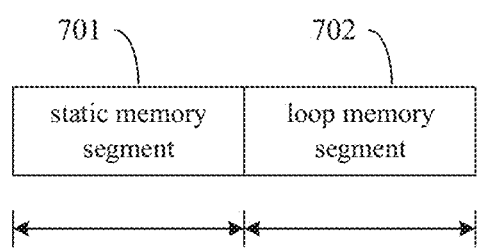
FIG. 7 is a schematic diagram showing the division of memory components according to an embodiment of the present disclosure.

In some embodiments, the memory component may include a static memory segment 701 and a loop memory segment 702. FIG. 7 is a schematic diagram showing the division of memory components according to an embodiment of the present disclosure. As shown in FIG. 7, the memory space of the memory component may include a static memory segment 701 and a loop memory segment 702.

As mentioned above, the input instruction may be an operation instruction describing machine learning. The operation of machine learning may consist of the computational primitives shown in Table 1, and the input instruction may include operands and operators. In other words, for the input instruction of any calculation unit, the controller decomposes the input instruction to obtain a plurality of sub-instructions, where the plurality of sub-instructions may share a part of the operand, and this part of the operand is the shared operand. Taking the matrix multiplication operation as an example, it is supposed that the input instruction is a multiplication of the matrix X and Y, if only the matrix X is decomposed, the serial sub-instructions obtained by serial decomposition of the input instruction need to use the operand Y together, the operand Y is the shared operand, and the above operation is the independent operation.

If there is a shared operand of the plurality of sub-instructions, the controller allocates the memory space for the shared operand in the static memory segment 701.

For the shared operand, in order to avoid frequent reading and writing operations, in the present disclosure, a static memory segment 701 is set in the memory component specifically for storing the shared operand, and in the loop memory segment 702, the memory space is allocated for other operands of the plurality of sub-instructions. For the shared operand of a plurality of sub-instructions, before the plurality of sub-instructions are executed, it is only necessary to perform a operation of loading the shared operand from the memory component of the upper layer of calculation units of any calculation unit to the static memory segment 701, which may avoid frequent data access and save bandwidth resources.

The serial decomposer 501 may calculate the remaining memory capacity of the static memory segment 701, and perform a first serial decomposition of the input instruction according to the remaining memory capacity of the static memory segment 701 and the memory capacity required by the shared operand to obtain a first serial sub-instruction. Specifically, the decomposition priority of the dimensions of the shared operand can be determined, according to the order of decomposition priority, the dimensions to decompose the shared operand can be selected and the maximum decomposition granularity can be determined in a dichotomy method until the memory capacity required by the decomposed shared operand is less than or equal to the remaining memory capacity of the static memory segment 701 of the calculating node of this layer. Then the input instruction can be decomposed according to the decomposing method of the shared operand.

For other operands, the serial decomposer 501 may perform a second serial decomposition of the first serial sub-instruction to obtain the serial sub-instructions according to the memory capacity of the loop memory segment 702 and the memory capacity required by other operands. Similarly, the decomposition priority of the dimensions of other operands can be determined, according to the order of decomposition priority, the dimensions to decompose other operands can be selected and the maximum decomposition granularity can be determined in a dichotomy method until the memory capacity required by the decomposed other operands is less than or equal to the remaining memory capacity of the loop memory segment 702 of the calculating node of this layer. Then the input instruction can be decomposed according to the decomposing method of other operands.

If the memory capacity required by other operands is greater than the capacity of the loop memory segment 702, and the memory capacity required by the shared operand is less than or equal to the remaining capacity of the static memory segment 701, the serial decomposer 501 may decompose other operands according to the capacity of the loop memory segment 702, and serially decompose the input instruction. Similarly, the specific process of splitting other operands according to the capacity of the loop memory segment 702 and the serial decomposition of input instruction can be: determining the decomposition priority of the dimensions of other operands; according to the order of decomposition priority, selecting the dimensions to decompose other operands; and determining the maximum decomposition granularity in a dichotomy method until the memory capacity required by the decomposed other operands is less than the memory capacity of the loop memory segment 702.

If the memory capacity required by the shared operand is greater than the remaining capacity of the static memory segment 701, and the memory capacity required by other operands is less than or equal to the capacity of the loop memory segment 702, the serial decomposer 501 may decompose the shared operand according to the remaining capacity of the static memory segment 701, and serially decompose the input instruction.

In some embodiments, for the input instruction with shared operand, the decomposed serial sub-instructions may include a head instruction and a main body instruction. The decoder 502 can send a control signal to the DMA 508 according to the head instruction to load the shared operand from the memory component of the calculating node of the upper layer to the static memory segment 701. The decoder 502 sends a control signal to the DMA 508 according to the main body instruction, so as to load the other data from the memory component of the upper layer calculating node to the loop memory segment 702.

The above-mentioned other operands may refer to the decomposed operands among the operands of the input instruction, the intermediate result obtained by executing the sub-instruction, the reduction result, and the like, where the reduction result can be obtained by performing reduction operation on the intermediate result, and the reduction operation can refer to the reduction process mentioned above.

In some embodiments, the starting address of the operand to be read can be determined according to the base address and the starting offset; the ending address of the operand to be read can be determined according to the amount of loaded data and the starting address; and the starting address of the operand to be read next time can be determined according to the starting address and the jump offset; similarly, the ending position of reading operand this time can be determined according to the amount of loaded data and the starting address of the operand to be read next time, and the above process is repeated until the number of cyclic loading operands is reached. The reading operand once and reading operand this time refer to that a same operand is read once or more times, each time part of the operand is read, both once and this time refer to one time in a plurality of times.

In other words, reading an operand may require a plurality of times, the DMAC 507 can determine the starting address and ending address of reading operand each time according to the base address, the starting offset, the amount of loaded data, and the jump offset. For example, for each reading process, the starting address of reading operand this time can be determined according to the starting address of reading operand last time and the jump offset; the ending address of reading operand this time can be determined according to the starting address of reading operand this time and the amount of loaded data (and the format of the data). The jump offset can be determined according to the amount of jumped data and the format of the data.

The DMA 508 is used for data LD: loading the operand of the input instruction to the memory component, which specifically includes: according to the first control signal corresponding to the head instruction, loading the shared operand from the memory component of the upper layer of calculation units to the static memory segment 701 shown in FIG. 7; according to the second control signal corresponding to the main body instruction, loading the other data from the memory component of the upper layer of calculation units to the loop memory segment 702 shown in FIG. 7. According to the second control signal, the DMA 508 loads the other data from the memory component of the upper layer of calculation units to the loop memory segment 702, where the loaded data may be part of the other operands, which mainly includes part of the input operand, rather than the intermediate result or the reduction result.

The decoder 502 decodes the serial sub-instructions and sends the decoded serial sub-instructions to the parallel decomposer 504. The parallel decomposer 504 can decompose the decoded serial sub-instructions in parallel according to the number of fractal functional units 505 connected to the parallel decomposer 504, where the parallel decomposition means that the decomposed parallel sub-instructions can be executed in parallel.

The fractal functional unit 505 may execute the operation in a plurality of stages in a pipeline manner to obtain the execution result. The reduction controller 509 is configured to control the local functional unit 506 to perform the reduction operation on the execution result to obtain the calculation result of the input instruction. The DMA 508 is further configured to write back data; write the calculation result to the memory component of the upper layer of calculation units of any calculation unit.

By setting an instruction queue 512 as a buffer between the serial decomposer 501 and the upper layer of calculation units, the strict synchronization execution relationship between the serial decomposer 501 and the upper layer of calculation units can be omitted. The instruction queue 512 can simplify the circuit design and improve the execution efficiency. For example, the serial decomposer 501 and the upper layer of calculation units can be executed asynchronously, so as to reduce the time that the serial decomposer 501 waits for the upper layer of calculation units to send an input instruction. A sub-instruction queue 503 serves as a buffer between the serial decomposer 501 and the decoder 502, so that the strict synchronization execution relationship between the serial decomposer 501 and the decoder 502 can be omitted. The sub-instruction queue 503 can simplify the circuit design and improve the execution efficiency. For example, the serial decomposer 501 can be executed asynchronously, so as to reduce the time that the decoder 502 waits for the serial decomposer 501 to serially decompose the input instruction. The processing efficiency of the calculating device can be improved by setting the instruction queue 512 and the sub-instruction queue 503.

In some embodiments, the controller is configured to decompose the input instruction of any calculation unit to obtain a plurality of sub-instructions, which specifically includes: the serial decomposer 501 serially decomposes the input instruction to obtain serial sub-instructions according to the memory capacity required by the input instruction and the capacity of the memory component.

The serial decomposition of the input instruction may include the decomposition of the operand of the input instruction and the decomposition of the input instruction. When the serial decomposition is performed, in order to more effectively use the resources of the calculation unit, the serial sub-instructions obtained by the serial decomposition will have the largest possible decomposition granularity, and the decomposition granularity of the serial sub-instructions obtained by the serial decomposition will be determined according to the resources of the calculation unit. For example, the resource of the calculation unit may be the capacity of the memory component of the calculation unit. The decomposition granularity is refer to the dimension of decomposing the operand.

The memory capacity required for the input instruction is determined according to the memory capacity required to store the operand of the input instruction and the memory capacity required to store the intermediate result of the operator processing the operand. After the memory capacity required for the input instruction is determined, whether the capacity of the memory of the calculation unit in this layer meets the memory capacity required for the input instruction can be determined. If the capacity of the memory component of the calculation unit in this layer does not meet the memory capacity required for the input instruction can be determined, the input instruction is serially decomposed to obtain the serial sub-instructions according to the capacity of the memory component of the calculation unit in this layer.

For ease of understanding, a specific operation is used as an example to explain the serial decomposition process. Take the matrix multiplication operation as an example to illustrate the function of the serial decomposer 501. It is assumed that the input instruction is to multiply the matrix X and Y, the serial decomposer 501 can determine the memory capacity required for the input instruction according to the size of the matrix X and the matrix Y, and compare the memory capacity required for the input instruction with the capacity of the memory of the calculation unit in this layer, where if the memory capacity required for the input instruction is greater than the capacity of the memory component of the calculation unit in this layer, the input instruction needs to be serially decomposed. The specific process may be: decomposing the operand, thereby decomposing the input instruction into a plurality of serial sub-instructions, where the serial sub-instructions can be executed serially, for example, the matrix X or matrix Y can be decomposed, or both the matrix X and matrix Y are decomposed. Taking the decomposition of the matrix X as an example, the input instruction can be serially decomposed into a plurality of serial sub-instructions of matrix multiplication and serial sub-instructions of summation. After the plurality of serial sub-instructions of matrix multiplication are executed serially, the calculation result of the input instruction is obtained according to the calculation result of the plurality of serial sub-instructions of matrix multiplication and the serial sub-instructions of summation. It should be noted that the above-mentioned serial decomposition method for matrix multiplication is only an example of the present disclosure to illustrate the function of the serial decomposer 501, and does not limit the present disclosure in any way.

In some embodiments, the serial decomposer 501 serially decomposes the input instruction to obtain serial sub-instructions according to the capacity of the memory component of any calculation unit and the memory capacity required by the input instruction, and the specific process includes: determining the decomposition priority of the dimensions of the operand; according to the order of decomposition priority, selecting the dimensions to decompose the operand, and determining the maximum decomposition granularity in a dichotomy manner until the memory capacity required by the decomposed operand is less than or equal to the capacity of the memory component of the calculation unit in this layer. Through this decomposition method, it is ensured that the input instruction can be serially decomposed with the largest possible decomposition granularity.

In some embodiments, in order to improve the efficiency of decomposition, for any selected dimension of decomposing the operand, before the maximum decomposition granularity in the dimension is determined in a dichotomy manner, the memory capacity required for the operand decomposed into atomic size in the dimension can be determined, and then the capacity of the memory component of the calculation unit in this layer can be compared with the memory capacity required for the operand decomposed into atomic size in the dimension. If the memory capacity required for the operand decomposed into atomic size in the dimension is less than the capacity of the memory of the calculation unit in this layer, the operand will be split in a dichotomy manner in this dimension; if the memory capacity required for the operand decomposed into atomic size in the dimension is greater than the capacity of the memory component of the calculation unit in this layer, the operand will be split in a dichotomy manner in the next dimension according to the decomposition priority; and if the memory capacity required for the operand decomposed into atomic size in the dimension is equal to the capacity of the memory component of the calculation unit in this layer, the decomposition dimension can be determined directly. The atomic size means that the decomposition granularity is 1.

Figure 8:
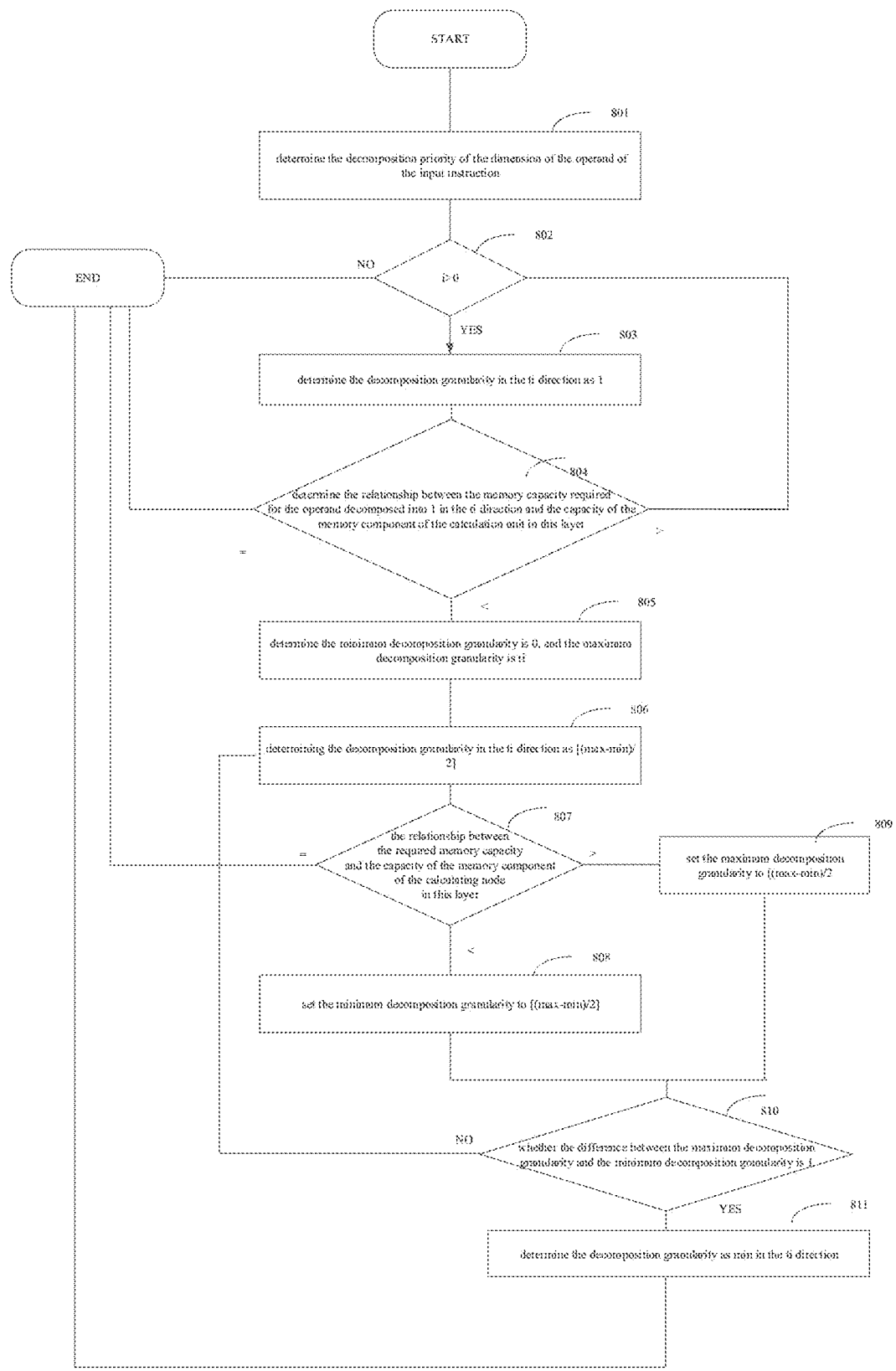
FIG. 8 is a flowchart showing serial decoding according to another embodiment of the present disclosure.

FIG. 8 is a flowchart showing serial decoding according to another embodiment of the present disclosure. As shown in FIG. 8. (1) a step 801 includes: determining the decomposition priority of the dimension of the operand of the input instruction. In some embodiments, the decomposition priority can be determined according to the size of the dimension of the operand, the larger the dimension, the higher the decomposition priority, and the largest dimension of the operand is the first to be decomposed. For example, the operand X is an N-dimensional tensor with dimensions t1, t2, . . . ti, . . . tN, where t1<t2< . . . ti . . . <tN, where i represents a different dimension, i is a positive integer and i≤N. When the decomposition priority of the dimension of operand X is determined, tN is the largest dimension and has the highest decomposition priority, followed by tN−1 . . . ti . . . t2, t1.

(2) Selecting the dimension to decompose the operand in the order of decomposition priority, and initializing i to N. A step 802 includes: determining whether i=>0; if i=>0, executing a step 803; determining the decomposition granularity in the ti direction as 1. A step 804 includes: determining the relationship between the memory capacity required for the operand decomposed into 1 in the ti direction and the capacity of the memory component of the calculation unit in this layer, where if the memory capacity required for the operand decomposed into 1 in the ti direction is less than the capacity of the memory component of the calculation unit in this layer, decomposing the operand in the ti dimension in a dichotomy manner. The specific process is shown as follows. A step 805 includes: determining that the minimum decomposition granularity is 0, and the maximum decomposition granularity is ti. A step 806 includes: determining that the decomposition granularity in the ti direction as [(max−min)/2]. A step 807 includes: determining the relationship between the memory capacity required for the operand decomposed into [(max−min)/2] in the ti direction and the capacity of the memory component of the calculation unit in this layer, where if the memory capacity required for the operand decomposed into [(max−min)/2] is equal to the capacity of the memory component of the calculation unit in this layer, the decomposition process can be ended; if the memory capacity required for the operand decomposed into [(max−min)/2] is less than the capacity of the memory component of the calculation unit in this layer, the minimum decomposition granularity is set to [(max−min)/2] in a step 808; if the memory capacity required for the operand decomposed into [(max−min)/2] is greater than the capacity of the memory component of the calculation unit in this layer, the maximum decomposition granularity is set to [(max−min)/2] in a step 809. A step 810 includes: determining whether the difference between the maximum decomposition granularity and the minimum decomposition granularity at this time is 1, where if the difference is 1, a step 811 is executed, and the decomposition granularity is determined as min in the ti direction; if the difference is not 1, the step 806 is returned to continue to determine the decomposition granularity as [(max−min)/2] in the ti direction. The steps 806-811 are repeated.

(3) Going back to step 802, if the memory capacity of the operand decomposed into 1 in the ti direction is equal to the capacity of the memory component of the calculation unit in this layer, the decomposition dimension can be determined, and the process of decomposing the operand can be ended; if the memory capacity of the operand decomposed into 1 dimension in the ti direction is greater than the capacity of the memory component of the calculation unit in this layer, then i=i−1, and go back to the step 802, at this time, i=i−1>0, then the step 803 is executed. The above process is repeated until it is determined that the memory capacity required for the decomposed operand meets the capacity of the memory component of the calculation unit in this layer.

After the operand is decomposed, the input instruction may be decomposed according to the decomposed operand, which can specifically include: decomposing the input instruction into a plurality of serial sub-instructions, where the plurality of serial sub-instructions include serial sub-instructions responsible for the operation of the decomposed operand of each subset; if there is output dependency after the input instruction is serially decomposed, the plurality of serial sub-instructions may also include a reduction instruction.

It should be noted that FIG. 8 is only an example of the process of decomposing operand, but does not limit the present disclosure in any way. It is understandable that there are other ways to determine the decomposition granularity. For example, the decomposition priority can be selected in other ways, and the method of dimension decomposition is not limited to dichotomy, as long as the maximum decomposition granularity can be selected.

The serial decomposer 501, the decoder 502, and the parallel decomposer 504 in the controller are separated, so that the memory allocation can be staggered in time. Specifically, the parallel decomposer 504 always allocates memory space after the decoder 502, but the allocated memory space for the decomposer 504 is released earlier. The decoder 502 always allocates memory space after the serial decomposer 501, but the allocated memory space for the decoder 502 is released earlier. The memory space used by the serial decomposer 501 to perform the serial decomposition may be used in a plurality of serial sub-instructions. Therefore, a static memory segment 701 is set for the serial decomposer 501, and other components share the memory other than static memory (the loop memory segment 702) in the memory component.

In the plurality of stages in the pipeline, the other 4 stages except ID all involve memory access. Therefore, at most 4 instructions need to access the memory at the same time. In the data LD and data WB stages, the DMA 508 may access the memory segment, and the sequence of data LD and data WB is controlled by the DMAC 507, so that there will be no conflicts when accessing the memory; in other words, there will be 3 instructions accessing the loop memory segment 702 at the same time. Therefore, in the present disclosure, the loop memory segment 702 is divided into a plurality of sub-memory blocks, for example, the loop memory segment 702 can be divided into three sub-memory blocks. When the decoder 502 needs to allocate memory space for the operand of the serial sub-instructions, it can allocate memory space for the operand of the serial sub-instructions in the three sub-memory blocks in sequence according to the input sequence of the serial sub-instructions, which may reduce the complexity of memory management, and improve the utilization of memory space.

In some embodiments, the controller is provided with a first counter, and the loop memory segment 702 includes a plurality of sub-memory blocks. The controller allocates memory space for other operands of the plurality of sub-instructions in the loop memory segment 702, including: the controller allocating memory space for the other operands from a sub-memory block corresponding to the count value of the first counter in the loop memory segment 702.

The serial decomposer 501 of the i-th calculating node obtains the input instruction from the instruction queue 512, the operand of the input instruction is P[M, N][0, 0][M. N/2]. The serial decomposer 501 determines that the memory capacity required to store the operand P[M, N][0, 0][M. N/2] is greater than the capacity of the memory component, and the input instruction needs to be serially decomposed. It is supposed that the decomposition granularity is M and N/4; in other words, the operands of the serial sub-instructions are P[M, N][0, 0][M, N/4] and P[M, N][0, (N/4)+1][M, N/2]. The serial decomposer 501 outputs the serial sub-instructions to the sub-instruction queue 503, and the decoder 502 obtains the serial sub-instructions from the sub-instruction queue 503. The decoder 502 allocates memory space for the operand of the serial sub-instructions, and binds the address (local address) of the allocated memory space to the instruction that obtains the operand in the serial sub-instructions; in other words, the decoder 502 will generate a control signal:

$$\text{Load } P[M, N][0, 0][M, N/4], P1\text{'};$$

According to a control signal, the DMAC 507 can set the starting offset of both row and column directions as 0, the amount of loaded data as N/4, the jump offset as N, and the number of cycles as M. The DMAC 507 generates a loading instruction according to the determined base address, the starting offset, the amount of loaded data, and the jump offset, and sends the loading instruction to the DMA 508. The DMA 508 reads the operand in the above-mentioned manner according to the loading instruction and writes the operand to the local memory component.

When obtaining the serial sub-instructions corresponding to the operand P[M, N][0, (N/4)+1][M, N/2], the decoder 502 can also generate a control signal:

$$\text{Load } P[M, N][0, (N/4)+1][M, N/2], P2';$$

According to the control signal, the DMAC 507 can set the starting offset in row direction is 0 and the starting offset in column direction as (N/4)+1, the amount of loaded data as N/4, the jump offset as N, and the number of cycles as M. N/4 column of data is read from the first row and the (N/4)+1-th column and written to the position of the local memory component P1', and then N/4 column of data is read from the second row and the (N/4)+1-th column, the above process is repeated M times to complete the loading of data.

FIG. 9 and FIG. 10 are schematic diagrams showing the division of memory components according to another embodiment of the present disclosure. The memory component of FIG. 10 is similar to that of FIG. 7, but the difference is that the memory component of FIG. 10 further divides the loop memory segment 702 into three sub-memory blocks 1001, 1002, and 1003. The memory capacity of the three sub-memory blocks can be the same or different, which is not limited in the present disclosure. After obtaining the serial sub-instructions from the sub-instruction queue 503, for the main body instruction in the serial sub-instructions, the decoder 502 may allocate the memory space of the loop memory segment 702 to the main body instruction in the sequence of the main body instruction and the count value of the first counter. For example, if a first main body instruction is obtained, and the count value of the first counter is 0, the decoder 502 will allocate memory space for the operand of the first main body instruction in the sub-memory block 1001; if a second main body instruction is obtained, and the count value of the first counter is 1, then the decoder 502 will allocate memory space for the operand of the second main body instruction in the sub-memory block 1002; if a third main body instruction is obtained, and the count value of the first counter is 2, then the decoder 502 will allocate memory space for the operand of the third main body instruction in the sub-memory block 1003; if a fourth main body instruction is obtained, the count value of the first counter is 0 at this time, then the decoder 502 will allocate memory space for the operand of the fourth main body instruction in the sub-memory block 1001, and so on.

FIG. 9 is a schematic diagram of a pipeline propagation process of a plurality of instructions according to another embodiment of the present disclosure. The pipeline propagation process of a plurality of instructions will be described below in conjunction with the above example of allocating memory space and the propagation process of the pipeline. As shown in FIG. 9, at T1, after the decoder 502 allocates memory space in the sub-memory block 1001 for a first main body instruction, the first main body instruction is sent to the parallel decoder 504, and the parallel decoder 504 decomposes the first main body instruction in parallel to obtain (a plurality of) parallel sub-instructions 1.

At T2, the decoder 502 allocates memory space in the sub-memory block 1002 for a second main body instruction; and the first main body instruction then enters the data LD stage, and the DMA 508 loads the input operand of the first main body instruction into the sub-memory block 1001; in other words, the DMA 508 uses the sub-memory block 1001 at this time.

At T3, the decoder 502 allocates memory space in the sub-memory block 1003 for a third main body instruction; the second main body instruction then enters the data LD stage, and the DMA 508 loads the input operand of the second main body instruction into the sub-memory block 1002; in other words, the DMA 508 uses the sub-memory block 1002 at this time; and the first main body instruction enters the operation EX stage, the fractal functional unit 505 executes a parallel instruction 1, and writes the execution result back to the sub-memory block 1001; in other words, the fractal functional unit 505 uses the sub-memory block 1001 at this time.

At T4, the decoder 502 allocates memory space in the sub-memory block 1001 for a fourth main body instruction; the third main body instruction then enters the data LD stage, and the DMA 508 loads the input operand of the third main body instruction into the sub-memory block 1003; in other words, the DMA 508 uses the sub-memory block 1003 at this time; the second main body instruction enters the operation EX stage, the fractal functional unit 505 executes a parallel instruction 2, and writes the execution result back to the sub-memory block 1002; in other words, the fractal functional unit 505 uses the sub-memory block 1002 at this time; and for the first main body instruction, the local functional unit 506 performs the reduction operation on the execution result; in other words, the local functional unit 506 uses the sub-memory block 1001 at this time.

At T5, the first main body instruction enters the data WB stage, the DMA 508 writes the reduction result in the sub-memory block 1001 back to the memory component of the upper layer of calculation units; the fourth main body instruction enters the data LD stage, the DMA 508 loads the input operand of the fourth main body instruction into the sub-memory block 1001; in other words, the DMA 508 uses the sub-memory block 1001 at this time; the third main body instruction enters the operation EX stage, the fractal functional unit 505 executes a parallel instruction 3, and writes the execution result back to the sub-memory block 1003; in other words, the fractal functional unit 505 uses the sub-memory block 1003 at this time; and for the second main body instruction, the local functional unit 506 performs the reduction operation on the execution result; in other words, the local functional unit 506 uses the sub-memory block 1002 at this time.

From the above process, it can be seen that in the process of pipeline propagation, the DMA 508, the fractal functional unit 505, and the local functional unit 506 cyclically use 3 sub-memory blocks in sequence, which may reduce the complexity of memory management and improve the utilization of memory space.

It should be noted that the five-stage pipeline does not need to be experienced during the execution of each instruction. For example, an input instruction is: SORT A, B, and performing the serial decomposition to obtain a reduction result, and the serial decomposer 501 will get the serial sub-instruction:

SORT A1, K1;
SORT A2, K2;
MERGE K1. K2, B:

where A1, A2, and B are located in the memory component of the upper layer of calculation units, and K1 and K2 are allocated to the static memory segment 701 by the serial decomposer 501.

Therefore, when the serial sub-instruction SORT A1, K1 is executed, the decoder 502 does not degrade K1, so that there is no need to write data back, and the data WB stage will become a bubble. In the operation RD stage, the local functional unit 506 writes the result to K1 of the static memory segment 701; the process of executing the serial sub-instruction SORT A2. K2 is similar to the process of executing the serial sub-instruction SORT A1, K1.

When an instruction MERGE K1. K2. B is executed, the decoder 502 does not degrade K1, K2; in other words, there is no need to load data, and the data LD stage will become a bubble. In the operation EX stage, the fractal functional unit 505 directly accesses the static memory segment 701 to fetch data.

In some embodiments, if three adjacent (or relatively close) input instructions have a shared operand, since the calculating device provided in the present disclosure processes the input instruction in a pipeline manner, when the serial decomposer 501 allocates memory space for the shared operand in the static memory segment 701, the fragmentation problem of the static memory segment 701 may occur, resulting in low memory space utilization. FIG. 11 is a schematic diagram of a memory space allocation method of a static memory segment 701 according to another embodiment of the present disclosure.

For example, it is supposed that the shared operand of three adjacent input instructions are operand 1, operand 2, and operand 3. As shown in FIG. 11, the serial decomposer 501 first allocates memory space for the operand 1 of the input instruction 1, and then allocates memory space for the operand 2 of the second input instruction 2; at this time, the operand 1 is still in use, so the memory space can be allocated for the operand 2 adjacent to where the operand 1 is stored. When a third input instruction 3 arrives, the operand 1 may have been used up, and the operand 2 is still in use; at this time, the memory space can be allocated for the operand 3 in the position where the operand 1 is stored. However, the memory space required for the operand 3 may be slightly smaller than the memory space for storing the operand 1; at this time, part of the memory space for storing the operand 3 and the operand 2 may be unusable. Or, the memory space required for storing the operand 3 may be slightly larger than the memory space for storing the operand 1; at this time, it may be necessary to allocate memory space for the operand 3 on the right side of the operand 2 in FIG. 11, which may lead to complicated memory management, and the utilization of memory space is low.

In order to solve the above technical problems, the present disclosure also provides a second counter in the controller. When the second counter has a different count value, the serial decomposer 501 may allocate memory space for the shared operand in different ends of the static memory segment 701 according to the order of the head instruction generated by the serial decomposition and the value of the second counter.

Figure 12:
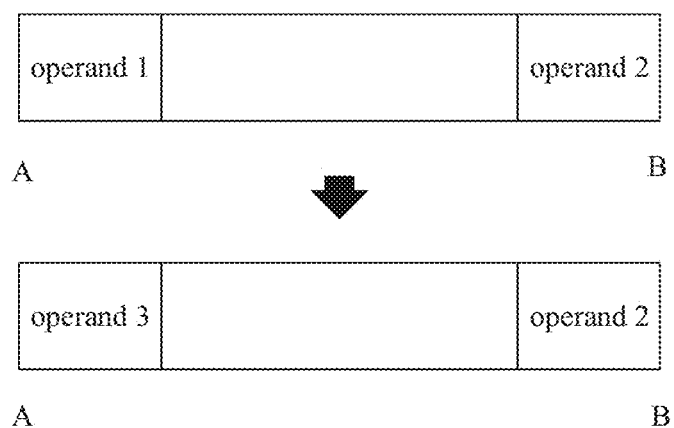
FIG. 12 is a schematic diagram of a static memory segment according to another embodiment of the present disclosure.

FIG. 12 is a schematic diagram of a memory space allocation method of a static memory segment 701 according to another embodiment of the present disclosure. The process of allocating the memory space of the static memory segment 701 for the shared operand by the serial decomposer 501 will be described below with reference to FIG. 12. The serial decomposer 501 obtains the input instruction 1 from the sub-instruction queue 503, and serially decomposes the input instruction 1 to obtain a plurality of serial sub-instructions 1, where the plurality of serial sub-instructions 1 have a shared operand 1. The serial decomposer 501 may allocate memory space for the operand 1 from the static memory segment 701. It may be supposed that the count value of the second counter is 0 at this time. The serial decomposer 501 can allocate memory space for the operand 1 from the A side shown in FIG. 12.

The serial decomposer 501 obtains the input instruction 2 from the sub-instruction queue 503, and serially decomposes the input instruction 2 to obtain a plurality of serial sub-instructions 2, where the plurality of serial sub-instructions 2 have a shared operand 2. The serial decomposer 501 may allocate memory space for the operand 2 from the static memory segment 701, and the count value of the second counter is 1 at this time. The serial decomposer 501 can allocate memory space for the operand 2 from the B side shown in FIG. 12.

The serial decomposer 501 obtains the input instruction 3 from the sub-instruction queue 503, and serially decomposes the input instruction 3 to obtain a plurality of serial sub-instructions 3, where the plurality of serial sub-instructions 3 have a shared operand 3. The serial decomposer 501 may allocate memory space for the operand 3 from the static memory segment 701, and the count value of the second counter sum is 0 at this time. The serial decomposer 501 can allocate memory space for the operand 3 from the A side shown in FIG. 12. If the operand 1 is no longer needed, the operand 3 directly covers the operand L, if the operand 1 is still needed, the operand 3 is stored next to the operand 1.

According to the embodiment of the present disclosure, when there is no overlap between the input operand and the output operand of the previous serial sub-instructions, the instruction pre-loading the memory can be used to speed up the processing, which may improve the processing efficiency of the calculating device, reduce the complexity of memory management, and improve the utilization of memory space.

In the embodiment of FIG. 5, the controller may further include a CMR (commission register) 513. When the reduction controller 509 determines that the resources required for the reduction processing of the calculation result of the fractal functional unit 505 are greater than the upper limit of the resources of the local functional unit 506, the reduction controller 509 may write a commission instruction to the CMR 513 according to the serial sub-instructions, and the parallel decomposer 504 periodically checks whether there is a commission instruction in the CMR 513I If there is a commission instruction, the reduction controller 509 controls the fractal functional unit 505 according to the commission instruction to reduce the calculation result to obtain a calculation result of the input instruction. The above-mentioned periodic check may be a check according to the processing cycle, and the processing cycle may be determined according to the time for the fractal functional unit 505 to process a serial sub-instruction, which is not limited in the present disclosure. The processing efficiency of the calculation units can be improved by setting the CMR 513.

Figure 13:
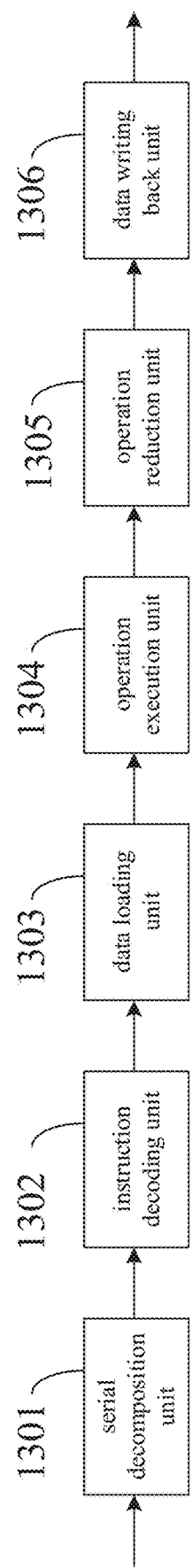
FIG. 13 is a schematic diagram of a fractal calculating device according to another embodiment of the present disclosure.

Another embodiment of the present disclosure provides a fractal calculating device including a multi-layer calculation unit, and the multi-layer structure of the fractal calculating device is shown in FIG. 3. Each layer of calculation units may run in a pipelined manner. As shown in FIG. 13, the fractal calculating device includes a serial decomposition unit 1301, an instruction decoding unit 1302, a data loading unit 1303, an operation execution unit 1304, an operation reduction unit 1305, and a data writing back unit 1306. The serial decomposition unit 1301 is configured to receive an input instruction from the upper layer, decompose the input instruction into serial sub-instructions, and take the serial sub-instructions as an input buffer. The instruction decoding unit 1302 is configured to decode the input instruction into local instructions, fractal instructions, and direct memory access instructions. The data loading unit 1303 is configured to load the sub-data of the input data to be calculated from the upper layer of memory to the local memory according to the direct memory access instruction. The operation execution unit 1304 is configured to execute a task corresponding to the sub-data according to the fractal instruction to generate a calculation result. The operation reduction unit 1305 is configured to reduce the calculation result according to the local instruction. The data writing back unit 1306 is configured to write the reduced calculation result back to the upper layer of memory.

In this embodiment, each layer of calculation units may un in a five-stage pipeline. Each stage corresponds to a unit, and each unit operates in response to different input instructions at the same time. In more detail, the instruction decoding unit 1302, the data loading unit 1303, the operation execution unit 1304, the operation reduction unit 1305, and the data writing back unit 1306 form a pipeline.

Figure 14:
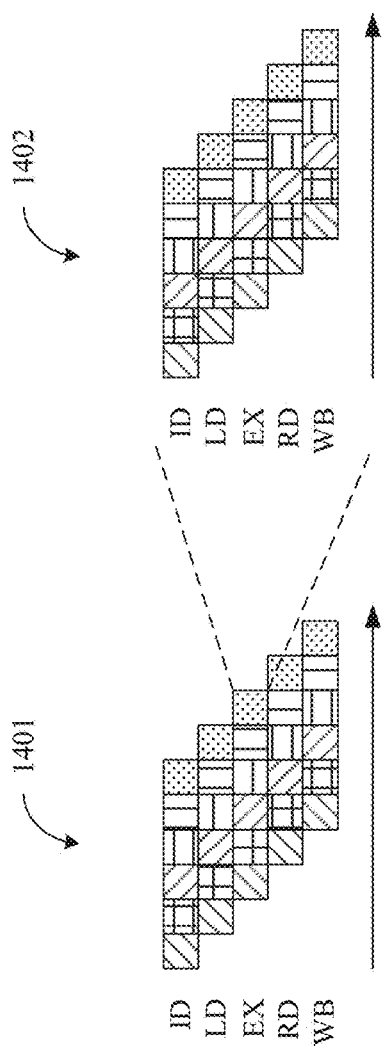
FIG. 14 is a schematic diagram of a pipeline according to another embodiment of the present disclosure.

FIG. 14 is a schematic diagram of a pipeline according to an embodiment of the present disclosure. The operation of the pipeline will be further described below in conjunction with the calculating device shown in FIG. 3 and FIG. 13. As shown in FIG. 3, taking the i-th layer of calculation units 302 as an example, the pipeline 1401 of the i-th layer of calculation units 302 may run as follows: receiving the input instruction of the upper layer (the i−1-th layer) of calculation units; in the ID stage, decoding, by the instruction decoding unit 1302, the input instruction; in the data LD stage, loading, by the data loading unit 1303, data required for running the input instruction from the i-th layer of calculation units to the local memory; and in the operation EX stage, sending, by the operation execution unit 1304, the local decoded instruction to the next layer (the i+1-th layer) of calculation units 303, and executing, by the next layer (the i+1-th layer) of calculation units, the decoded instruction according to the sub-data to complete the operation. Since the structure of the middle layer of calculation units is the same, in the i+1-th layer of calculation units 303, the pipeline 1402 is also executed.

Since the capacity of the memory component of the i-th layer of calculation units 302 may be less than the memory capacity required to store data, the instruction decoding unit 1302 may also decompose the input instruction. In the operation RD stage, the operation reduction unit 1305 needs to reduce the calculation result to obtain the calculation result of the input instruction. In the data WB stage, the data writing back unit 1306 writes the calculation result back to the upper layer of calculation units.

As mentioned above, in the EX stage of the pipeline 1401, the operation execution unit 1304 may send the decoded instruction to the i+1-th layer of calculation units 303, and the i+1-th layer of calculation units 303 may complete the operation according to the sub-data and the fractal instruction. After the i+1-th layer of calculation units 303 receive the input instruction (the fractal instruction of the i-th layer of calculation units 302), the serial decomposition unit 1301 in the i+1-th layer of calculation units 303 decompose the instruction into serial sub-instructions, and then the pipeline 1402 of the i+1-th layer is started, so the operations corresponding to ID, data LD, operation EX, operation RD, and data WB are executed.

The pipeline operation of this embodiment is the same as that of the embodiment of FIG. 9, and will not be repeated.

Figure 15:
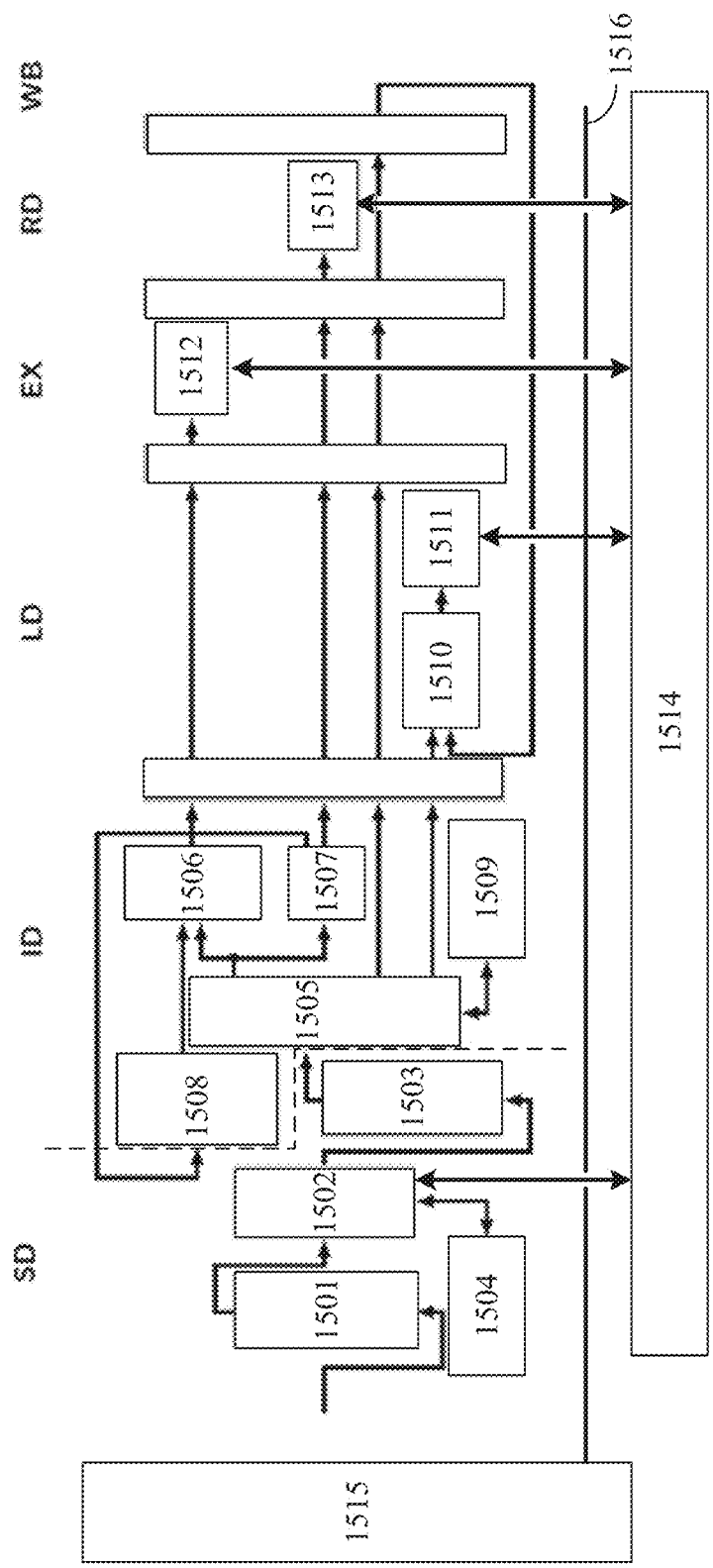
FIG. 15 is a schematic diagram of calculation units in each layer according to another embodiment of the present disclosure.

FIG. 15 is a schematic diagram of calculation units in each layer according to the embodiment in FIG. 13. The serial decomposition unit 1301 is configured to receive an upper layer of fractal instruction from the upper layer of calculation units, and decompose the upper layer of fractal instruction into a plurality of serial sub-instructions. The serial decomposition unit 1301 includes an instruction queue 1501, a serial decomposer 1502, a sub-instruction queue 1503, and a tensor permutation table 1504.

The instruction queue 1501 receives and temporarily stores the upper layer of fractal instruction (the input instruction of this layer) sent by the upper layer of calculation units, where the upper layer of fractal instruction is taken as a buffer between the serial decomposer 1502 and the upper layer of calculation units. Therefore, the strict synchronization execution relationship between the serial decomposer 1502 and the upper layer of calculation units can be omitted.

The serial decomposer 1502 obtains the upper layer of fractal instruction from the instruction queue 1501 and decomposes the fractal instruction into a plurality of serial sub-instructions, where the decomposition method can be carried out in the process shown in FIG. 8, and these serial sub-instructions are temporarily stored in the sub-instruction queue 1503. If there is an input dependency relationship between these serial sub-instructions, the serial decomposer 1502 also generates intermediate data reflecting the dependency relationship.

The calculation unit includes a local memory 1514. The tensor permutation table 1504 is configured to store the address comparison table of the input data in the upper layer of memory 1515 and the local memory 1514. As mentioned above, the serial decomposer 1502 may store the shared operand and intermediate data in the local memory 1514. When the data needs to be read, whether the data is stored in the local memory 1514 is determined according to the tensor permutation table 1504. If the data is stored in the local memory 1514, the serial decomposer 1502 may refer to the local address to fetch data from the local memory 1514 instead of fetching the data from the upper layer of memory 1515, so as to avoid frequent access to the upper layer of memory 1515 and improve processing efficiency.

The instruction decoding unit 1302 is configured to decode the plurality of serial sub-instructions into fractal instructions according to the hardware resources of the calculation unit, where the hardware resources include the capacity limitation of the local memory 1514, the ability of the serial decomposer 1502 to decompose the upper layer of fractal instruction, the calculating power and the number of the fractal functional unit 1512, and the like. The instruction decoding unit 1302 includes a down-layer decoder 1505, a parallel decomposer 1506, a reduction controller 1507, a CMR 1508, and a tensor permutation table 1509.

The down-layer decoder 1505 is configured to sequentially obtain a plurality of serial sub-instructions from the sub-instruction queue 1503, generate a lower layer of instructions and a direct memory access instruction. These instructions have corresponding operands, and the down-layer decoder 1505 checks the storage requirements of these operands and generates a direct memory access instruction pointing to the local memory 1514. The down-layer decoder 1505 runs the pipeline according to the dependency between the operands of different instructions. For example, the down-layer decoder 1505 determines whether the dependency between these operands is a write-modify-read relationship. If the dependency between these operands is a write-modify-read relationship, the calculation of a specific operands must be completed first, and then the calculation result is written back to the local memory 1514, and the next instruction reads the calculation result and then performs the calculation. Any confusion in the sequence will result in calculation errors. In this case, the down-layer decoder 1505 will pause pipeline until the reading-writing relationship ends.

The parallel decomposer 1506 is configured to decompose the lower layer of instructions into fractal instructions in parallel, and the fractal instructions are used to control the fractal functional unit 1512 to perform fractal operations. In more detail, the parallel decomposer 1506 binds the local address of the local memory 1514 to the operands of the fractal instructions according to the operands of the lower layer of instructions, and the operands are needed by the operation execution unit 1304.

The reduction controller 1507 is configured to decode the lower layer of instructions into local instructions, and the local instructions may control the reduction process in the operation reduction unit 1305. When the reduction controller 1507 determines that the resources required to perform the reduction processing on the calculation result of the fractal functional unit 1512 are greater than the upper limit of the resources of the local function unit 1513, the reduction controller 1507 writes a commission instruction to the CMR 1508, and the parallel decomposer 1506 plans the calculation time course of the fractal functional unit 1512 according to the commission instruction to match the resources of local functional unit 1513.

Since the data required for calculation will be loaded from the upper layer of memory 1515 to the local memory 1514, the tensor permutation table 1509 is configured to store the address comparison table of the data in the upper layer of memory and the local memory. When the down-layer decoder 1505 needs to fetch the data, the down-layer decoder 1505 looks up the local address of the data according to the tensor permutation table 1509, and fetches the data from the local memory 1514.

In this embodiment, the afore-mentioned serial decomposition unit 1301 and the instruction decoding unit 1302 correspond to the controller 308 in FIG. 3. In other words, the controller 308 includes an instruction queue 1501, a serial decomposer 1502, a sub-instruction queue 1503, a tensor permutation table 1504, a down-layer decoder 1505, a parallel decomposer 1506, a reduction controller 1507, a CMR 1508, and a tensor permutation table 1509.

The data loading unit 1303 is configured to load the data required by the operation execution unit 1304 from the upper layer of memory 1515 to the local memory 1514 through a DMA (direct memory access) controller 1510 and a DMA 1511. The DMA controller 1510 is a special interface circuit for peripherals through the DMA 1511, which makes a bus request to the system to take over the control of the bus 1516. After the system receives the signal, when the current bus cycle ends, the system may give up the control of the bus 1516 according to the priority of a direct memory access instruction and the request made by the DMA. Under the management of the DMA controller 1510, the data is loaded from the upper layer of memory 1515 to the local memory 1514. After the operation execution unit 1304 completes the task and returns the calculation result, the DMA 1511 stores the calculation result in the local memory 1514. After each data transfer is completed, the DMA controller 1510 will return the control right of the bus 1516.

The operation execution unit 1304 is configured to issue a fractal instruction to the lower layer of calculation units to generate a calculation result. Similar to the above embodiment, the operation execution unit 1304 includes a plurality of fractal functional units 1512 configured to execute an issued task. The DMA 1511 sends data stored in the local memory 1514 to the fractal functional units 1512. After receiving the fractal instruction from the parallel decomposer 1506 and the corresponding data from the DMA 1511, the fractal functional units 1512 execute the calculation task. In fact, as shown in FIG. 3, the fractal functional units 1512 are the calculation units of the next layer, so the operation execution unit 1304 sends the fractal instruction and corresponding data to the calculation units of the next layer, and sends back the calculation result after the calculation is finished. The above process is the pipeline shown in FIG. 14.

The operation reduction unit 1305 includes a local functional unit 1513. After the fractal functional unit 1512 produces the calculation result, the local functional unit 1513 reduces the calculation result according to a local instruction.

The data writing back unit 1306 is configured to transmit the reduced calculation result back to the upper layer of calculation units. In this embodiment, the data writing back unit 1306 uses the DMA controller 1510 to make a bus request to the system to take over the control of the bus 1516. The system responds to the request issued by the DMA to give up the control of the bus 1516, and the DMA 1511 transmits the reduced calculation result to the upper layer of memory 1515. After the reduced calculation result is transmitted, the DMA controller 1510 returns the control right of the bus 1516.

The local memory 1514 of this embodiment also has the structure shown in FIG. 10, including a static memory segment 701 and a loop memory segment 702. The static memory segment 701 is configured to store intermediate data and shared operands generated by the serial decomposer 1502. The intermediate data refers to dependent data between serial instructions, for example, a second serial instruction may need to use the intermediate data of a first serial instruction; and the shared operands are some operands that will be shared between the sub-instructions. The serial decomposer 1502 stores dependent data in the static memory segment 701, and the local address of direct data is recorded in the tensor permutation table 1504. The intermediate data and shared operands are sequentially stored from both ends of the static memory segment 701 to the intermediate, and the specific storage method is shown in FIG. 12.

When the operand is loaded from an external storage space to the static memory segment 701, the data address information table (the tensor permutation table 1504) to be updated is determined according to the count value of the first counter, and the data address information table (the tensor permutation table 1504) to be updated is updated according to the storage address of the loaded operand in the external storage space and the storage address of the loaded operand in the static memory segment 701, where the external storage space may be the upper layer of memory 1515.

Furthermore, the tensor permutation table 1504 may be provided with a tensor permutation table 1 and a tensor permutation table 2, where the tensor permutation table 1 is configured to record the correspondence between operands the addresses of the operands stored at the left end of the static memory segment 701, and the tensor permutation table 2 is configured to record the correspondence between the operands and the addresses of the operands stored at the right end of the static memory segment 701.

The serial decomposer 1502 obtains an input instruction 1 from the instruction queue 1501, and serially decomposes the input instruction 1 to obtain a plurality of serial sub-instructions 1. The plurality of serial sub-instructions 1 sham an operand 1, and the serial decomposer 1502 allocates memory space for the operand 1 from the static memory segment 701. The serial decomposer 1502 looks up the tensor permutation table 1 and tensor permutation table 2 to determine whether the shared operand 1 has been stored in the static memory segment 701. If the shared operand 1 is not stored in the static memory segment 701, it is supposed that the counter 1 has a value of 0, then the serial decomposer 1502 may allocate memory space for the operand 1 from the left end shown in FIG. 12, and record the correspondence between the storage address of the shared operand 1 in the upper layer of memory 1515 and the storage address of the shared operand 1 in the local memory 1514 in the tensor permutation table 1.

Then the serial decomposer 1502 obtains an input instruction 2 from the instruction queue 1501, and serially decomposes the input instruction 2 to obtain a plurality of serial sub-instructions 2. The plurality of serial sub-instructions 2 share an operand 2, and the serial decomposer 1502 allocates memory space for the operand 2 from the static memory segment 701. The serial decomposer 1502 looks up the tensor permutation table 1 and tensor permutation table 2 to determine whether the shared operand 2 has been stored in the static memory segment 701. If the shared operand 2 is not stored in the static memory segment 701, it is supposed that the counter 1 has a value of 1, then the serial decomposer 1502 may allocate memory space for the operand 2 from the right end shown in FIG. 12, and record the correspondence between the storage address of the shared operand 2 in the upper layer of memory 1515 and the storage address of the shared operand 2 in the local memory 1514 in the tensor permutation table 2.

After recording the address correspondence in the tensor permutation table 1504, the serial decomposer 1502 may set a timer corresponding to the address correspondence to start timing. When the timer reaches the aging time, the serial decomposer 1502 may set the address corresponding to the timer to be invalid. In the above embodiment, a timer 1 may be set for the address correspondence of the shared operand 1, and a timer 2 may be set for the address correspondence of the shared operand 2. Before the timer 1 and timer 2 reach the aging time, the address correspondence of the shared operand 1 and the address correspondence of the shared operand 2 are both valid. After the timer 1 reaches the aging time, the address correspondence of the shared operand 1 may be set to be invalid; and after the timer 2 reaches the aging time, the address correspondence of the shared operand 2 may be set to be invalid.

The serial decomposer 1502 obtains an input instruction 3 from the instruction queue 1501, and serially decomposes the input instruction 3 to obtain a plurality of serial sub-instructions 3. The plurality of serial sub-instructions 3 sham an operand 3, and the serial decomposer 1502 allocates memory space for the operand 3 from the static memory segment 701. The serial decomposer 1502 looks up the tensor permutation table 1 and tensor permutation table 2 to determine whether the shared operand 3 has been stored in the static memory segment 701. If a part of the stored shared operand 1 is found to be the shared operand 3, the storage address of the shared operand 1 corresponding to the shared operand 3 is directly bound to a head instruction.

It should be noted that if the address correspondence of the shared operand 1 is invalid, the shared operand 3 will not be returned to store the result in the static memory segment 701. Only when the corresponding timer 1 of the address correspondence of the shared operand 1 has not reached the aging time, and the storage address of the shared operand 1 in the upper layer of memory 1515 includes the storage address of the shared operand 3 in the upper layer of memory 1515, the shared operand 3 will be returned to store the result in the static memory segment 701.

In the embodiment, when an operand is loaded from the upper layer of memory 1515 to any one of the plurality of sub-memory blocks on the loop memory segment 702, the down-layer decoder 1505 may update the data address information table (the tensor permutation table 1509) corresponding to any one of the sub-memory blocks according to the storage address of the loaded operand in the upper layer of memory 1515 and the storage address of the loaded operand in the local memory 1514.

The loop memory segment 702 is managed by the down-layer decoder 1505, and is configured to store the sub-data required to execute the serial instructions and the data of each level generated by the calculation of the sub-data in the five-stage pipeline. As shown in FIG. 10, the loop memory segment 702 of the local memory 1514 is divided into three sub-memory blocks 1001, 1002, 1003. Each sub-memory block stores specific sub-data required to execute the specific serial instructions and the data of each level generated by the specific sub-data in the five-stage pipeline. After the down-layer decoder 1505 obtains the serial sub-instructions from the sub-instruction queue 1503, the DMA 1511 sequentially performs data exchange between each sub-memory block and the upper layer of memory 1515 according to the local address.

For example, the down-layer decoder 1505 obtains a first serial sub-instruction from the sub-instruction queue 1503, and assigns relevant data (such as the operand) to the sub-memory block 1001. Then the down-layer decoder 1505 obtains a second serial sub-instruction, and assigns the relevant data of the second serial sub-instruction to the sub-memory block 1002. While the down-layer decoder 1505 of the instruction decoding unit 1302 assigns the relevant data of the second serial sub-instruction to the sub-memory block 1002, the DMA 1511 of the data loading unit 1303 loads the relevant data of the first serial sub-instruction from the upper layer of memory 1515 to the sub-memory block 1001.

Then, while the down-layer decoder 1505 of the instruction decoding unit 1302 assigns relevant data of a third serial sub-instruction to the sub-memory block 1003, the DMA 1511 of the data loading unit 1303 loads the relevant data of the second serial sub-instruction from the upper layer of memory 1515 to the sub-memory block 1002; and the fractal functional unit 1512 of the operation execution unit 1304 fetches the data of the sub-memory block 1001 and delivers the data to the lower layer, and stores the calculation result of the lower layer of calculation units in the sub-memory block 1001.

Then, while the down-layer decoder 1505 of the instruction decoding unit 1302 assigns relevant data of a fourth serial sub-instruction to the sub-memory block 1001, the DMA 1511 of the data loading unit 1303 loads the relevant data of the third serial sub-instruction from the upper layer of memory 1515 to the sub-memory block 1002; the fractal functional unit 1512 of the operation execution unit 1304 fetches the data of the sub-memory block 1002 and delivers the data to the lower layer, and stores the calculation result of the lower layer of calculation units in the sub-memory block 1002; and the local functional unit 1513 of the operation reduction unit 1305 fetches the calculation result from the sub-memory block 1001 for reduction, and stores the reduced calculation result back to the sub-memory block 1001.

Then, while the down-layer decoder 1505 of the instruction decoding unit 1302 assigns relevant data of a fifth serial sub-instruction to the sub-memory block 1002, the DMA 1511 of the data loading unit 1303 loads the relevant data of the fourth serial sub-instruction from the upper layer of memory 1515 to the sub-memory block 1001; the fractal functional unit 1512 of the operation execution unit 1304 fetches the data of the sub-memory block 1003 and delivers the data to the lower layer, and stores the calculation result of the lower layer of calculation units in the sub-memory block 1003; the local functional unit 1513 of the operation reduction unit 1305 fetches the calculation result from the sub-memory block 1002 for reduction, and stores the reduced calculation result back to the sub-memory block 1002; and the data writing back unit 1306 writes the reduced calculation result in the sub-memory block 1001 back to the upper layer of memory 1515.

In this embodiment, the pipeline operation is performed in the foregoing manner, and a plurality of methods are adopted to manage data consistency. Since the calculating device in this embodiment may decompose the input instruction into smaller non-overlapping serial sub-instructions for execution by the calculation unit, the data may have many copies in calculation units of different layers. In this embodiment, data is not allowed to be written to an original reading address space; in other words, original data is not allowed to be overwritten, thereby ensuring data consistency.

In addition, when the tensor permutation tables 1504 and 1509 map data from a writing address space of the upper layer of memory 1515 to a reading address space of the local memory 1514, the risk of data inconsistency may occur. As mentioned above, each piece of record in the tensor permutation tables 1504 and 1509 in this embodiment has a validity period. The tensor permutation tables 1504 and 1509 are divided into a plurality of memory banks like storage space, where each memory bank only maintains the information of its corresponding storage segment. Whenever the data is processed, the storage segment will be recycled and re-allocated to new data, and the old data is overwritten. Therefore, the old data can no longer be used. Through the setting of storage segments in the tensor permutation tables 1504 and 1509, all data may be invalidated within a certain period of time. Therefore, the lifetime of the data record will not exceed the lifetime of reference data. Moreover, in order to ensure data consistency, as described above, the local addresses of the instructions allocated to each fractal functional unit 1512 in this embodiment are always different, and the local addresses may be allocated alternately among the sub-memory blocks 1001, 1002, and 1003.

The functional units of each layer in this embodiment also have the characteristics of FIG. 4; in other words, the functional units of each layer can run a same piece of code by using the aforementioned fractal instruction set without additional arrangements. The principle of the fractal instruction set is that each layer performs its own tasks without interfering with the working methods of the lower layer. When a programmer writes the code, he only needs to control the top-layer of calculation units, and each layer of calculation units automatically generates the sub-instructions that control the lower layer, so the present disclosure has the following advantages:

Each instruction in the fractal instruction set corresponds to a complete computational primitive. The programmer cannot generate a more detailed operation and decomposition method to achieve the purpose of instruction simplification.

Unlike an RISC (reduced instruction set computing), the fractal instruction set provided in the present disclosure does not provide the programmer with explicit loading and storing instruction. The fractal instruction set hides an internal memory from the programmer, so that there is no way for the programmer to interfere with how the internal memory is used. Therefore, when the fractal instruction set is applied to fractal calculating devices of different sizes, the programmer does not need to change the control method to adapt to different memory sizes.

There is no hardware information in the fractal instruction set; in other words, there is no need to control specific hardware, and the programmer only needs to focus on defining calculating tasks, which will not cause behavior that interferes with internal hardware, and facilitate the expansion of calculating devices based on different scales.

For the lower layer of calculation units, the down-layer decoder 1505 and the parallel decomposer 1506 of the upper layer of calculation units are like programmers that generate control instructions (fractal instructions) for the lower layer of calculation units, which reduces the complexity of programming. Based on this feature, this embodiment can be summarized as an STMH (single task multiple heritors) framework. This embodiment defines how two adjacent hierarchical structures cooperate to reduce granularity, thereby inheriting tasks from a higher hierarchical structure to a lower hierarchical structure. More specifically, in this embodiment, the collaboration mechanism is divided into two relationships; the relationship with a parent node and the relationship between nodes at a same level. The serial decomposer 1502 is configured to define the parent-child relationship (the relationship between upper and lower layers), and the parallel decomposer 1506 defines the relationship of nodes at the same level (the relationship between fractal functional units). No matter how complex a task is, the operation of the entire fractal calculating device can be clearly defined.

Figure 16:
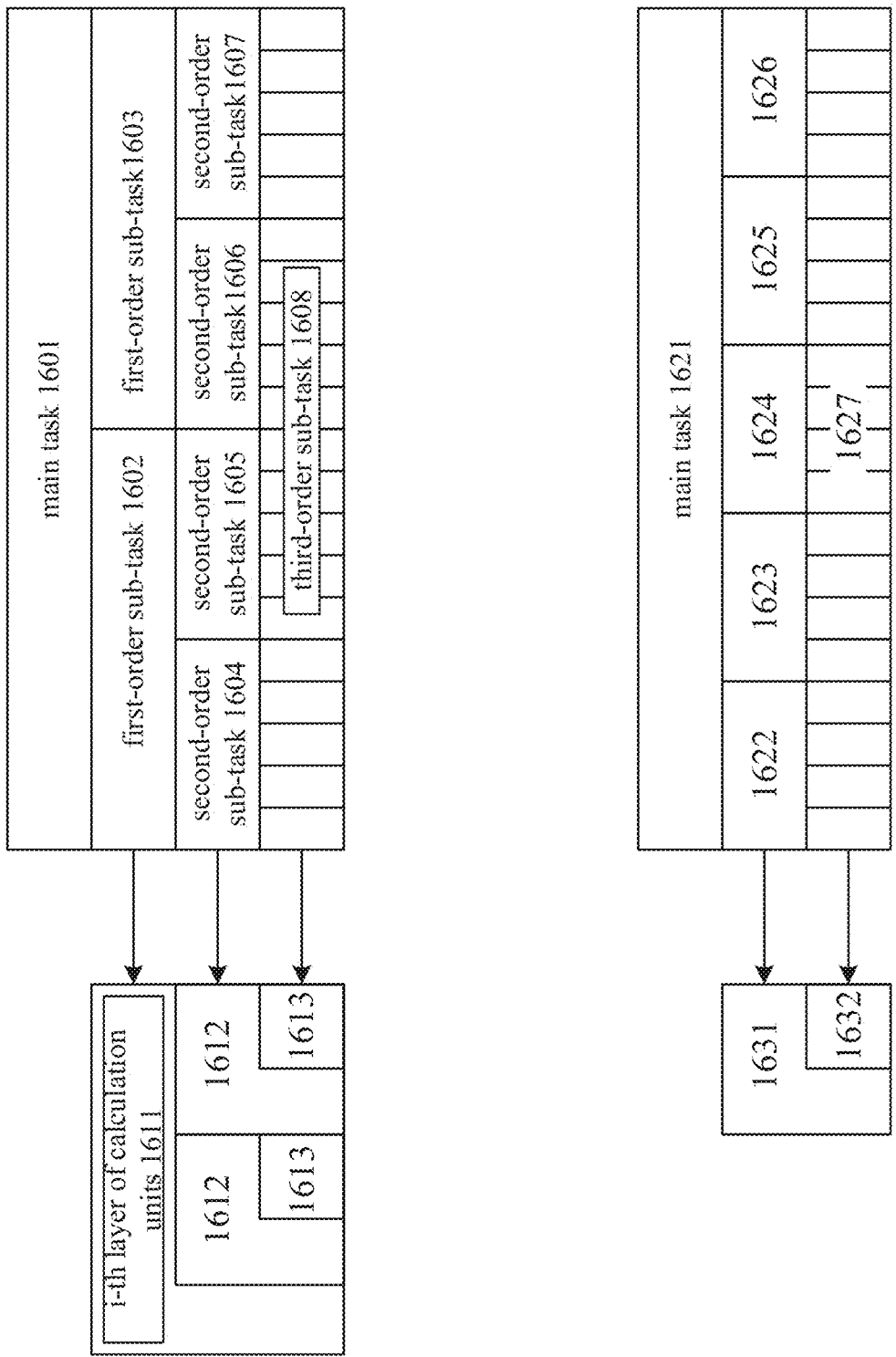
FIG. 16 shows an architecture of single task multiple heritors.

FIG. 16 shows an architecture of single task multiple heritors. It is supposed that the serial decomposer of the i-th layer of calculation units 1611 receives a main task 2301. According to the hardware resources, it is supposed that there are too many operands that cannot be directly calculated, so the parallel decomposer of the i-th layer of calculation units 1611 decomposes the main task 2301 into two first-order sub-tasks 1602 and 1603, and sends the first-order sub-tasks 1602 and 1603 to two calculation units 1612 in i+1-th layer, respectively. In more detail, a serial decomposing unit receives an upper layer of fractal instruction from the upper layer of calculation units, and decomposes the upper layer of fractal instruction into a plurality of serial sub-instructions. An instruction decoding unit decodes the plurality of serial sub-instructions into fractal instructions according to the hardware resources of the i-th layer of calculation units. The operation execution unit transmits a local fractal instruction to the lower layer of calculation units to generate a calculation result. The operation details have been explained in the foregoing embodiment, and will not be repeated.

Taking the first-order sub-task 1602 as an example, after the serial decomposer of the i+1-th layer of calculation units 1612 receives the first-order sub-task 1602, the parallel decomposer of the i+1-th layer of calculation units 1612 continues to decompose the first-order sub-task 1602 into two second-order sub-tasks 1604 and 1605, and sends the second-order sub-tasks 1604 and 1605 to two calculation units 1613 in i+2-th layer, respectively. Taking the second-order sub-task 1604 as an example, after the serial decomposer of the i+2-th layer of calculation units 1613 receives the second-order sub-task 1604, the parallel decomposer of the i+2-th layer of calculation units 1613 continues to decompose the second-order sub-task 1604 into five third-order sub-tasks 1608. Since the granularity of the third-order sub-tasks 1608 is small enough, the fractal functional unit of the i+2-th layer of calculation units 1613 can perform calculations. Therefore, the main task 2301 can be decomposed and calculated at the i+2-th layer. In other words, in terms of the granularity of the main task 2301, a fractal calculating device with a three-layer of calculation units mechanism is required to execute the main task 2301.

Looking at another example in FIG. 16, it is supposed that the serial decomposer of an upper layer of calculation units 1631 receives a main task 1621. According to the hardware resources, the parallel decomposer of the upper layer of calculation units 1631 decomposes the main task 1621 into five first-order sub-tasks 1622, 1623, 1624, 1625 and 1626, and sends the five first-order sub-tasks 1622 to a lower layer of calculation units 1632. After the serial decomposer of the lower layer of calculation units 1632 receives the first-order sub-tasks, the parallel decomposer of the lower layer of calculation units 1632 continues to decompose the first-order sub-tasks into four second-order sub-tasks 1627. Since the granularity of the second-order sub-tasks 1627 is small enough, the lower layer of calculation units 1632 can perform calculations, therefore, the main task 1621 can be sink to the lower layer of calculation units 1632 for calculation. In other words, in terms of the granularity of the main task 1621, a fractal calculating device with a two-layer of calculation units mechanism is required to execute the main task 1621.

It can be seen from the above embodiment that the programmer does not need to judge or plan which layer a task needs to be executed in, but only needs to conduct coding control for the top layer. The fractal calculating device provided in this embodiment will automatically perform fractal execution, which is very convenient for coding.

Figure 17:
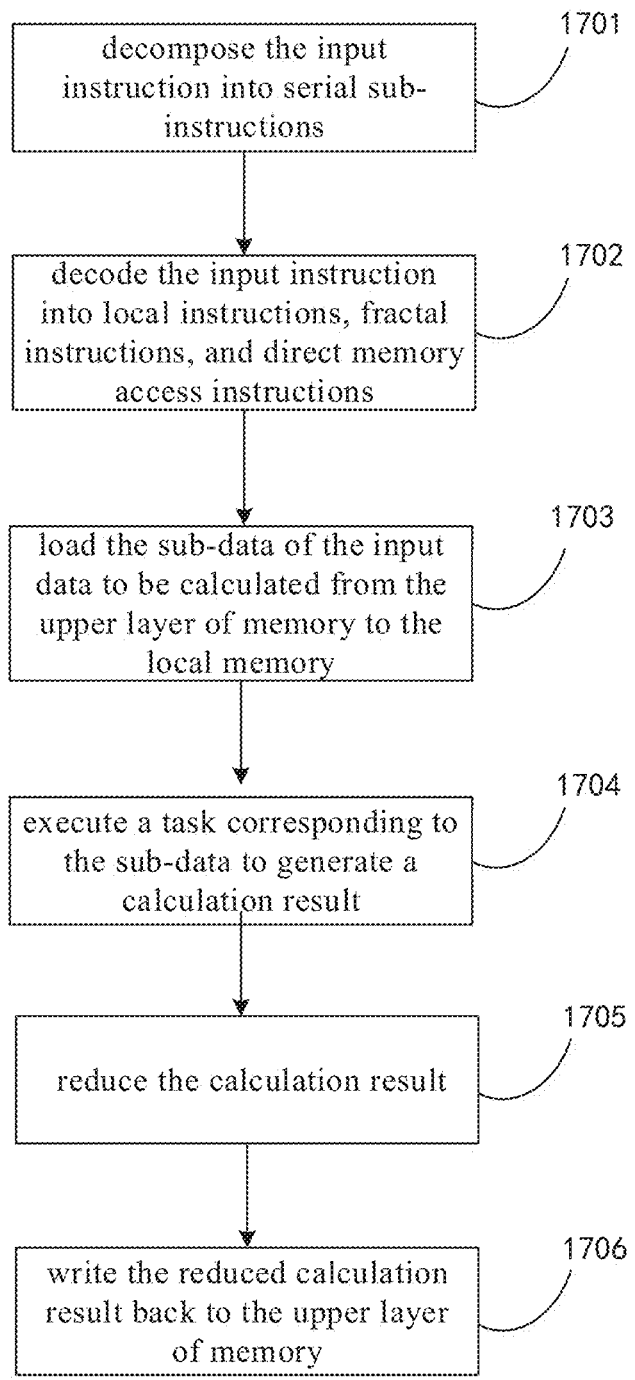
FIG. 17 is a flowchart of a pipeline according to another embodiment of the present disclosure.

Another embodiment of the present disclosure provides a pipelined fractal calculation method, which is applicable to the embodiments of FIG. 13 and FIG. 15, and the process is shown in FIG. 17.

A step 1701 includes receiving an input instruction from the upper layer, decomposing the input instruction into serial sub-instructions, and taking the serial sub-instructions as an input buffer. An upper layer of fractal instruction from an upper layer of calculation units is received and stored firstly; the upper layer of fractal instruction is decomposed into a plurality of serial sub-instructions; intermediate data reflecting the dependency between these serial instructions is generated; an address comparison table of the intermediate data and shared operands in an upper layer of memory and a local memory is generated; when it is necessary to access intermediate data or shared operands, it is determined whether the data is stored in the local memory, where if the data is stored in the local memory, the data is fetched from the local memory.

A step 1702 includes decoding the input instruction into local instructions, fractal instructions, and direct memory access instructions. In more detail, in this step, the plurality of serial sub-instructions are decoded into fractal instructions according to the hardware resources of the calculation unit, where the hardware resources include the capacity limitation of the local memory, the ability of the serial decomposer to decompose the upper layer of fractal instruction, the calculating power and the number of the fractal functional unit, and the like. This step further includes the following sub-steps: generating a lower layer of instructions and a direct memory access instruction according to a plurality of serial sub-instructions, where these instructions have corresponding operands, and the storage requirements of these operands need to be checked to generate direct memory access instructions pointing to the local memory, and then the pipeline is run according to the dependency between the operands of different instructions; decomposing the lower layer of instructions to fractal instructions in parallel, which detailedly includes binding the local address of the local memory to the operands of the fractal instruction according to the operands of the lower layer of instructions; decoding the lower layer of instructions to local instructions; generating an address comparison table of sub-data in the upper layer of memory and the local memory; and when the sub-data needs to be read, fetching the sub-data from the local memory according to the local address.

A step 1703 includes loading the sub-data of the input data to be calculated from the upper layer of memory to the local memory according to the direct memory access instruction. A bus request to take over the control of the bus is made firstly; the request issued by the DMA to give up the control of the bus is responded; the sub-data is loaded from the upper layer of memory to the local memory; and finally, the control right of the bus is returned.

A step 1704 includes executing a task corresponding to the sub-data according to the fractal instruction to generate a calculation result. Firstly, the sub-data stored in the local memory is sent to the fractal functional units to execute issued tasks; a calculation result is returned back; and then the calculation result is stored in the local memory.

A step 1705 includes reducing the calculation result according to a local instruction.

A step 1706 includes writing the reduced calculation result back to the upper layer of memory. A bus request to take over the control of the bus is made firstly; the request issued by the DMA to give up the control of the bus is responded; the reduced calculation result is loaded to the upper layer of memory; and finally, the control right of the bus is returned.

Figure 18:
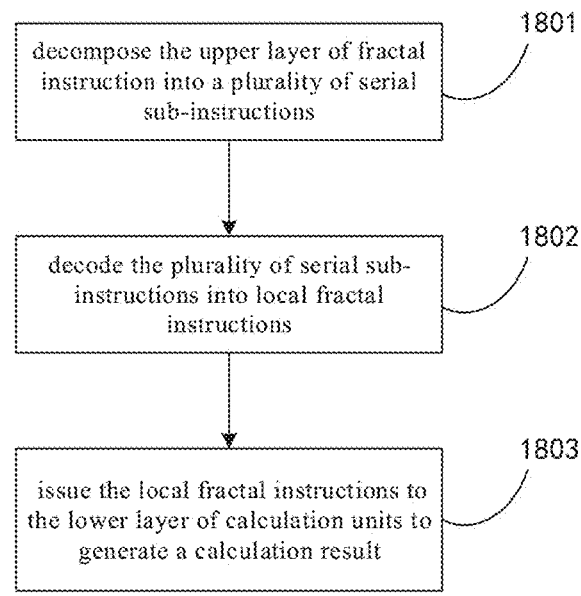
FIG. 18 is a flowchart showing a method of single task multiple heritors according to another embodiment of the present disclosure.

Another embodiment of the present disclosure provides a fractal calculating method, which is applicable to the embodiments of FIG. 13 and FIG. 15. In more detail, this embodiment describe a method for specifically implementing STMH. The process is shown in FIG. 18.

A step 1801 includes responding to the upper layer of fractal instruction from the upper layer of calculation units, and decomposing the upper layer of fractal instruction into a plurality of serial sub-instructions. The serial decomposer obtains the upper layer of fractal instruction from the instruction queue and decomposes the fractal instruction into a plurality of serial sub-instructions. The decomposition method is shown in the embodiment of FIG. 8, and these serial sub-instructions are temporarily stored in the sub-instruction queue.

A step 1802 includes decoding the plurality of serial sub-instructions into local fractal instructions according to the hardware resources of the computation units in this layer. An instruction decoding unit is configured to decode the plurality of serial sub-instructions into local fractal instructions according to the hardware resources of the calculation units, where the hardware resources include the capacity limitation of the local memory, the ability of the serial decomposer to decompose the upper layer of fractal instruction, the calculating power and the number of the fractal functional unit, and the like.

A step 1803 includes issuing the local fractal instructions to the lower layer of calculation units to generate a calculation result. The operation execution unit includes a plurality of fractal functional units configured to execute an issued task. After receiving the fractal instruction from the parallel decomposer and the corresponding data from the DMA, the fractal functional units execute the calculation task. As mentioned above, the fractal functional units are the calculation units of the next layer, so the operation execution unit sends the fractal instruction and corresponding data to the calculation units of the next layer, and sends back the calculation result after the calculation is finished.

This embodiment defines how two adjacent hierarchical structures cooperate to reduce granularity, thereby inheriting tasks from a higher hierarchical structure to a lower hierarchical structure. More specifically, in this embodiment, the collaboration mechanism is divided into two relationships; the relationship with a parent node and the relationship between nodes at a same level. In the step 1801, the parent-child relationship (the relationship between upper and lower layers) is defined, and in the step 1802, the relationship of nodes at the same level (the relationship between fractal functional units) is defined. No matter how complex a task is, the operation of STMH can be clearly defined.

Figure 19:
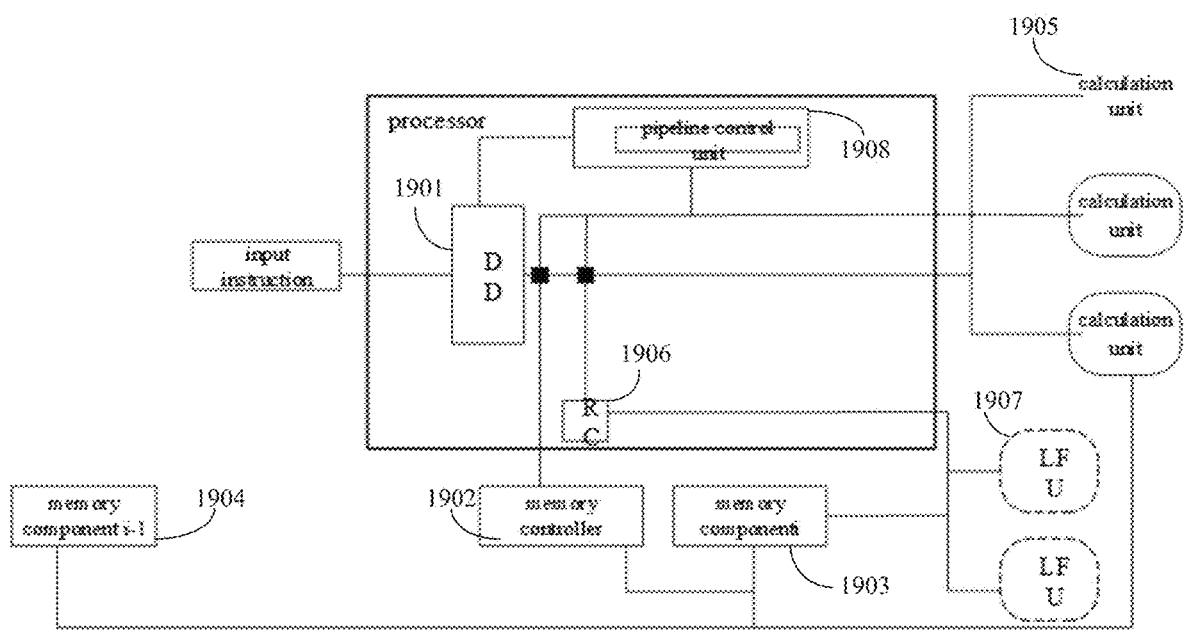
FIG. 19 is a block diagram of calculation units according to another embodiment of the present disclosure.

FIG. 19 is a block diagram of calculation units according to another embodiment of the present disclosure. As shown in FIG. 19, an input end of a decoder 1901 receives an input instruction, an output end of the decoder 1901 is connected to an input end of a memory controller 1902, and a memory component may be connected to a memory component of the upper layer of calculation units and a memory component of the lower layer of calculation units of any calculation unit through a data path. A memory controller 1902 is connected to the data path, a memory component i 1903 is connected to a memory component i 1904, where the memory component i 1904 may refer to the memory component of the upper layer of calculation units of the current calculation unit. The memory component i 1903 is corrected to the lower layer of calculation units and may refer to the memory component of the lower layer of calculation units, and the memory component 1902 is connected to the data path between the memory components. The data path transmits data from a memory component to another memory component under the control of the memory controller 1902. The output end of the decoder 1901 is further connected to an input end of a calculation unit 1905 of the lower layer and an input end of a reduction controller 1906, where the reduction controller 1906 is connected to a local functional unit 1907.

The decoder 1901 is used for ID, and the memory controller 1902 is used for data ID, which means to load an operand of the input instruction from the memory component of the upper layer of calculation units to a local memory component. The reduction controller 1906 is configured to control an LFU to execute the operation RD to obtain a calculation result of the input instruction. The memory controller 1902 is further configured to write the calculation result back to the memory component of the calculation unit in the upper layer of any calculation unit.

The differences from the foregoing embodiments are that a pipeline control unit 1908 is connected to the decoder 1901, the reduction controller 1906, the memory controller 1902 and the lower layer of calculation units 1905, and the pipeline control unit 1908 synchronizes a plurality of stages according to the decoder 1901, the reduction controller 1906, the memory controller 1902, and the lower layer of calculation units 1905. For example, after the pipeline control unit 1908 receives first feedback signals transmitted by the decoder 1901, the memory controller 1902, the lower layer of calculation units 1905 and the reduction controller 1906, the pipeline control unit 1908 controls the pipeline to propagate forward in order, where the first feedback signal may be a signal at a corresponding stage when the decoder 1901, the memory controller 1902, the lower layer of calculation units 1905 and the reduction controller 1906 have processed a current instruction.

Exemplarily, it is supposed that there are an input instruction 1, an input instruction 2, an input instruction 3, an input instruction 4, an input instruction 5 and an input instruction 6. The memory controller 1902 writes back the input instruction 1, the reduction controller 1906 controls the local functional unit 1907 to perform operation RD on the input instruction 2, the lower layer of calculation units 1905 execute the operation EX on the input instruction 3, the memory controller 1902 executes the data LD on the input instruction 4, and the decoder 1901 executes the ID on the input instruction 5. After the first memory controller 1902, the reduction controller 1906, the lower layer of calculation units 1905 and the decoder 1901 execute the processing of corresponding stage of the current instruction, the first feedback signal may be transmitted to the pipeline control unit 1908. After receiving the first feedback signal transmitted by the memory controller 1902, the reduction controller 1906, the lower layer of calculation units 1905 and the decoder 1901, the pipeline control unit 1908 may control the pipeline to propagate forward in order; the memory controller 1902 writes back the input instruction 2, the reduction controller 1906 controls the local functional unit 1907 to perform operation RD on the input instruction 3, the lower layer of calculation units 1905 execute the operation EX on the input instruction 4, the memory controller 1902 executes the data LD on the input instruction 5, and the decoder 1901 executes the ID on the input instruction 6.

This embodiment has the structure as shown in FIG. 6. The calculation units may further include pipeline latches 601-604, which locate between the ID and the data LD, the data LD and the operation EX, the execution EX and the operation RD, and the operation RD and the data WB. In more detail, the pipeline latch 601 locates in front of the DMAC 507, the pipeline latch 602 locates in front of the fractal functional unit 505, the pipeline latch 603 locates in front of the local functional unit 506, and the pipeline latch 604 locates in front of the DMAC 507. The pipeline latches 601 to 604 are configured to cache the instructions to be processed in the next stage. A pipeline control unit of the controller controls the pipeline latches 601 to 604 to synchronize the plurality of stages.

After receiving the first feedback signal transmitted by the decoder 502, the DMA 508, the fractal functional unit 505 and the reduction controller 509, the pipeline control unit transmits the first control signal to each pipeline latch respectively, and each pipeline latch updates the output according to the first control signal. The first control signal may be a high level signal or a low level signal, which is not limited by the present disclosure. Updating the output means that when a pipeline latch receives the first control signal, the output varies with the parallel sub-instructions of the input or the control signal related to the operation of the input instruction, where the parallel sub-instructions of the input or the control signal related to the operation of the input instruction are input from the left of the pipeline latch in FIG. 6.

Still taking the input instruction 1, the input instruction 2, the input instruction 3, the input instruction 4, the input instruction 5 and the input instruction 6 described above as examples, the processing process for the pipeline will be explained in combination with FIG. 6.

(1.1) The DMAC 507 receives the control signal output by the pipeline latch 604, and controls the DMA 508 to perform data WB the input instruction 1 according to the control signal;

(1.2) the local functional unit 506 receives the control signal output by the pipeline latch 603, executes the operation RD on the input instruction 2, and stores the reduction result (the calculation result of the input instruction 2) into the memory component;

(1.3) the fractal functional unit 505 receives the parallel sub-instructions (obtained by decomposing the input instruction 3) in the pipeline latch 602, executes the operation EX on the input instruction 3, and writes back the calculation result into the memory component;

(1.4) the DMAC 507 receives the control signal transmitted by the pipeline latch 601, controls the DMA 508 to load the operands of the input instruction 4 into the memory component according to the control signal;

(1.5) the decoder 502 executes the ID on the input instruction 5, and transmits the decoded input instruction 5 to the parallel decomposer 504 and the reduction controller 509, caches control signals related to data LD, data WB, etc. into the pipeline latch 601; the parallel decomposer 504 executes the parallel decomposing on the decoded input instruction 5 to obtain parallel sub-instructions, and caches the parallel sub-instructions into the pipeline latch 601; and the reduction controller 509 caches a control signal corresponding to the operation RD executed on the input instruction 5 into the pipeline latch 601.

After completing the process of the corresponding stages of the current instructions, the DMAC 507, the reduction controller 509, the fractal functional unit 505 and the decoder 502 may transmit the first feedback signal to the pipeline control unit. After receiving the first feedback signal transmitted by the DMAC 507, the reduction controller 509, the fractal functional unit 505 and the decoder 502, the pipeline control unit may transmit the first control signal to each of the pipeline latch and controls the pipeline to propagate forward in order. After each pipeline latch receives the first control signal, the output control signal varies with the input signal. For example, (1) a control signal corresponding to the data WB executed on the input instruction 2 is output from the pipeline latch 604; and a control signal corresponding to the data WB executed on the input instruction 3 is output from the pipeline controller 603 to the pipeline latch 604; (2) a control signal corresponding to the operation RD executed on the input instruction 3 is output from the pipeline latch 603; a control signal corresponding to the operation RD executed on the input instruction 2 is output from the pipeline controller 602 to the pipeline latch 603, and a control signal corresponding to the operation RD executed on the input instruction 1 is output from the pipeline controller 601 to the pipeline latch 602; (3) a piece of parallel sub-instruction of the input instruction 4 is output from the pipeline latch 602; and a piece of parallel sub-instruction of the input instruction 5 is output from the pipeline latch 601 to the pipeline latch 602; (4) a control signal corresponding to the data LD executed on the input instruction 5 is output from the pipeline latch 601; (5) the input instruction 6 is input into the decoder 502, and then the decoder 502 executes the ID on the input instruction 6, transmits the decoded input instruction 6 to the parallel decomposer 504 and the reduction controller 509, and caches the control signals related to data LD, data WB, etc. into the pipeline latch 601; the parallel decomposer 504 performs the parallel decomposing on the decoded input instruction 6 to obtain the parallel sub-instructions, and caches the parallel sub-instructions into the pipeline latch 601; and the reduction controller 509 caches the control signal corresponding to the operation RD executed on the input instruction 6 into the pipeline latch 601. The execution processes of the DMAC 507, the reduction controller 509, the fractal functional unit 505 and the decoder 502 are as follows:

(2.1) the DMAC 507 receives the control signal output by the pipeline latch 604, and controls the DMA 508 to perform data WB on the calculation result of the input instruction 2;

(2.2) the local functional unit 506 receives the control signal output by the pipeline latch 603, obtains the execution result after performing the operation EX on the input instruction 3 from the memory component according to the control signal, performs the operation RD on the input instruction 3, and stores the reduction result (the calculation result of the input instruction 3) into the memory component;

(2.3) the local functional unit 505 receives the control signal output by the pipeline latch 602, obtains the execution result after performing the operation EX on the input instruction 4 from the memory component according to the control signal, performs the operation EX on the input instruction 4, and stores the reduction result (the calculation result of the input instruction 3) into the memory component;

(2.4) the DMAC 507 receives the control signal transmitted by the pipeline latch 601, controls the DMA 508 to load the operands of the input instruction 5 into the memory component according to the control signal;

(2.5) the decoder 502 obtains the input instruction 6 from the sub-instruction queue 503, and performs the ID on the input instruction 6.

In some embodiments, when the decoder 502 obtains the serial sub-instructions from the sub-instruction queue 503, it may detect the data dependency condition of the serial sub-instructions. If the data depending of the serial sub-instructions is detected, the decoder 502 may stop obtaining the serial sub-instructions from the sub-instruction queue 503.

The data dependency among the serial sub-instructions may refer that there is overlapping between the input operands of the serial sub-instructions currently being decoded and the output operands of a plurality of previous serial sub-instructions. The number of pieces of a plurality of previous serial sub-instructions may be determined according to the grades of the pipeline, for example, in the example of the five-stage pipeline of the embodiment, the output operands of a plurality of previous serial sub-instructions may refer to the previous four serial sub-instructions. There is overlapping between the input operands of the serial sub-instructions currently being decoded and the output operands of a plurality of previous serial sub-instruction, which means that the input operands of the serial sub-instructions currently being decoded overlaps with any one or more of the plurality of the output operands of a plurality of previous serial sub-instructions, which is not limited in the present disclosure.

There is overlapping between the input operands of the serial sub-instructions currently being decoded and the output operands of a plurality of previous serial sub-instructions; in other words, the input operands of the serial sub-instructions currently being decoded are a part or all of the plurality of previous serial sub-instructions. Therefore, the input operands of the serial sub-instructions currently being decoded can be loaded only if the output operands are obtained after the previous a plurality of serial sub-instructions have been processed. Therefore, the propagation of the pipelines is suspended until completing running the previous a plurality of serial sub-instructions to obtain the output operands, then the propagation process of the pipeline can be continued. The specific process may be; the decoder 502 stops obtaining the serial sub-instructions from the sub-instruction queue 503, the output of the decoder 502 does not changes, the first pipeline latch 601 behind the decoder 502 does not output a control signal of the Latch but outputs a bubble control signal, and each of the functional components that received the bubble control signal does not perform an operation but transmits the first feedback signal to the pipeline control unit immediately. The pipeline control unit continue to transmit the first control signal under the primary condition, makes the pipeline continue performing with the bubble infused by the first pipeline latch 601 until the data dependency is resolved. After the data dependency is resolved, the decoder 502 continues to obtain instructions from the sub-instruction queue 503, and the first pipeline latch 601 continues to output the control signal of the latch.

According to the pipeline control process of the above-mentioned implementation, the progress of the pipeline may be controlled flexibly to avoid a wrong calculation result.

When the decoder 502 detects that there is no overlapping between the input operands of the serial sub-instructions currently being decoded and the output operands of the plurality of the previous serial sub-instructions, the serial sub-instructions currently being decoded are decoded and then pre-loaded on the fractal functional unit 505.

It is known according to the process described above that for a piece of serial sub-instruction, after being decoded, it may be loaded on the fractal functional unit 505 to perform the operation EX after the data LD has been completed. According to the above-mentioned example, when the fractal functional unit 505 executes the operation EX on the input instruction 4 in (2.3), (2.5) the decoder 502 obtains the input instruction 6 from the sub-instruction queue 503, and executes the ID on the input instruction 6. The parallel sub-instructions of the input instruction are cached into the pipeline latch 601 but is not loaded on the fractal functional unit 505; the parallel sub-instructions will be loaded on the fractal functional unit 505 until the next first control signal comes.

In a condition that there is no overlapping between the input operands and the output operands of the previous plurality of the serial sub-instructions, the decoder 502 may transmit a pre-loading signal to the pipeline control unit. If the fractal functional unit 505 has finished the operation EX on the parallel sub-instructions of the input instruction 4, and has transmitted the first feedback signal to the pipeline control unit, at this time, the pipeline control unit may transmit the first control signal to the pipeline latch 601 according to the pre-loading signal. The pipeline latch 601 outputs the parallel sub-instructions of the input instruction 6 to the fractal functional unit 505 in advance, to make the fractal functional unit 505 execute the operation EX on the input instruction 6 in advance, thereby improving the calculation efficiency of the calculating device.

In the above-mentioned examples, to determine whether there is an overlapping between the input operands of the serial sub-instructions currently being decoded and the output operands of the previous plurality of the serial sub-instructions, the decoder 502 may detect the address of the output operands of the previous plurality of (e.g. 5) and the address and the size descriptor of the input operands of the serial sub-instructions currently being decoded.

By adopting the above-mentioned method provided in the embodiment, in a condition that there is no overlapping between the input operands and the output operands of the previous plurality of the serial sub-instructions, pre-loading may improve the processing speed and improve the processing efficiency of the calculating device.

The technology disclosed in the present disclosure has the following advantages: machine learning computational primitives may be regarded as fractal computations, which may be iteratively decomposed into several smaller self-similar computations; the architecture put forward in the present disclosure is a series of isomorphic, serial, multi-layer, and similar-layer fractal calculating devices with a fractal von Neumann architecture and the same instruction set, which may realize the simple programming and high efficiency.

Figure 20:
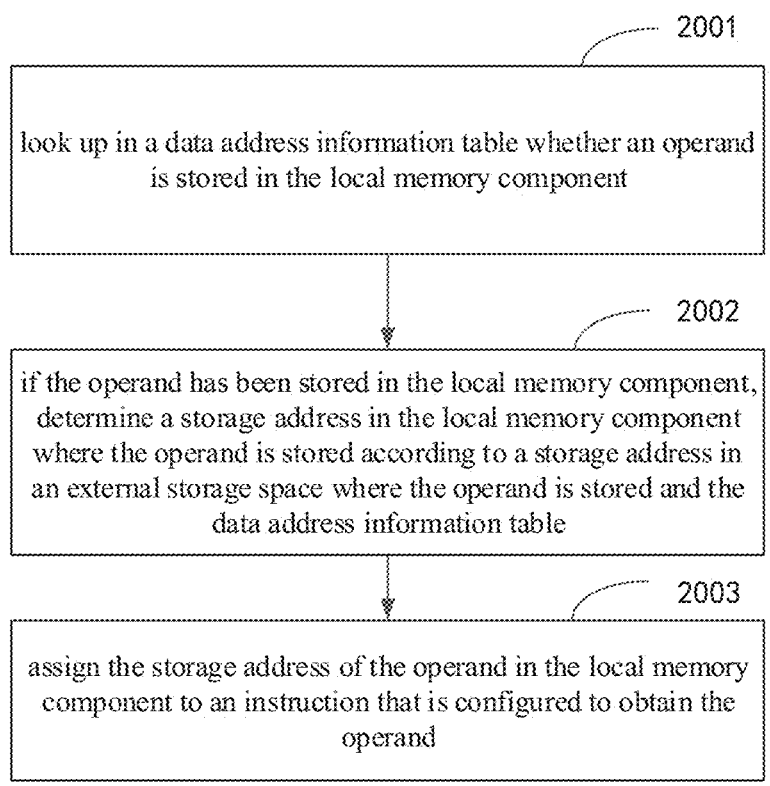
FIG. 20 is a flowchart of a method for obtaining an operand according to another embodiment of the present disclosure.

FIG. 20 is a flowchart of a method for obtaining an operand according to another embodiment of the present disclosure. As described in FIG. 20, the method may include:

a step 2001, looking up in a data address information table whether an operand is stored in the local memory component;

a step 2002, if the operand has been stored in the local memory component, determining a storage address in the local memory component where the operand is stored according to a storage address in an external storage space where the operand is stored and the data address information table; and a step 2003, assigning the storage address of the operand in the local memory component to an instruction that is configured to obtain the operand.

After a processor receives a data loading instruction, the data loading instruction may be performed to load the operands on the local memory component. Specifically, the data loading instruction is bound with the storage address of the operands on an external storage space, according to the data loading instruction (the bound storage address), a control signal of data to be loaded is generated, and the data loading process is performed by a second memory controller according to the control signal.

According to an embodiment of the present disclosure, before generating a loading operand of the control signal of data to be loaded, the step 2001 may be performed to look up in a data address information table whether an operand to be loaded is stored in the local memory component.

As described above, the address correspondence may be recorded in the data address information table. When the storage address of all the operands in the external storage space is included in the address correspondence, it can be ensured that the operands are stored in the local memory component. When the address correspondence does not include the storage address of all the operands in the external storage space, it can be ensured that the operands are not stored on the local memory component. Specifically, whether the operand is stored in the local memory component can be looked up in the storage address in the external storage space recorded in the data address information. In other words, it is supposed that an operand to be loaded had been stored before, the correspondence between the storage address of the operation in the external storage space and the storage address on the local memory component will be recorded in the data address information table. When the same operand is loaded the next time, if it is found that the storage address in the external storage space recorded in the data address information table include the storage address in the external storage space of the operand to be loaded, it means that the operand to be loaded has been stored on the local memory component and can be used directly without being loaded again.

Exemplarily, in some conditions, an operand may be not just a number, but may be a plurality of numbers or vectors, matrices, tensors including a plurality of numbers. In this case, the storage address of the operand bound with the data loading instruction in the external storage space may be the address of a section of the storage space. When the storage address in the external storage space in the address correspondence includes the storage address of the operand bound with the data loading instruction in the external storage space, it can be ensured that the operand is stored in the local memory component; when the storage address in the external storage space in the address correspondence does not include or just includes a part of the storage address of the operand bound with the data loading instruction in the external storage space, it can be ensured that the operand is not stored in the local memory component.

In some embodiments, the method of examining whether two addresses are in an containment relationship may do not transverse the address of all data in the operands, but just exam whether the data address of two points of the operand locates in the storage address of the external storage space in any one of the address correspondence recorded in the data address information table. For example, if the operand is a matrix, it only needs to exam whether the data storage address of two vertices on the diagonal of the matrix is included by the storage address of the external storage space in any one of the address correspondence in the data address information table, it does not need to exam whether each of the data storage address in the matrix is included by the storage address of the external storage space in any one of the address correspondence recorded in the data address information table. Generalized to an N-dimensional space, in a two parallel hypercubes in the N-dimensional space, it only needs to exam whether the storage address of the data of the two vertices on the main diagonal of the operand is included by the storage address of the external storage space in any one of the address correspondences recorded in the data address information table. The hardware structure of each entry can be provided with two discriminators in addition to the registers required for entry recording. The two discriminators may be configured to determine whether the vertices on the two diagonals meet the inclusion conditions. If the two discriminators determine that the vertices on the two diagonals meet the inclusion conditions, the entry is considered to be a hit. In other words, the storage address of the operand to be queried in the external storage space falls into the storage address of the external storage space in the (table entry) address correspondence relationship, indicating that the operand to be queried has been stored on the local memory component. For example, it is supposed that:
  recording table entries: 10000[10, 11][1, 2][20, 21], and
  entries to be inquired: 10053[4, 5][6, 7][18,19].

According to the granularity of the recording table entries, it can be known that the conditions for the data with address 10000+21*x1+x0 to be in this tensor am:

$$0 <= x0 < 21$$
$$0 <= x0 < 21$$
$$2 <= x0 < 2 + 11$$
$$0 <= x1 < 20$$
$$1 <= x1 < 1 + 10.$$

According to the granularity of the entries to be inquired, it can be known that the conditions for the data with address 10053+19*y1+y0 to be in this tensor are:

$$0 <= y0 < 19$$
$$7 <= y0 < 7 + 5$$
$$0 <= y1 < 18$$
$$6 <= y1 < 6 + 4.$$

The two vertices on the main diagonal of the query item are examined: the point where y0 and y1 take the minimum value and the point where y0 and y1 take the maximum value at the same time correspond to the minimum value and the maximum value in the data address range. The minimum value is y0=7, y1=6, and the address is 10174; the maximum value is y0=11, and the address is 10235.

If it is required to examine whether 10174 and 10235 are located inside the recording entries, the coordinates x0 and x1 must first be calculated Making $$10000 + 21 * x1 + x0 = 10174$$
$$21 * x1 + x0 = 174.$$

Because the constant (1) of the low-dimensional variable (x0) is always a factor of the constant (21) of the high-dimensional variable (x1), it is only necessary to do integer division to solve this equation. (When the dimension is 1, the equation can be solved directly; when the dimension is 2, an integer division is needed to solve the equation; when the dimension is n, n−1 consecutive integer divisions are needed to solve this equation, where each time the remainder is used as the dividend, and the value is assigned from the high dimension to the low dimension in turn), 174/21=8 with a remainder of 6, the mantissa 6 is discarded, set x1=8, then x0*6. In this way, the unique solution of x can be obtained.

Next, whether x1=8 and x0=6 satisfy the condition that a point is inside the tensor is determined. Since 1<=x1<11, 2<=x0<13, this point is inside the tensor.

The above discriminator requires a subtractor (10174-10000), n integer dividers, and 2n comparators, n is the largest dimension, and n is less than or equal to 8.

Two discriminators determine the two vertices separately. If both discriminators give a positive determination, the entry is considered to be a hit.

Because there are not many tensors processed in the operation, there is no need to reserve many items in each tensor permutation table, for example, 8 to 32 items can be reserved. When making a query, the maximum and minimum addresses are calculated first, and the addresses are broadcast to the two discriminators of each tensor permutation table and each record. Both discriminators work at the same time, and the tensor permutation table only needs to return any entry that gives a positive determination.

For the step 2002, if it is determined that the operand has been stored on the local memory component, the storage address of the operand in the local memory component may be determined according to the storage address of the operand in the external storage space and the address correspondence recorded in the data address information table. Specifically, the storage address in the local memory component corresponding to the storage address of the operand in the external storage space in the address correspondence is used as the storage address of the operand in the local memory component. For example, as shown in Table 1, if the storage address of the operand in the external storage space is Out_addr1, then according to the address correspondence in Table 1, it can be determined that the storage address of the operand in the local memory component is In_addr1; or, if the storage address of the operand in the external storage space is a part of Out_addr1, then according to the address correspondence, the corresponding part in In_addr1 can be determined as the storage address of the operand in the local memory component. Specifically, Out_addr1 is addr11~addr12, the storage address of the operand in the external storage space is addr13~addr14 in addr11~addr12, then the address corresponding to the addr13~addr14 in In_addr1 is the storage address of the operand in the local memory component.

For the step 2003, the instruction to obtain the operand may refer to a data loading instruction. After the storage address of the operand in the local memory component is determined in the step 2002, the storage address of the operand in the local memory component can be bound to the data loading instruction corresponding to the operand, so that the processor can directly execute the data loading instruction and obtain the operand from the local memory component, eliminating the process of loading the operand from the external storage space to the local memory component, and saving bandwidth resources.

Figure 21:
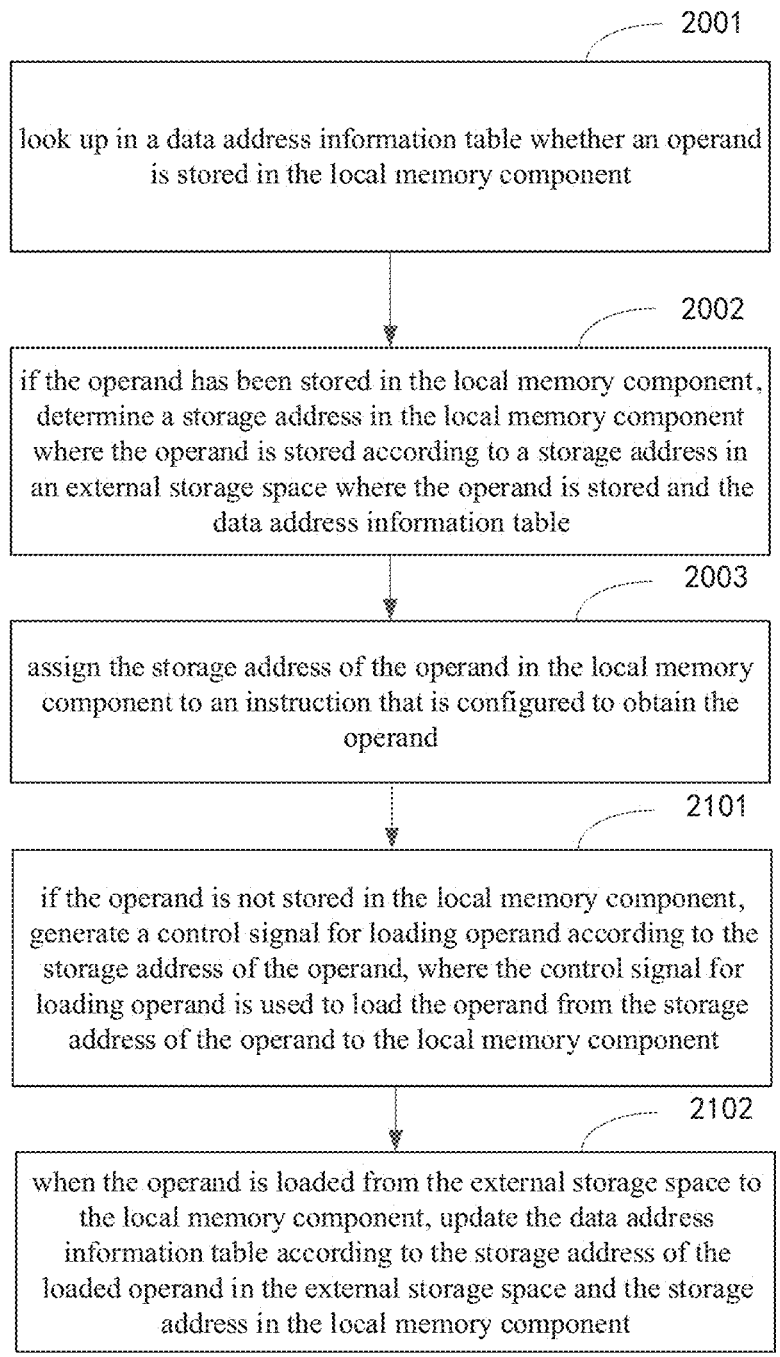
FIG. 21 is a flowchart of a method for obtaining an operand according to another embodiment of the present disclosure.

FIG. 21 is a flowchart of a method for obtaining an operand according to another embodiment of the present disclosure. As described in FIG. 21, the method may include:
  a step 2101: if the operand is not stored in the local memory component generating a control signal for loading operand according to the storage address of the operand, where the control signal for loading operand is used to load the operand from the storage address of the operand to the local memory component; and
  if the operand is not stored in the local memory component, loading the operand from the external storage space to the local memory component according to the normal process. The specific process may be: allocating storage space for the operand in the local memory component; determining the address of the allocated storage space; generating the control signal for loading operand according to the storage address of the operand bound by the data loading instruction and the address of the allocated storage space; transmitting the control signal for loading operand to a second memory controller, and loading, by the second memory controller, the operand from the storage address of the operand to the local memory component according to the control signal.

In some embodiments, as described in FIG. 21, the method may further include:
  a step 2102, when the operand is loaded from the external storage space to the local memory component, updating the data address information table according to the storage address of the loaded operand in the external storage space and the storage address in the local memory component.

In some embodiments, the loaded operand overwrites the operand originally stored in the local memory component, and the address correspondence between the storage address of the loaded operand in the external storage space and the storage address of the loaded operand in the local memory component may be used to replace the address correspondence of the above-mentioned originally stored operand in the data address information table. The specific process may also be like this: first determining whether the storage address of the recorded operand in the external storage space overlaps with the storage address in the external storage space in the address correspondence, where if the storage address of the recorded operand in the external storage space overlaps with the storage address in the external storage space in the address correspondence, the original recorded address correspondence may be invalidated, and the address correspondence of the newly loaded operand is recorded; in other words, the correspondence between the storage address of the loaded operand in the external storage space and the storage address of the loaded operand in the local memory component is recorded.

For example, as shown in Table 1, the processor allocates the memory space of In_addr1 to the above operand, and the loaded operand overwrites the data originally stored in the memory space of In_addr1. At this time, the address correspondence between Out_addr1 and In_addr1 in the data address information table can be invalidated and replaced with the address correspondence between Out_addr3 and In_addr1. It should be noted that the above is only an example of the present disclosure, and does not limit the present disclosure in am way. For example, In_addr1 represents a section of memory space, and the processor only allocates a part of the memory space In_addr3 to the above operand, then the address correspondence between Out_addr3 and In_addr3 may be used to replace the original address correspondence between Out_addr1 and In_addr1.

In some embodiments, the original address correspondence in the data address information table is replaced with the correspondence between the storage address of the loaded operand in the external storage space and the storage address of the loaded operand in the local memory component. In this embodiment, only the address correspondence of the most recently loaded operand is recorded in the data address information. Therefore, when the operand is loaded from the external storage space to the local memory component, the original address correspondence in the data address information table may be directly replaced with the correspondence between the storage address of the loaded operand in the external storage space and the storage address of the loaded operand in the local memory component. The specific process may also include the above invalid process; in other words, an aging time can be set. After an address correspondence is recorded, timing can be started. When the aging time is reached, the corresponding address correspondence can be set to be invalid. When a new operand is to be loaded, even if it is found in the data address information table that the local memory component has stored the operand to be loaded, but because the address correspondence is invalid, the returned result is that the operand to be loaded is still not stored in the local memory component.

The span of the aging time may be set according to the balance between the requirements for bandwidth and efficiency, and the present disclosure does not specifically limit the span of the aging time. In some embodiments, the aging time may be set to be greater than or equal to two pipeline cycles, and one pipeline cycle may refer to the time required for the pipeline of the calculating node to propagate one stage forward.

In other words, for the step 2001, when the address correspondence is valid and the storage address in the external storage space in the address correspondence includes the storage address of the operand to be loaded in the external storage space, a result that the operand has been stored in the local memory component will be returned. If any one of the above two conditions is not met, the result that the operand has been stored in the local memory component will not be returned. For example, if the address correspondence is invalid, the result that the operand has been stored in the local memory component will not be returned; or, the address correspondence is valid, but the storage address in the external storage space in the address correspondence does not include the storage address of the operand to be loaded in the external storage space, the result that the operand has been stored in the local memory component will not be returned.

In some embodiments, an invalid identification bit of the address correspondence may be recorded in the data address information table. The invalid identification bit may indicate whether the address correspondence is valid. For example, the invalid identification bit being 1 indicates that the address correspondence is valid, and the invalid identification bit being 0 indicates that the address correspondence is invalid. Correspondingly, after an address correspondence is recorded, the corresponding invalid identification bit may be set to 1, and when the aging time is reached, the invalid identification bit may be set to 0.

According to the method for obtaining operand in the foregoing embodiments of the present disclosure, when the operand has been stored in the local memory component, the processor can directly execute the data loading instruction to obtain the operand from the local memory component, eliminating the process of loading operand from external storage space to local memory component and saving bandwidth resources.

Although the foregoing embodiments can achieve high programming efficiency while maintaining high performance and energy efficiency, if an operation is not overwritten by the fractal instruction set in Table 2, this operation may only be simulated by combining the primitives of the fractal instruction set in Table 2, which makes the implementation relatively inefficient.

From the perspective of complexity, the present disclosure further considers the influence of calculation inefficiency (time complexity) and communication inefficiency (communication complexity). The calculation inefficiency means that, for the effective fractal calculation on the fractal calculating device, the obtained speedup is not related to the granularity of the calculation, where the speedup is defined as the ratio of the calculation time of the leaf calculation unit to the entire calculating device. However, if it is necessary to simulate a specific operation by combining the primitives of the fractal instruction set in Table 2, the actual speedup is related to the granularity, which means that the indirect support of the fractal instruction set may make the time complexity worse.

As for communication inefficiency, for the effective fractal calculation on the fractal calculating device, the data flow ratio is independent of the granularity of the calculation, where the data flow ratio is defined as the ratio of data communication performed on the entire fractal calculating device. For example, when a three-dimensional convolution (Conv3D) is calculated, if the fractal instruction set primitives of a two-dimensional convolution are used indirectly in the fractal instruction, the communication between layers may become frequent. Although the time complexity remains the same, the large amount of data traffic generated by the inefficient communication will be a hundred or even a thousand times higher than the data traffic generated by directly using the calculation primitives of Conv3D.

The above two inefficient situations are caused the inability of the fractal instruction set to directly support all operations. If these inefficient operations can only be achieved by combining fractal instructions, the speed of the fractal calculating device will be severely limited.

In order to solve the problem of inefficiency, the present disclosure proposes an FRISA (fractal reconfigurable instruction set architecture) for the fractal calculating device. By using the FRISA, the fractal instructions are redefined and the fractal instructions of Table 2 in the FRISA are reintegrated to generate a lower-level intuitive local instruction, and more effective support is provided for the fractal instructions. The local instructions of the FRISA are shown in Table 3.

TABLE 3

| local instruction set | | |
| --- | --- | --- |
| Type | Operation | Name |
| data move | display tensor movement | tmove |
| computation | element-wise nonlinear transformation | veltw |
| | additional (vector, scalar, mix) | vadd, sadd, vsadd |
| | horizontal maximize/ logic ANY | hmax |
| | matrix multiplication | mmul |
| logic | XOR | vxor, sxor |
| | greater than | vgt, sgt |
| miscellaneous | randomly generate vectors | vrng |
| | count types | vpopcnt |
| | merge ordered sequences | vmerge |

Figure 22:
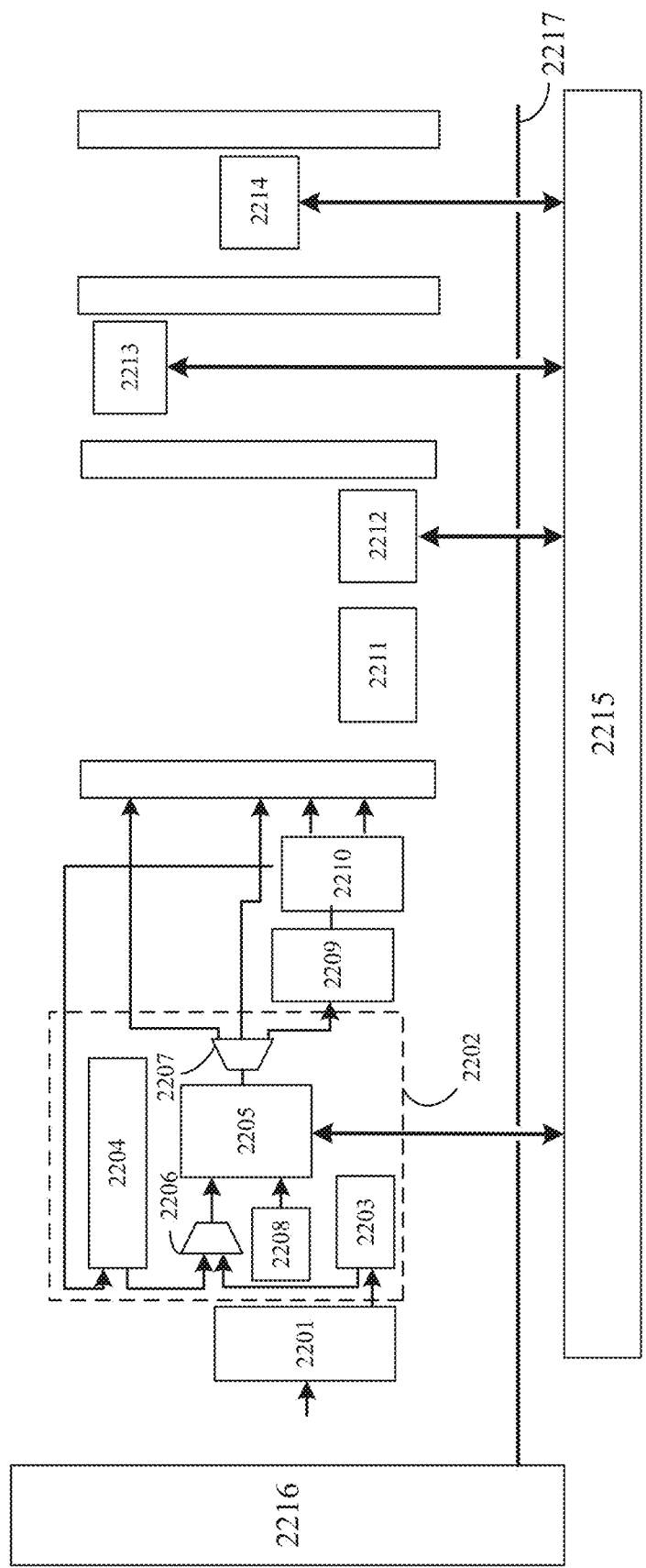
FIG. 22 is a schematic diagram of a fractal calculating device according to another embodiment of the present disclosure.

Another embodiment of the present disclosure provides a fractal calculating device including a plurality of middle layer of calculation units with the same structure, and the structure of each layer of calculation units is shown in FIG. 22. Compared with the embodiment of FIG. 15, an instruction queue 2201 is equivalent to the instruction queue 1501, a sub-instruction queue 2209 is equivalent to the sub-instruction queue 1503, a down-layer decoder 2210 is equivalent to the down-layer decoder 1505, a DMA controller 2211 is equivalent to the DMA controller 1510, a DMA 2212 is equivalent to the DMA 1511, a fractal functional unit 2213 is equivalent to the fractal functional unit 1512, a local functional unit 2214 is equivalent to the local functional unit 1513, a local memory 2215 is equivalent to the local memory 1514, an upper layer of memory 2216 is equivalent to the upper layer of memory 1515, and a bus 2217 is equivalent to the bus 1516.

The middle-layer of calculation units may include a controller configured to decompose the instructions sent by the upper layer of calculation units into a plurality of fractal instructions, where each fractal instruction performs a specific operation. In more detail, the controller provided in this embodiment includes an instruction queue 2201, a decoder 2202, a sub-instruction queue 2209, and a down-layer decoder 2210. The instruction queue 2201 receives and temporarily stores the instructions (fractal instructions) sent by the upper layer of calculation units. The decoder 2202 includes a serial decomposition stack 2203, a parallel decomposition stack 2204, a decoding controller 2205, a multiplexer 2206, a demultiplexer 2207, and an ROM (read-only memory) 2208.

The serial decomposition stack 2203 and the parallel decomposition stack 2204 are a kind of stacks, which belong to a linear table with limited operations, and are limited to linear tables that only perform insertion and deletion operations at the end of the table. When an instruction enters the stack, the instruction is put on the top of the stack, and becomes a new element on the top of the stack; when the instruction is fetched, the element is deleted from the stack, also known as unstacking; in other words, the element on the top of the stack is deleted, so that the adjacent element becomes the new element on the top of the stack. The serial decomposition stack 2203 obtains and temporarily stores the upper layer of fractal instructions from the instruction queue 2201. The decoding controller 2205 may perform functions similar to that of the serial decomposer 1502. Based on the instructions in the read-only memory 2208, the upper layer of fractal instructions are decomposed into a plurality of serial sub-instructions. If there is an input dependency between these serial sub-instructions, the decoding controller 2205 also generates intermediate data reflecting the dependency.

A parallel decomposition stack 2204 is configured to temporarily store the lower layer of instructions. The decoding controller 2205 may also perform functions similar to that of the parallel decomposer 1506 and the reduction controller 1507, decomposing the lower layer of instructions into fractal instructions and local instructions in parallel. The fractal instructions are used to control the fractal functional unit 2213 to perform the fractal operation, and the local instructions are used to control the local functional unit 2214 to perform the reduction operation. In more detail, the decoding controller 2205 binds the local address of the local memory 2215 to the operand of the fractal instruction according to the operand of the lower layer of instructions.

In more detail, the decoding controller 2205 is electrically connected to the serial decomposition stack 2203 and the parallel decomposition stack 2204. When the decoding controller 2205 is electrically connected to the parallel decomposition stack 2204, the decoding controller 2205 fetches the lower layer of instructions from the parallel decomposition stack 2204 and decomposes the instructions into fractal instructions and local instructions; when the decoding controller 2205 is electrically connected to the serial decomposition stack 2203, the decoding controller 2205 fetches instructions from serial decomposition stack 2203 and decomposes the instructions into serial sub-instructions, and temporarily stores the serial sub-instructions in the sub-instruction queue 2209. The above are all based on the instruction operation of the read-only memory 2208.

The decoder 2202 also includes a multiplexer 2206 and a demultiplexer 2207. The multiplexer 2206 is connected to the parallel decomposition stack 2204 and the serial decomposition stack 2203 for selecting and the upper layer of fractal instructions or lower layer of instructions and input the selected upper layer of fractal instructions or lower layer of instructions to the decoding controller 2205. Since the output of the parallel decomposition stack 2204 is used by the calculation units in the operation EX stage and the operation RD stage, if the processing is not prioritized, it will easily lead to instruction blocked. Therefore, the priority of the parallel decomposition stack 2204 being electrically connected to the decoding controller 2205 is higher than the priority of the serial decomposition stack 2203 being electrically connected to the decoding controller 2205. In other words, when there are instructions temporarily stored in the parallel decomposition stack 2204, the multiplexer 2206 preferentially allows the instructions of the parallel decomposition stack 2204 to pass through and inputs the instructions to the decoding controller 2205 for processing; when there are no instructions in the parallel decomposition stack 2204, the multiplexer 2206 allows the instructions of the serial decomposition stack 2203 to pass through and inputs the instructions to the decoding controller 2205 for processing.

The demultiplexer 2207 is connected to the decoding controller 2205 to determine that the output of the decoding controller 2205 is sent to the sub-instruction queue 2209, the fractal functional unit 2213 or the local functional unit 2214.

When the decoding controller 2205 is electrically connected to the serial decomposition stack 2203, the demultiplexer 2207 makes the sub-instruction queue 2209 electrically connect to the decoding controller 2205, so the decoding controller 2205 can send the serial sub-instructions to the sub-instruction queue 2209 for temporary storage. The down-layer decoder 2210 is configured to sequentially obtain a plurality of serial sub-instructions from the sub-instruction queue 2209, generate a lower layer of instructions and a direct memory access instruction. These instructions have corresponding operands, and the down-layer decoder 2210 checks the storage requirements of these operands and generates a direct memory access instruction pointing to the local memory 2215. The down-layer decoder 2210 runs the pipeline according to the dependency between the operands of different instructions. For example, the down-layer decoder 2210 determines whether the dependency between these operands is a write-modify-read relationship. If the dependency between these operands is a write-modify-read relationship, the calculation of a specific operands must be completed first, and then the calculation result is written back to the local memory 2215, and the next instruction reads the calculation result and then performs the calculation. Any confusion in the sequence will result in calculation errors. In this case, the down-layer decoder 2210 will pause pipeline until the write-modify-read relationship ends. The lower layer of instructions of the down-layer decoder 2210 are transmitted to the parallel decomposition stack 2204 for the decoding controller 2205 to perform decomposition to obtain fractal instructions and local instructions.

After the parallel decomposition stack 2204 receives the lower layer of instructions, the multiplexer 2206 allows the lower layer of instructions to pass through and inputs the lower layer of instructions to the decoding controller 2205 for processing. The decoding controller 2205 performs functions similar to the parallel decomposer 1506 and the reduction controller 1507 according to the instructions in the read-only memory 2208, and decomposes the lower layer of instructions into fractal instructions and local instructions in parallel. At this time, the demultiplexer 2207 makes the decoding controller 2205 electrically connect to the a plurality of fractal functional units 2213, and sends the fractal instructions to the fractal functional units 2213; and then the demultiplexer 2207 makes the decoding controller 2205 electrically connect to the a plurality of local functional units 2214, and sends the local instructions to the local functional unit 2214.

In this embodiment, the data required for calculation is loaded from the upper layer of memory 2216 to the local memory 2215 through the DMA controller 2211 and the DMA 2212. The DMA controller 1510 makes a bus request to the system to take over the control of the bus 2217. After the system receives the signal, when the current bus cycle ends, the system may give up the control of the bus 2217 according to the priority of a direct memory access instruction and the request made by the DMA. Under the management of the DMA controller 2211, the data is loaded from the upper layer of memory 2216 to the local memory 2215. After the fractal functional units 2213 complete the task and returns the calculation result, the DMA 2212 stores the calculation result in the local memory 2215. After each data transfer is completed, the DMA controller 2211 will return the control right of the bus 2217.

Similar to the above embodiments, the fractal functional units 2213 are configured to execute an issued task. The DMA 2212 is stored in the local memory 2215, and sends data corresponding to the fractal instructions to the fractal functional units 2213. After receiving the fractal instructions from the parallel decomposer 2205 and the data from the DMA 2212, the fractal functional unit 2213s execute the calculation task; in other words, the fractal functional unit 2213s send the fractal instructions and corresponding data to the calculation units of the next layer, and wait for the calculations unit of the next layer to complete the calculation and return the calculation result.

After the fractal functional units 2213 produce the calculation result, the local functional unit 2214 reduces the calculation result according to a local instruction sent from the decoding controller 2205.

Finally, the DMA controller 2211 makes a bus request to the system to take over the control of the bus 2217. The system responds to the request made by the DMA to give up the control of the bus 2217, and the DMA 2212 transmits the reduced calculation result to the upper layer of memory 2216. After the reduced calculation result is transmitted, the DMA controller 2211 returns the control right of the bus 2217.

The local memory 2215 of this embodiment also has the structure shown in FIG. 7, including a static memory segment 701 and a loop memory segment 702. The static memory segment 701 is configured to store intermediate data and shared operands generated by the decoding controller 2205. The intermediate data refers to dependent data between serial instructions used for the decoding controller 2205 to perform the task of serial decomposition, for example, a second serial instruction may need to use the intermediate data of a first serial instruction; and the shared operands are some operands that will be shared between the sub-instructions. The decoding controller 2205 will store the dependent data in the static memory segment 701, and the intermediate data and shared operands are sequentially stored from both ends of the static memory segment 701 to the intermediate, the specific storage method is shown in FIG. 12.

The loop memory segment 702 is managed by the down-layer decoder 2210, and is configured to store the sub-data required to execute the serial instructions and the data of each level generated by the calculation of the sub-data in the five-stage pipeline. As shown in FIG. 10, the loop memory segment 702 of the local memory 2215 is divided into three sub-memory blocks 1001, 1002, 1003. Each sub-memory block stores specific sub-data required to execute the specific serial instructions and the data of each level generated by the specific sub-data in the five-stage pipeline. After the down-layer decoder 2210 obtains the serial sub-instructions from the sub-instruction queue 2209, the DMA 2212 sequentially performs data exchange between each sub-memory block and the upper layer of memory 2216 according to the local address. The operation details have been explained in the foregoing embodiment, and will not be repeated.

Similarly, the fractal calculating device provided in this embodiment includes a leaf calculation unit including a controller configured to decompose the upper layer of fractal instructions into local instructions and a functional unit configured to execute the local instructions, where the local instructions are the instructions listed in Table 3. For the specific operation method, please refer to the embodiment in FIG. 3.

The read-only memory 2208 stores a programming model configured to control the decoding controller 2205. Through the programming model, when performing the decomposition, the decoding controller 2205 generates a fractal instruction according to several predefined fractal options. The programming model selects the fractal options according to hardware characteristics. The differences from the foregoing embodiments lie in that this embodiment remains the original operation in the process of layer decomposition, which may avoid inefficient computation and communication in the process of computational primitive conversion.

Figure 23:
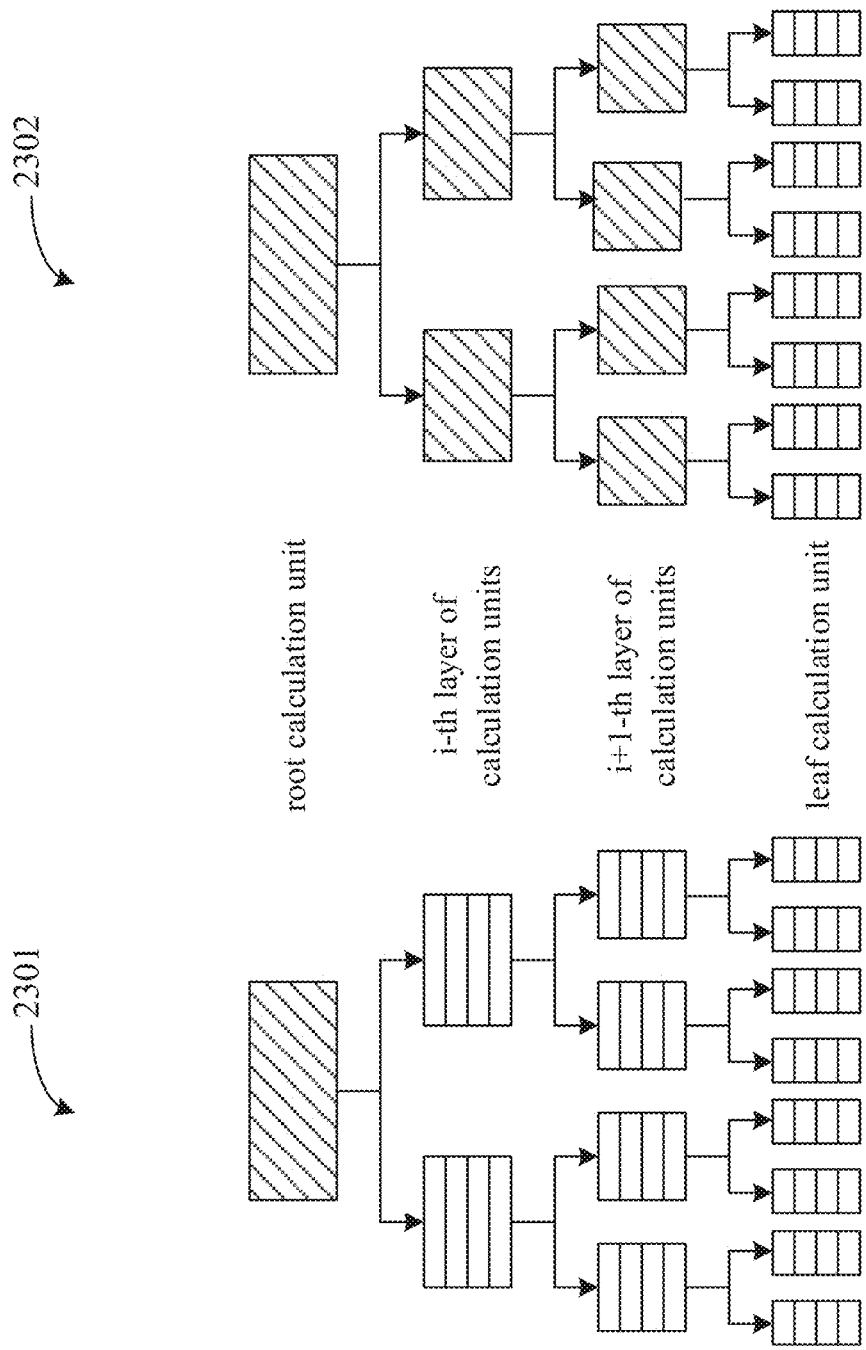
FIG. 23 is a schematic diagram showing two embodiments performing fractal operation according to another embodiment of the present disclosure.

FIG. 23 is a schematic diagram showing two embodiments (the foregoing embodiment and this embodiment) performing the fractal operation, where a fractal process 2301 is a fractal method of the foregoing embodiment. When a root calculation unit receives a task (such as a Conv3D), since the fractal instruction set has no Conv3D, the down-layer decoder converts the Conv3D into a series of equivalent operations of the fractal instruction set primitives when the middle layer of calculation units performs fractal operations. In other words, from the second layer, the calculation units are unable to determine the final equivalent task of this series of operations, so that each layer executes complex operations.

The fractal process 2302 is a fractal method of this embodiment. When each middle layer of calculation units perform fractal operations, the programming model divides a task with a Conv3D as the operation unit. For example, when the root calculation unit receives a task involving a Conv3D of 100×100 matrix, it is supposed that there is only two fractal functional units, the programming model controls the decoding controller 1505 to divides the task into 2 Con3Ds of 50×100 matrix, and the like. Therefore, the middle layer of calculation units performing calculation will avoid inefficient calculation and communication. The Conv3D is converted into the local instructions to execute the calculation task until the fractal task performed by a leaf calculation unit. In FIG. 23, 4 layers of calculation units are only taken as an example. The count of the computational units is not limited by the present disclosure.

Furthermore, the programming model uses a pivot value to determine the granularity of the decomposed sub-instructions, and the programming model may look up the appropriate pivot value according to hardware characteristics. The programming model provides a variety of imperative conditions. Based on these imperative conditions, the decoding controller 2205 chooses a pivot value to perform decomposition recursively.

Data to be decomposed may be input data or weight data, and the dimension is N. The decoding controller 2205 is able to provide N kinds of decomposition methods and chooses an appropriate decomposition method to perform decomposition; in other words, the decoding controller 2205 performs decomposition according to the i dimension. The programming model sets at least one pivot value in every dimension. Taking a Conv3D of 100×50×75 matrix as an example, this input matrix has 3 dimensions LWH. L[1:100], W[1:50] and H[1:75]. The programming model sets the pivot values of LWH dimensions. The decoding controller 2205 decomposes the foregoing data according to the pivot values.

The pivot value is between the maximum and the minimum of the dimension. For the L dimension, the minimum is 1, the maximum is 100, so the pivot value of the L dimension is between 1 and 100; for the W dimension, the minimum is 1, the maximum is 50, the pivot value of the W dimension is between 1 and 50; and for the H dimension, the minimum is 1, the maximum is 75, so the pivot value is between 1 and 75. The programming model only limits the range of the pivot value, and the specific value is determined by the decoding controller 2205. The means of determining the pivot value are various, such as using the median of the minimum and the maximum, depending on the calculation power of the fractal functional unit or generating the value randomly. Each time the decoding controller 2205 determines the pivot value, data is divided into two parts based on the pivot value.

For example, the decoding controller 2205 sets the pivot value of the L dimension as the median first, so the pivot value of the L dimension is VPL=50. Based on the pivot value, the input matrix is divided into two 50×50×75 matrixes, where the first matrix is L[1:50], W[1:50] and H[1:75], and the second matrix is L[51:100], W[1:50] and H[1:75]. The Conv3D calculation is performed in the first and second matrixes. However, the fractal functional unit 2213 is unable to process the matrix of such size, so the decoding controller 2205 continues to decompose the matrix based on the W dimension. According to the calculation power of the fractal functional unit 2213, the decoding controller 2205 sets the pivot value of the W dimension as VPW=30 and further divides the foregoing two matrixes into four matrixes: L[1:50], W[1:30] and H[1:75]; L[1:50], W[31:50] and H[1:75]; L[51:100], W[1:30] and H[1:75]: L[51:100], W[31:50] and H[1:75]. The Conv3D calculation is performed in the four matrixes. The fractal functional unit 2213 is sufficient to calculate the matrix of such size, so the matrix is no longer decomposed. The calculation units in this layer send the Conv3D calculation of the foregoing four matrixes to the calculation units of the next layer.

The middle layer of calculation units only perform data decomposition and do not split specific operation. For the foregoing examples, in the middle layer of calculation units, the operation instructions remain the Conv3D.

These instructions and data are sent to the leaf calculation unit. The local memory of the leaf calculation unit stores the FRISA of Table 3. The upper layer of fractal instructions are decomposed into an ordered set, where the ordered set is formed by sequentially arranging local instructions of the FRISA. The fractal functional unit of the leaf calculation unit executes the local instructions in the ordered set corresponding to the fractal instructions on the fractal data, so that intermediate data is generated and returned to the upper layer of calculation units. The local functional units of the upper layer of calculation units perform the reduction processing on the intermediate data and send the intermediate data to the upper layer. Finally, calculation results are combined in the root calculation unit.

In this embodiment, the fractal instructions of the middle layer of calculation units are shown in FIG. 2, and the local instructions in the FRISA of the leaf calculation unit are shown in FIG. 3.

Since the calculation units of this embodiment decompose the input instructions into smaller non-overlapping serial sub-instructions executed by the fractal functional unit, data may has many copies in the calculation units of different layers. In this embodiment, data is not allowed to be written to an original reading address space: in other words, original data is not allowed to be overwritten, thereby ensuring data consistency.

In this way, this embodiment has following three critical advantages.

1. Hardware configuration is independent. Since the decomposition operation is determined to a large extent by the decoding controller 2205 according to the configuration information of the read-only memory 2208, as shown in FIG. 4, the programmer 411 only needs to issue instructions to the root calculation unit. The fractal calculating devices of different scales perform appropriate decomposition automatically according to the hardware resources and instructions.

The instruction granularity is independent. Since the programmer 411 only needs to issue instructions to the root calculation unit, the programmer 411 does not need to know the detailed structure of the middle layer of calculation units or the leaf calculation unit. Therefore, the present disclosure provides convenient programming unrelated to the instruction granularity.

3. Serial decomposition or parallel decomposition is independent. Since the decoder 2202 is configured to perform serial decomposition or parallel decomposition, the two kinds of decomposition operate automatically in a two-thread pattern. Therefore, the programmer 411 does not need to pay attention to which decomposition process is performing.

Figure 24:
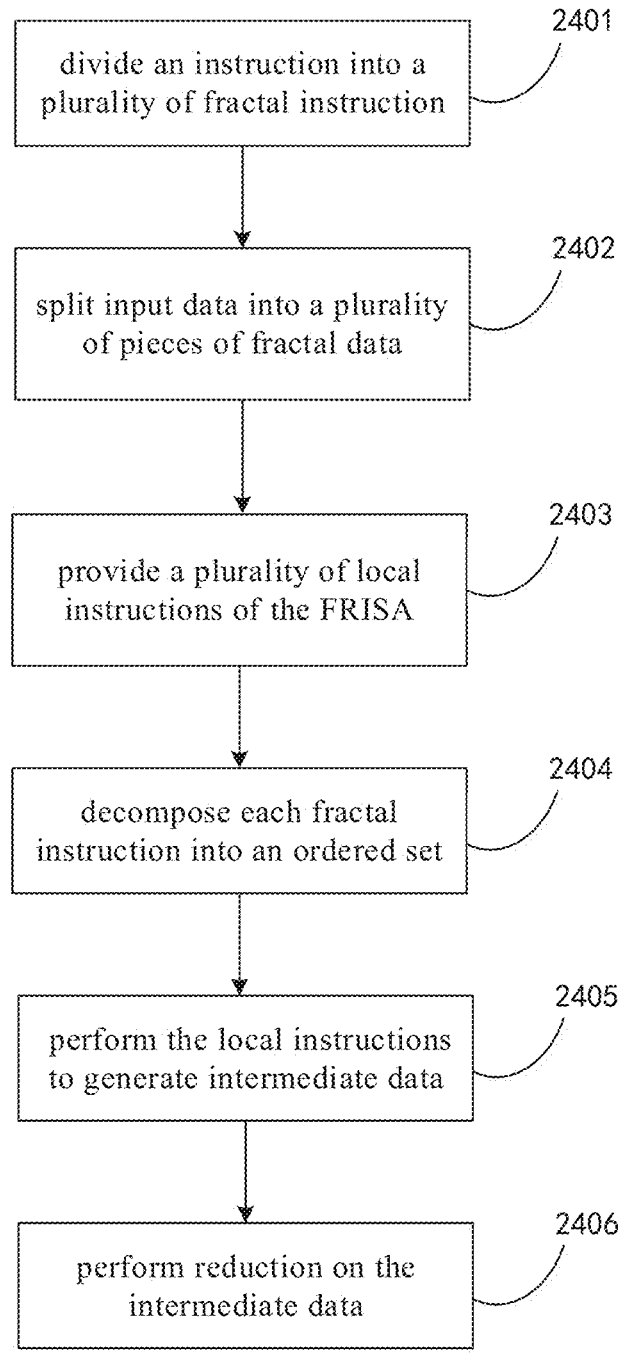
FIG. 24 is a flowchart of a neural network calculation method according to another example of the present disclosure.

Another embodiment of the present embodiment is a method for performing the neural network calculation on input data according to an instruction, where the method is applied to the embodiment of the FIG. 22, and the process is shown in FIG. 24.

A step 2401 includes: dividing an instruction into a plurality of fractal instructions. When the decoding controller 2205 is electrically connected to the parallel decomposition stack 2204, the decoding controller 2205 fetches the lower layer of instructions from the parallel decomposition stack 2204 and decomposes the instructions into fractal instructions. In more detail, when the parallel decomposition stack 2204 temporarily stores instructions, the multiplexer 2206 allows the instructions of the parallel decomposition stack 2204 to pass through and inputs the instructions to the decoding controller 2205. The decoding controller 2205 performs parallel decomposition operation to generate fractal instructions.

A step 2402 includes: splitting input data into a plurality of pieces of fractal data, where each piece of data is corresponding to a fractal instruction. Based on fractal instructions, the decoding controller 2205 splits the data to be calculated into a plurality of pieces of fractal data which is corresponding to fractal instructions one to one. In the afore-mentioned example, the decoding controller 2205 splits the matrix data of L[1:100], W[1:50] and H[1:75] into four pieces of fractal data of L[1:50], W[1:30] and H[1:75], L[1:50], W[31:50] and H[1:75], L[51:100], W[1:30] and H[1:75], L[51:100], W[31:50] and H[1:75], where each piece of data has a corresponding fractal instruction.

A step 2403 includes: providing a plurality of local instructions of the FRISA, where the foregoing local instructions are instructions described in FIG. 3 and are stored in the local memory 2215 of a leaf calculation unit.

A step 2404 includes: decomposing each fractal instruction into an ordered set, where the ordered set is formed by sequentially arranging at least one of the plurality of local instructions. The instructions are decomposed and sent to the next layer along the middle layer of calculation units until the instructions reach the leaf calculation unit. The local memory 2215 of the leaf calculation unit stores an FRISA. The decoder 2202 of the leaf calculation unit splits the upper layer of fractal instructions into an ordered set which is formed by sequentially arranging local instructions of the FRISA.

A step 2405 includes: performing the local instructions in the ordered set corresponding to the fractal instructions on the fractal data to generate intermediate data. The fractal functional unit of the leaf calculation unit performs a series of sequentially arranging local instructions in the step 2404 to generate and return intermediate data to the upper layer of calculation units.

A step 2406 includes: performing reduction on the intermediate data to complete the foregoing neural network calculation. After the upper layer of calculation units receive the intermediate data, the local functional unit of the calculation units performs reduction on the intermediate data and sends the intermediate data to the upper layer until the calculation results are combined in the root calculation unit to complete the neural network calculation.

Figure 25:
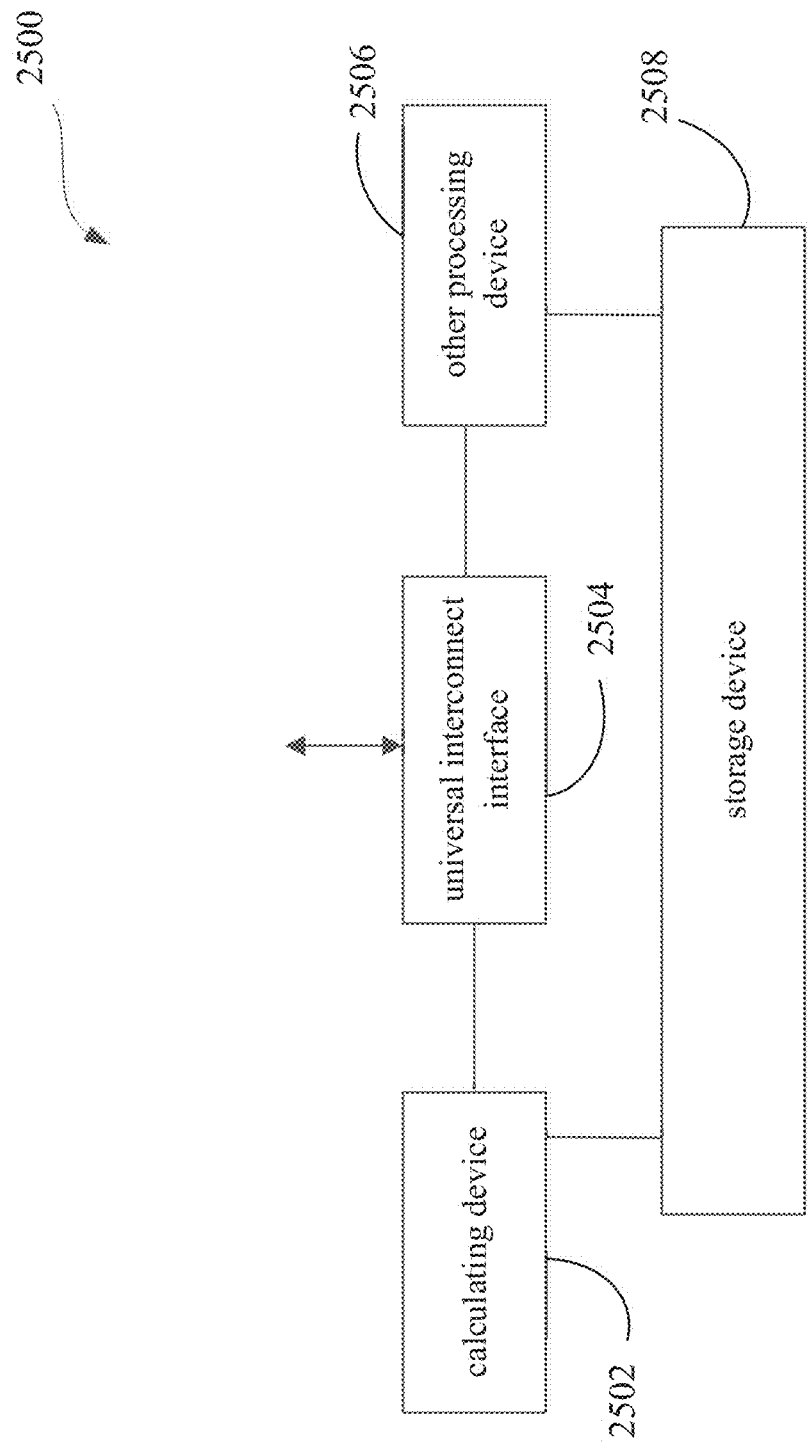
FIG. 25 is a schematic diagram of an integrated circuit device according to another embodiment of the present disclosure.

FIG. 25 is a structural diagram of an integrated circuit device 2500 according to another embodiment of the present disclosure. As shown in FIG. 25, the integrated circuit device 2500 includes a calculating device 2502, which is a fractal calculating device with a multi-layer calculation units in the foregoing multiple embodiments. In addition, the integrated circuit device 2500 also includes a universal interconnect interface 2504 and other processing device 2506.

The other processing device 2506 can be one or more types of general and/or special controllers such as a central controller, a graphics controller, an artificial intelligence controller, and the like. The number of other processing device 2506 is not limited but determined according to actual needs. The other processing device 2506 serves as an interface between the calculating device 2502 and external data and control, performs basic control including but not limited to data transmitting, and the starting and stopping of the calculating device 2502. The other processing device 2506 can also cooperate with the calculating device 2502 to complete computing tasks.

The universal interconnect interface 2504 may be used to transmit data and control instructions between the calculating device 2502 and other processing device 2506. For example, the calculating device 2502 can obtain the required input data from other processing device 2506 via the universal interconnect interface 2504, and write the input data to an on-chip storage unit of the calculating device 2502. Furthermore, the calculating device 2502 can obtain the required the control instruction from other processing device 2506 via the universal interconnect interface 2504, and write the control signal to an on-chip control buffer of the calculating device 2502. Alternatively, the universal interconnection interface 2504 can also read the data in a storage unit of the calculating device 2502 and transmit the data to other processing device 2506.

The integrated circuit device 2500 further includes a storage device 2508, which can be connected to the calculating device 2502 and other processing device 2506, respectively. The storage device 2508 is configured to store data of the calculating device 2502 and other processing device 2506, and is particularly suitable for data that cannot be fully stored in an internal memory of the calculating device 2502 or other processing device 2506.

In different application scenarios, the integrated circuit device 2500 can be used as an SOC (System On Chip) of a device including a mobile phone, a robot, a drone, a video surveillance device, and the like, which may effectively reduce the core area of a control component, increase the processing speed, and reduce the overall power consumption. In this case, the general interconnection interface of the integrated circuit device 2500 may be connected to some components of the device. The some components include, for example, a webcam, a monitor, a mouse, a keyboard, a network card, and a WIFI interface.

The present disclosure also provides a chip or an integrated circuit chip including the integrated circuit device 2500. The present disclosure also provides a chip package structure including the chip.

Figure 26:
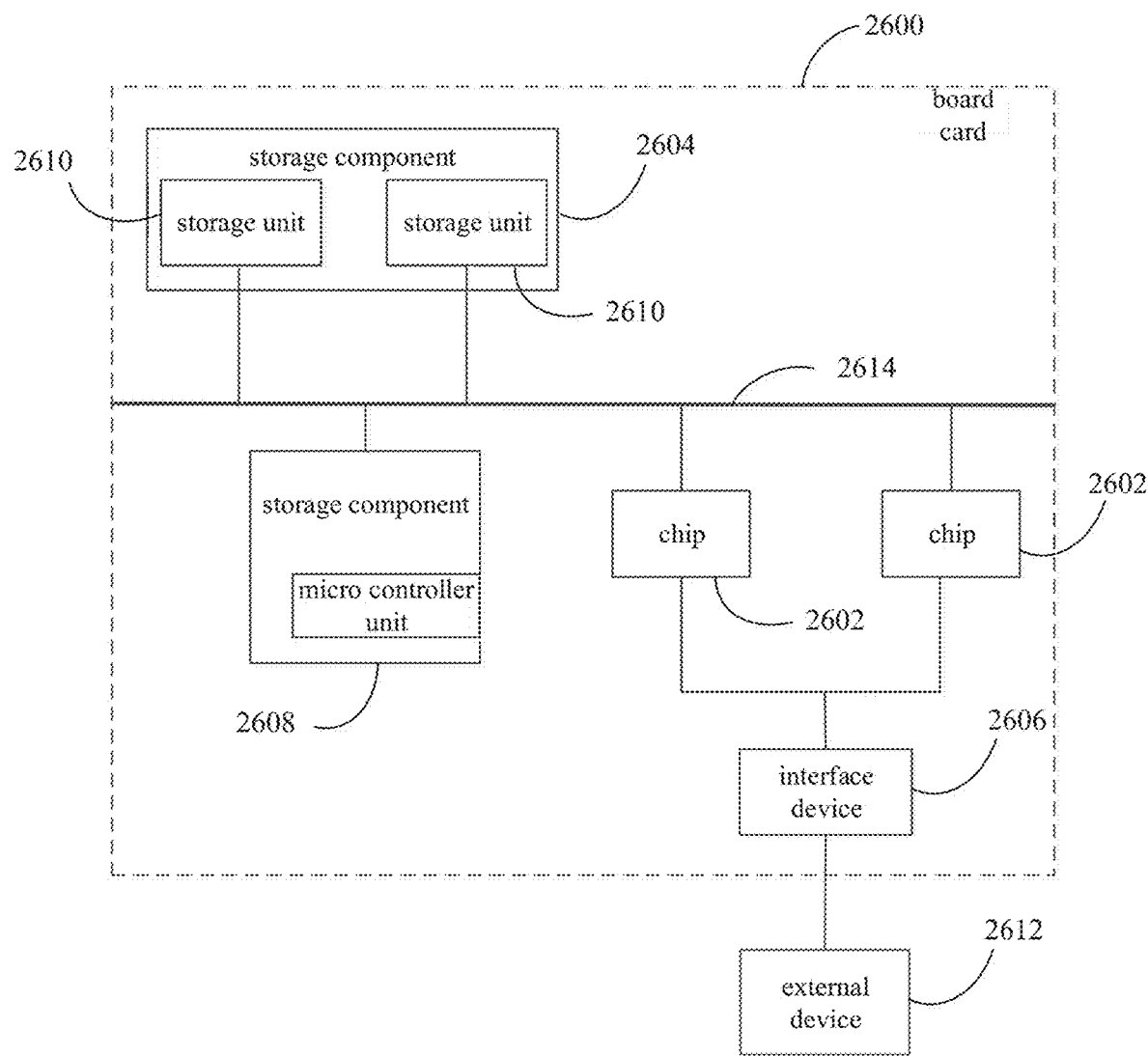
FIG. 26 is a schematic diagram of a board card according to another embodiment of the present disclosure.

Another embodiment of the present disclosure provides a board card including the chip package structure. Referring to FIG. 26, in addition to a plurality of chips 2602, the board card 2600 may further include other matching components. The matching components include a storage component 2604, an interface device 2606, and a control component 2608.

The storage component 2604 is connected to the chips 2602 inside the chip package structure through a bus 2614, and is configured to store data. The storage component 2604 may include a plurality of groups of storage units 2610.

The interface device 2606 is electrically connected to the chips 2602 inside the chip package structure. The interface device 2606 is configured to transfer data between the chips 2602 and an external device 2612. In this embodiment, the interface device 2606 is a standard PCIe interface, data to be processed is transferred by a server through the standard PCIE interface to the chips 2602, thereby realizing data transfer. The computation result of the chips 2602 may also be transferred by the interface device 2606 to the external device 2612.

The control component 2608 is electrically connected to the chips 2602 so as to monitor the status of the chips 2602. Specifically, the chips 2602 and the control component 2608 can be electrically connected through a SPI interface. The control component 2608 may include a MCU (micro controller unit).

Another embodiment of the present disclosure provides an electronic apparatus or device including the board card 2600. According to different application scenarios, the electronic apparatus or device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle includes an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiograph.

The technical schemes disclosed in the present disclosure has the following technical effects: machine learning computational primitives can be regarded as fractal operations, which are iteratively decomposed into several smaller self-similar operations; the architecture proposed by the present disclosure is a series of isomorphic, serial, multi-layer, and layer-similar fractal calculating devices that have the Von Neumann architecture with the same instruction set, and because each layer has the same structure, the architecture can realize simple programming and high efficiency.

It should be noted that for the sake of conciseness, the foregoing embodiments of method are all described as a series of combinations of actions, but those skilled in the art should know that, since according to the present disclosure, the steps may be performed in a different order or simultaneously, the disclosure is not limited by the described order of actions. Secondarily, those skilled in the art should also know that the embodiments described in the specification are all optional, and the actions and units involved are not necessarily required by the present disclosure.

Furtherer, it should be explained that though the units in the drawings are shown following the direction of arrows, they may not necessarily be performed according to the order indicated by the arrows. Unless clearly stated herein, the order is not strictly restricted. The steps of the method also have no strict order restriction.

It should be understood that the foregoing device embodiments are only illustrative, and the device provided by the present disclosure may also be implemented in other ways. For example, the division of the units/units in the foregoing embodiment is only a logical function division, and there may be other division methods in actual implementation. For example, a plurality of units, units, or components may be combined or integrated into another system, or some features may be omitted or not implemented.

In addition, unless otherwise specified, the functional units/units in the various embodiments of the present disclosure may be integrated into one unit/unit. Alternatively, each unit/unit may exist alone physically. Alternatively, two or more units/units may be integrated together. The above-mentioned integrated units/units can be implemented in the form of hardware or in the form of software program units.

When the above-mentioned integrated units/units are implemented in the form of hardware, the hardware may be a digital circuit, an analog circuit, and the like. Physical implementation of the hardware structure may include, but is not limited to, a transistor, a memristor, and the like. Unless otherwise specified, the controller may be any appropriate hardware controller, such as CPU, GPU, FPGA. DSP, ASIC, and the like. Unless otherwise specified, the memory component may be any suitable magnetic storage medium or magneto-optical storage medium, such as RRAM (Resistive Random Access Memory). DRAM (Dynamic Random Access Memory), SRAM (Static Random-Access Memory), EDRAM (Enhanced Dynamic Random Access Memory), HBM (High-Bandwidth Memory), HMC ID Memory Cube), and the like.

If the integrated units are implemented in the form of software program units and sold or used as an independent product, the product can be stored in a calculating device-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a calculating device (which may be a personal calculating device, a server, or a network device, etc.) to perform all or part of the steps of the methods described in the embodiments of the present disclosure. The foregoing memory includes: a USB flash drive, a read-only memory (ROM), a random access memory (RAM), a mobile hard disk, a magnetic disk, or an optical disc, and other media that can store program codes.

The embodiments of the present disclosure have been described in detail above. Specific embodiments have been used in the specification to explain the principles and implementation manners of the present disclosure. The descriptions of the above embodiments are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

It should be noted that for the sake of conciseness, the foregoing embodiments of method are all described as a series of combinations of actions, but those skilled in the art should know that, since according to the present disclosure, the steps may be performed in a different order or simultaneously, the disclosure is not limited by the described order of actions. Secondarily, those skilled in the art should also know that the embodiments described in the specification are all optional, and the actions and units involved are not necessarily required by the present disclosure.

Furtherer, it should be explained that though the units in the drawings are shown following the direction of arrows, they may not necessarily be performed according to the order indicated by the arrows. Unless clearly stated herein, the order is not strictly restricted. The steps of the method also have no strict order restriction.

It should be understood that the foregoing device embodiments are only illustrative, and the device provided by the present disclosure may also be implemented in other ways. For example, the division of the units/units in the foregoing embodiment is only a logical function division, and there may be other division methods in actual implementation. For example, a plurality of units, units, or components may be combined or integrated into another system, or some features may be omitted or not implemented.

In addition, unless otherwise specified, the functional units/units in the various embodiments of the present disclosure may be integrated into one unit/unit. Alternatively, each unit/unit may exist alone physically. Alternatively, two or more units/units may be integrated together. The above-mentioned integrated units/units can be implemented in the form of hardware or in the form of software program units.

When the above-mentioned integrated units/units are implemented in the form of hardware, the hardware may be a digital circuit, an analog circuit, and the like. Physical implementation of the hardware structure may include, but is not limited to, a transistor, a memristor, and the like. Unless otherwise specified, the controller may be any appropriate hardware controller, such as CPU, GPU, FPGA, DSP, ASIC, and the like. Unless otherwise specified, the memory component may be any suitable magnetic storage medium or magneto-optical storage medium, such as RRAM (Resistive Random Access Memory). DRAM (Dynamic Random Access Memory). SRAM (Static Random-Access Memory), EDRAM (Enhanced Dynamic Random Access Memory). HBM (High-Bandwidth Memory), HMC ID Memory Cube), and the like.

If the integrated units are implemented in the form of software program units and sold or used as an independent product, the product can be stored in a calculating device-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a calculating device (which may be a personal calculating device, a server, or a network device, etc.) to perform all or part of the steps of the methods described in the embodiments of the present disclosure. The foregoing memory includes: a USB flash drive, a read-only memory (ROM), a random access memory (RAM), a mobile hard disk, a magnetic disk, or an optical disc, and other media that can store program codes.

The foregoing can be better understood according to the following articles:

A1. A calculating device, comprising: at least two layers of calculating nodes, where each calculating node includes a memory component, a processor, and a next layer of calculating node; where the processor in any calculating node is configured to decompose an input instruction of the any calculating node to obtain parallel sub-instructions, and send the parallel sub-instructions to a calculating node at a next layer of the any calculating node; the any calculating node is further configured to load operands required for executing the parallel sub-instructions from the memory component of a calculating node at a previous layer to the memory component of the any calculating node, so that the calculating node at the next layer of the any calculating node can perform the parallel sub-instructions according to the operands.

A2. The calculating device of A1, where the any calculating node further includes: a memory controller, a data path is connected between a memory component of any calculating node and a memory component of an upper layer of calculating node and a memory component of a lower layer of calculating node, where the memory controller is connected to the data path, and controls the data path to send an operand of the input instruction from one memory component to another memory component.

A3. The calculating device of A2, where a processor includes: a serial decomposer, a parallel decomposer, and a decoder, where the memory controller connects the serial decomposer and the decoder, the serial decomposer is configured to serially decompose the input instruction to obtain serial sub-instructions according to the capacity of the memory component of any calculating node and the memory capacity required by the input instruction; the decoder is configured to decode the serial sub-instructions and send the serial sub-instructions to the parallel decomposer, and send a control signal to the memory controller according to the serial sub-instructions; according to the control signal, the memory controller loads the operand required to execute the serial sub-instructions from the memory component of the upper layer of calculating node to the memory component of any calculating node; and the parallel decomposer is configured to decompose the decoded serial sub-instructions in parallel to obtain parallel sub-instructions according to the number of a next layer of calculating node, and send the parallel sub-instructions to the next layer of calculating node, so that the next layer of calculating node executes the parallel sub-instructions according to the operand.

A4. The calculating device of A3, where if the memory required for the input instruction is greater than the capacity of the memory component of any one of the calculating nodes, the serial decomposer serially decomposes the input instruction to obtain serial sub-instructions according to the memory required for the input instruction and the capacity of the memory component of any one of calculating node.

A5. The calculating device of any one of A2-A4, where the memory component of any one of calculating nodes includes a static memory segment and a loop memory segment; if operands of the input instruction include shared operands and other operands, the serial decomposer serially decomposes the input instruction to obtain serial sub-instructions according to the size relationship between the memory capacity required by the shared operands and the remaining capacity of the static memory segment, and the size relationship between the memory capacity required by the other operands and the capacity of the loop memory segment; where the shared operands are operands commonly used by the serial sub-instructions, and the other operands are data other than the shared operands among the operands of the input instruction.

A6. The calculating device of A5, where the decomposed serial sub-instructions include head instructions and main instructions, the decoder sends a first control signal to the memory controller according to the head instructions, and the memory controller loads the shared operands from the memory component of the upper layer of calculating node to the static memory segment according to the first control signal; the decoder sends a second control signal to the memory controller according to the main instructions, and the memory controller loads the other operands from the memory component of the upper layer of calculating node to the loop memory segment according to the second control signal.

A7. The calculating device of A3, where there is no overlap between the operands corresponding to the parallel sub-instructions obtained by parallel decomposition.

A8. The calculating device of any one of A2-A7, where the processor further includes a control unit, and any one of the calculating nodes further includes a local functional unit, where the input end of the control unit is connected to the output end of the decoder, and the output end of the control unit is connected to the input end of the local functional unit.

A9. The calculating device of A8, where if there is output dependency between the serial sub-instructions, the control unit controls the local functional unit according to the serial sub-instructions to reduce calculation results of the next layer of calculating node to obtain a calculation result of the input instruction; where the output dependency between the serial sub-instructions refers to the need to perform reduction processing on the calculation results of the serial sub-instructions to obtain the calculation result of the input instruction.

A10. The calculating device of A9, where if the control unit detects that the resources required for the reduction processing performed on the calculation results of the next layer of calculating node are greater than the upper limit of the resources of the local functional unit, the control unit sends a commission instruction to the parallel decomposer according to the serial sub-instructions, and the parallel decomposer controls the next layer of calculating node according to the commission instruction to reduce the calculation results of the next layer of calculating node to obtain the calculation result of the input instruction.

B1. A method of obtaining an operands, comprising: looking up in a data address information table whether the operand is already stored in a local memory component; if the operand is already stored in the local memory component, determining a storage address in the local memory, component where the operand is stored according to a storage address in an external storage space where the operand is stored and the data address information table, and assigning the storage address of the operand in the local memory component to an instruction that is configured to obtain the operand.

B2. The method of B1, further comprising: if the operand is not stored in the local memory component, generating a control signal for loading operand according to the storage address of the operand, where the control signal for loading operand is used to load the operand from the storage address of the operand to the local memory component.

B3. The method of B1, where the data address information table records an address correspondence, and the address correspondence includes: the correspondence between the storage address of the operand in the local memory component and the storage address of the operand in the external storage space.

B4. The method of B3, where the looking up in the data address information table whether the operand is already stored in the local memory component includes: when the address correspondence includes the storage addresses of all the operands in the external storage space, determining that the operands have been stored in the local memory component.

B5. The method of B4, where the determining the storage address in the local memory component where the operand is stored according to the storage address in the external storage space where the operand is stored and the data address information table includes: using the the storage address in the local memory component corresponding to the storage address of the operand in the external storage space in the address correspondence as the storage address of the operand in the local memory component.

B6. The method of B1, further comprising: when the operand is loaded from the external storage space to the local memory component, updating the data address information table according to the storage address of the loaded operand in the external storage space and the storage address in the local memory component.

B7. The method of B6, where the updating the data address information table according to the storage address of the loaded operand in the external storage space and the storage address in the local memory component includes: recording the correspondence between the storage address of the loaded operand in the external storage space and the storage address of the operand in the local memory component in the data address information table.

B8. The method of B6, where the local memory component includes a static memory segment; when the operand is loaded from the external storage space to the local memory component, the updating the data address information table according to the storage address of the loaded operand in the external storage space and the storage address in the local memory component includes: when the operand is loaded from the external storage space to the static memory segment, determining the data address information table to be updated according to the count value of a first counter, where the count value of the first counter is used to indicate the storage address information in the static memory segment; and updating the data address information table to be updated according to the storage address of the loaded operand in the external storage space and the storage address of the operand in the static memory segment.

B9. The method of B6, where the local memory component further includes a loop memory segment that includes a plurality of sub-memory blocks; when the operand is loaded from the external storage space to the local memory component, the updating the data address information table according to the storage address of the loaded operand in the external storage space and the storage address in the local memory component includes: when the operand is loaded from the external storage space to any one of the plurality of sub-memory blocks in the loop memory segment, updating the data address information table corresponding to any one of the sub-memory blocks according to the storage address of the loaded operand in the external storage space and the storage address of the operand in the local memory component.

B10. The method of any one of B3-B9 applied to a calculating device including a plurality layers of calculating nodes, where each calculating node includes a local memory component, a processor, and a next layer of calculating node; and the external storage space is a memory component of the upper layer of calculating node of the calculating node in this layer or the memory component of the next layer of calculating node of the calculating node in this layer.

B11. A calculating device, comprising: a plurality layers of calculating nodes, where each calculating node includes a local memory component, a processor, and a next layer of calculating node; when the processor needs to load an operand from the memory component of a previous-layer calculating node of a current calculating node to the local memory component, the processor needs to look up in a data address information table whether the operand is already stored in the local memory component; if the operand is already stored in the local memory component, the processor determines a storage address in the local memory component where the operand is stored according to a storage address in an external storage space where the operand is stored and the data address information table, and assigns the storage address of the operand in the local memory component to an instruction that is configured to obtain the operand.

B12. The calculating device of B11, where if the operand is not stored in the local memory component, the processor generates a control signal for loading operand according to the storage address of the operand, where the control signal for loading operand is used to load the operand from the storage address of the operand to the local memory component;

B13. The calculating device of B11 or B12, where the data address information table records an address correspondence, and the address correspondence includes: the correspondence between the storage address of the operand in the local memory component and the storage address of the operand in the external storage space.

B14. The calculating device of B13, where the local memory component includes a static memory segment and a loop memory segment; the processor is configured to decompose the input instruction of any calculating node to obtain a plurality of sub-instructions; if there are shared operands among the plurality of sub-instructions, the processor allocates memory space for the shared operands in the static memory segment, and allocates memory space for other operands of the plurality of sub-instructions in the loop memory segment; where the shared operands are operands that must be used when the next layer of calculating node of any calculating node executes the plurality of sub-instructions; and the other operands are operands other than the shared operands among the operands of the plurality of sub-instructions.

B15. The calculating device of B14, where at least one data address information table corresponding to the static memory segment and a plurality of data address information tables corresponding to the loop memory segment are provided in the processor.

B16. The calculating device of B15, where before allocating memory space for the shared operands in the static memory segment, the processor looks up in at least one data address information table corresponding to the static memory segment whether the shared operands have been stored in the static memory segment of the local memory component, where if the shared operands have been stored in the static memory segment of the local memory component, the processor determines the storage address of the shared operands in the local memory component according to the storage address of the shared operands in the memory component of the upper layer of calculating node and the at least one data address information table corresponding to the static memory segment, and assigns the storage address of the shared operands in the local memory component to an instruction that is configured to obtain the operands.

B17. The calculating device of B15, where before allocating memory space for the other operands in the loop memory segment, the processor looks up in the plurality of data address information tables corresponding to the loop memory segment whether the other operands have been stored in the loop memory segment of the local memory component, where if the other operands have been stored in the loop memory segment of the local memory component, the processor determines the storage address of the other operands in the local memory component according to the storage address of the other operands in the memory component of the upper layer of calculating node and the plurality of data address information tables corresponding to the loop memory segment, and assigns the storage address of the other operands in the local memory component to an instruction that is configured to obtain other operands; if the other operands have not been stored in the loop memory segment of the local memory component, the processor loads the data.

B18. The calculating device of B16 or B17, where when operands are loaded from the memory component of the upper layer of calculating node to the static memory segment, the processor determines the data address information table to be updated according to the count value of the first counter, where the count value of the first counter is used to determine the different data address information tables corresponding to the two ends of the static memory segment; and the processor updates the to-be-updated data address information table according to the storage address of the loaded operand in the memory component of the upper layer of calculating node and the storage address in the static memory segment.

B19. The calculating device of B16 or B17, where when loading other operands from the external storage space to any one of the plurality of sub-memory blocks in the loop memory segment, the processor updates the data address information table corresponding to any one of the sub-memory blocks according to the storage addresses of the loaded other operands in the external storage space and the storage addresses in the local memory component.

B20. An operand obtaining device, comprising: a processor, a memory for storing executable instructions of the processor, where the processor is configured to implement the method of any one of B1-B10 when executing instructions.

B21. A non-volatile computer-readable storage medium having a computer program instruction stored thereon, where the method of any one of B1-B10 is implemented when the computer program instruction is executed by a processor.

C1. A calculating device, comprising a plurality layers of calculating nodes, where each calculating node includes a local memory component, a processor, a next layer of calculating node, and a memory controller, the processor is connected to the next layer of calculating node and the memory controller, and is configured to receive an input instruction, decompose the input instruction to obtain a plurality of sub-instructions, and send the plurality of sub-instructions to the next layer of calculating node; the memory controller is configured to load a second operand of a first operand corresponding to the plurality of sub-instructions from the memory component of a previous-layer calculating node of a random calculating node to the local memory component; the next layer of calculating node is configured to execute the plurality of sub-instructions according to operators of the plurality of sub-instructions and second operands of the plurality of sub-instructions; and the input instruction and the plurality of sub-instructions have the same format.

C2. The calculating device of C1, where the input instruction and the plurality of sub-instructions include: an operator and an operand parameter; where the operand parameter is a parameter pointing to the operand of the input instruction, the operand parameter includes global parameters and local parameters, where a global parameter is a parameter indicating the size of the first operand corresponding to the input instruction, and a local parameter is a parameter indicating the starting position of a second operand of the input instruction in the first operand and the size of the second operand.

C3. The calculating device of C1 or C2, a data path is connected between a memory component of any calculating node and a memory component of an upper layer of calculating node and a memory component of a lower layer of calculating node, where the memory controller controls the data path.

C4. The calculating device of C3, where the processor is further configured to generate a plurality of corresponding control signals according to a plurality of sub-instructions, and send the plurality of control signals to the memory controller; and the memory controller controls the data path according to each control signal, and loads the operands of the sub-instructions corresponding to the control signal from the memory component of the upper layer of calculating node to the local memory component.

C5. The calculating device of C4, where the memory controller includes a first memory controller and a second memory controller, where the first memory controller is connected to the data path through the second memory controller, and the first memory controller is further configured to generate a loading instruction according to the control signal, and send the loading instruction to the second memory controller, and the second memory controller is configured to control the data path according to the loading instruction.

C6. The calculating device of C5, where the first memory controller determines a base address, a starting offset, the amount of loaded data, a jump offset according to the control signal, and then generates a loading instruction according to the base address, the start offset, the amount of loaded data, and the jump offset; where the base address is the starting address of the operand stored in the memory component, the starting offset is the offset of the starting position of a second operand relative to the starting position of a first operand, the amount of loaded data is the number of operands loaded from the starting offset, and the jump offset is the offset of the starting offset of the data to be read next time relative to the starting offset of the data that was read last time.

C7. The calculating device of C6, where the processor includes a serial decomposer, a decoder, and a parallel decomposer, where the input end of the serial decomposer is connected to the output end of the parallel decomposer in the processor of the upper layer of calculating node, the output end of the serial decomposer is connected to the input end of the decoder, the output end of the decoder is connected to the input end of the parallel decomposer, and the output end of the parallel decomposer is connected to the input end of the next layer of calculating node.

C8. The calculating device of C7, where the serial decomposer is configured to serially decompose the input instruction to obtain serial sub-instructions according to the capacity of the memory component of any calculating node and the memory capacity required by the input instruction; the decoder is configured to decode the serial sub-instructions and send the serial sub-instructions to the parallel decomposer, and send a control signal to the memory controller according to the serial sub-instructions; according to the control signal; the memory controller loads the operand required to execute the serial sub-instructions from the memory component of the upper layer of calculating node to the memory component of any calculating node; and the parallel decomposer is configured to decompose the decoded serial sub-instructions in parallel to obtain parallel sub-instructions according to the number of a next layer of calculating node, and send the parallel sub-instructions to the next layer of calculating node, so that the next layer of calculating node executes the parallel sub-instructions according to the operand.

C9. The calculating device of C8, where the memory component of any one calculating node includes a static memory segment and a dynamic memory segment, the decomposed serial sub-instructions include head instructions and main instructions, the decoder sends a first control signal to the memory controller according to the head instructions, and the memory controller loads the shared operands from the memory component of the upper layer of calculating node to the static memory segment according to the first control signal; the decoder sends a second control signal to the memory controller according to the main instructions, and the memory controller loads the other operands from the memory component of the upper layer of calculating node to the loop memory segment according to the second control signal.

C10. The calculating device of C6, where the first memory controller determines the starting offset according to the starting position among the local parameters, determines the amount of loaded data according the size parameter among local parameters, and determines the jump offset according to all parameters or local parameters.

D1. A fractal calculating device, comprising a plurality of layers of calculation units, where each layer of calculation units include functional units to perform tasks and a memory to store data related to the tasks.

D2. The fractal calculating device of D1, where the plurality of layers of calculation units include a root calculation unit, which is a topmost calculation unit, a functional unit of the root calculation unit is configured to issue tasks.

D3. The fractal calculating device of D2, where the multiple layers of calculation units include a middle layer of calculation units, where the functional unit of the middle layer of calculation units includes: a plurality of fractal functional units configured to issue sub-tasks in the tasks and receive calculation results of the sub-tasks; and a local functional unit configured to execute a local task among the tasks, where, the local task includes reducing all the calculation results.

D4. The fractal calculating device of D3, where the plurality of layers of calculation units include a leaf calculation unit, which is a unit in the lowest layer, and a functional unit of the leaf calculation unit includes an accelerator for calculating the sub-tasks to obtain calculation results.

D5. The fractal calculating device of D4, where the multiple layers of calculation units include a controller configured to assign the task or the sub-tasks to the functional unit.

D6. The fractal calculating device of D5, where the controller of the root calculation unit is configured to receive the task and send a local instruction to control the functional unit of the root calculation unit to execute the task.

D7. The fractal calculating device of D5, where the controller of the middle layer of calculation units is configured to: generate fractal instructions and local instructions according to the task; split the task into the sub-tasks and the local task, each fractal functional unit corresponds to a sub-task; and send a reduced calculation result to an upper of functional unit, where the fractal function unit issues the sub-tasks according to the fractal instructions, and the local functional unit executes the local task according to the local instructions.

D8. The fractal calculating device of D5, where the controller of the leaf calculation unit is configured to generate fractal instructions according to the task, and the accelerator calculates the sub-tasks according to the fractal instructions.

D9. The fractal calculating device of D5, where the controller of each layer of calculation unit copies data required by a lower layer of calculation units from a memory of this layer of calculation units to the memory of the lower layer of calculation units.

D10. The fractal calculating device of D1, further comprising a controller configured to assign the task to the functional unit.

D11. The fractal calculating device of D1, where the calculation units of each layer use a same instruction set architecture.

D12. An integrated circuit device comprising the fractal calculating device of any one of D1-D11.

D13. A board card comprising the integrated circuit device of D12.

E1. A fractal calculating device that calculates data according to an input instruction, comprising a plurality of layers of calculation units, and each layer of calculation units include: an instruction unit configured to decode the input instruction into local instructions, fractal instructions, and direct memory access instructions; a data loading unit configured to load sub-data of the data from a memory of an upper layer to the local memory according to the direct memory access instruction; an operation execution unit configured to execute a task corresponding to the sub-data according to the fractal instruction to generate a calculation result; an operation reduction unit configured to reduce the calculation result according to the local instruction; and a data writing back unit configured to write the reduced calculation result back to the memory of the upper layer.

E2. The fractal calculating device of E2, where each layer of calculation units may run in a five-stage pipeline, each stage corresponds to a unit, and each unit operates in response to different input instructions at the same time.

E3. The fractal calculating device of E2, where the sub-data is calculated in a pipeline of a lower layer of calculation units.

E4. The fractal calculating device of E2, where the instruction decoding unit includes: a down-layer decoder configured to generate a lower layer of instructions and a direct memory access instruction according to the input instruction; and a parallel decomposer configured to decompose the lower layer of instructions into local instructions and fractal instructions in parallel.

E5. The fractal calculating device of E4, where the input instruction includes operands, and the down-layer decoder runs the pipeline according to the dependency between the operands of different input instructions.

E6. The fractal calculating device of E5, where the down-layer decoder determines whether the dependency is a write-modify-read relationship, where if the dependency is a write-modify-read relationship, the pipeline is suspended until the write-modify-read relationship ends.

E7. The fractal calculating device of E5, where the down-layer decoder checks the storage requirements of these operands and generates a direct memory access instruction pointing to the local memory.

E8. The fractal calculating device of E7, where the data loading unit includes a DMA (direct memory access) controller configured to exchange data between the local memory and the upper layer of memory according to the direct memory access instruction.

E9. The fractal calculating device of E8, where the down-layer decoder binds the local address of the sub-data in the local memory to the operand of the lower layer of instructions.

E10. The fractal calculating device of E8, where the parallel decomposer binds the local address to the operand of the fractal instruction according to the operand of the lower layer of instructions.

E11. The fractal calculating device of E9 or E10, where each layer of calculation units also include a tensor permutation table for storing an address comparison table of the storage address of the sub-data in the upper layer of memory and the storage address of the sub-data in the local memory, and the down-layer decoder looks up the local address according to the tensor permutation table.

E12. The fractal calculating device of E1, where the data loading unit further includes a DMA (direct memory access), the operation execution unit includes a plurality of fractal functional units, and the DMA sends the sub-data stored in the local memory to the plurality of fractal functional units to execute the task.

E13. The fractal calculating device of E12, where the instruction decoding unit further includes a reduction controller, and the operation reduction unit includes a local functional unit; the reduction controller sends the local instructions to the local functional unit to perform reduction, and the DMA stores the calculation result in the local memory.

E14. An integrated circuit device comprising the fractal calculating device of any one of E1-E13.

E15. A board card comprising the integrated circuit device of E14.

E16. A fractal calculating device, comprising a plurality of layers of calculation units, and each calculation unit includes a processor and a next layer of calculation units; for any calculation unit, the processor in the any calculation unit controls the next layer of calculation units, and the operation corresponding to the input instruction of any calculation unit is executed in a plurality of stages in a pipeline manner, where the plurality of stages includes an operation EX stage, and the next layer of calculation units perform operations in the plurality of stages in a pipeline manner.

E17. The fractal calculating device of E16, where any calculation unit further includes: a local functional unit, a memory component, and a memory controller, the processor includes a pipeline control unit, a decoder, and a reduction controller, the input end of the decoder receives the input instruction, and the output end of the decoder is connected to the input end of the memory controller, a data path is connected between a memory component of any calculation unit and a memory component of an upper layer of calculation units and a memory component of a lower layer of calculation units, where the memory controller is connected to the data path, and controls the data path to send an operand of the input instruction from one memory component to another memory component; the output end of the decoder is also connected to the input end of the next layer of calculation units and the input end of the reduction controller, and the reduction controller is connected to the local functional unit; and the pipeline control unit is connected to the decoder, the reduction controller, and the memory controller.

E18. The fractal calculating device of E17, where any calculation unit further includes a pipeline latch, which is located in front of the memory controller, in front of the next layer of calculation units, in front of the local functional unit; and the pipeline controller synchronizes the plurality of stages by controlling the pipeline latch.

E19. The fractal calculating device of E18, where the plurality of stages include: ID, data LD, operation EX, operation RD, and data WB, and the pipeline propagates in the order of: ID, data LD, operation EX, operation RD, and data WB; the decoder is used for instruction decoding, the memory controller is used for data loading: loading the operand of the input instruction to the memory component, the reduction controller is used to control the local functional unit to perform the operation reduction to obtain the calculation result of the input instruction, and the memory controller is also used to write the calculation result back to the memory component of the upper layer of calculation units of any calculation unit.

E20. The fractal calculating device of E18, where after receiving a first feedback signal transmitted by the decoder, the memory controller, the next layer of calculation units and the reduction controller, the pipeline control unit transmits a first control signal to each pipeline latch respectively, and each pipeline latch updates the output according to the first control signal.

E21. The fractal calculating device of E18, where when the decoder detects that there is data dependency between the serial sub-instructions, the decoder stops obtaining the serial sub-instructions from the sub-instruction queue.

E22. The fractal calculating device of E21, where the processor further includes a serial decomposer, where the serial decomposer is connected to the input end of the decoder, and the serial decomposer is configured to serially decompose the input instruction to obtain serial sub-instructions: the processor controls the next layer of calculation units to execute operations corresponding to the serial sub-instructions in a plurality of stages in a pipeline manner.

E23. The fractal calculating device of E22, where when the decoder detects that there is no overlapping between the input operands of the serial sub-instructions currently being decoded and the output operands of the plurality of the previous serial sub-instructions, the decoder decodes the serial sub-instructions currently being decoded and then pre-loads the decoded serial sub-instructions to the next layer of calculation units.

E24. The fractal calculating device of E23, where the processor further includes a parallel decomposer, where the input end of the parallel decomposer is connected to the output end of the decoder, and the output end of the parallel decomposer is connected to the input end of the next layer of calculation units; the parallel decomposer is configured to decompose the decoded serial sub-instructions in parallel to obtain parallel sub-instructions according to the number of the next layer of calculation units, and send the parallel sub-instructions to the next layer of calculation units.

E25. The fractal calculating device of E22, where the sub-instruction queue is provided between the serial decomposer and the decoder, where the sub-instruction queue is configured to temporarily store the serial sub-instructions.

F1. A calculation unit for calculating data according to input instructions, where the calculation unit is divided into an M-stage pipeline, and the calculation unit includes: a serial decomposer configured to decompose the input instructions into N serial instructions, and generate intermediate data reflecting the dependency among the N serial instructions: a local memory including a static memory segment to store the intermediate data, and a loop memory segment to store the sub-data required to execute the N serial instructions and the data of each stage generated by the calculation of the sub-data in the M-stage pipeline, where the sub-data is a part of the data.

F2. The calculation unit of F1, where the loop memory segment is divided into N sub-memory blocks, each sub-memory block stores specific sub-data required to execute the specific serial instructions and the data at each stage generated by the specific sub-data in the M-stage pipeline.

F3. The calculation unit of F2, further comprising a down-layer decoder configured to assign the local address of the specific sub-data.

F4. The calculation unit of F3, further comprising a DMA configured to sequentially perform data exchange between each sub-memory block and the upper layer of memory according to the local address.

F5. The calculation unit of F3, further comprising a fractal functional unit configured to sequentially issue tasks of the specific serial instructions according to the local address, and store the calculation result of a lower layer of calculation units in a same sub-memory block.

F6. The calculation unit of F3, further comprising a local functional unit configured to sequentially execute local tasks of the specific serial instructions according to the local address.

F7. The calculation unit of F1, where the intermediate data is sequentially stored from both ends of the static memory segment to the intermediate F8. The calculation unit of F1, where M=5, the pipeline includes: an instruction decoding stage in which the input instruction is decoded into local instructions, fractal instructions, and direct memory access instructions; a data LD stage in which the specific sub-data is loaded from an upper layer of memory to a specific sub-memory block according to the direct memory access instruction; an operation EX stage in which a task is issued according to the fractal instruction to generate a calculation result; an operation RD stage in which the calculation result is reduced according to the local instruction; and a data WB stage in which the reduced calculation result is written back to the upper layer of memory, where each stage of the pipeline corresponds to a stage F9. The calculation unit of F8, where N=3, and the N serial instructions simultaneously operate in the data LD stage, the operation EX stage, and the operation RD stage, respectively.

F10. The calculation unit of F8, further comprising a tensor permutation table for storing an address comparison table of the storage address of the specific sub-data in the upper layer of memory and the storage address of the specific sub-data in the local memory.

F11. An integrated circuit device comprising the fractal calculating device of any one of F1-F10.

F12. A board card comprising the integrated circuit device of F11.

F13. A fractal calculating device, comprising a plurality of layers of calculating node, where each calculating node includes a memory component, a processor, and a next layer of calculating node; the local memory component includes a static memory segment and a loop memory segment; the processor is configured to decompose the input instruction of any calculating node to obtain a plurality of sub-instructions; if there are shared operands among the plurality of sub-instructions, the processor allocates memory space for the shared operands in the static memory segment, and allocates memory space for other operands of the plurality of sub-instructions in the loop memory segment: where the shared operands are operands that must be used when the next layer of calculating node of any calculating node executes the plurality of sub-instructions; and the other operands are operands other than the shared operands among the operands of the plurality of sub-instructions.

F14. The fractal calculating device of F13, where a first counter is provided in the processor, the loop memory segment includes a plurality of sub-memory blocks, and the processor allocates memory space for other operands of the plurality of sub-instructions in the loop memory segment, which specifically includes that the processor allocates memory space for the other operands from the sub-memory blocks corresponding to the count value of the first counter in the loop memory segment.

F15. The fractal calculating device of F13, where a second counter is provided in the processor, and the processor allocates memory space for shared operands in the static memory segment, which specifically includes that the processor allocates memory space for the shared operands starting from a first starting end in the static memory segment, where the first starting end is the starting end corresponding to the count value of the second counter.

F16. The fractal calculating device of F15, where the processor includes a serial decomposer, and the processor is configured to decompose an input instruction of any calculating node to obtain a plurality of sub-instructions, which specifically includes that the serial decomposer serially decomposes the input instruction to obtain serial sub-instructions according to the memory capacity required by the input instruction, the capacity of the static memory segment, and the capacity of the loop memory segment.

F17. The fractal calculating device of F15, where the processor includes a serial decomposer; the serial decomposer determines the first starting end of allocating memory space for the shared operands according to the value of the second counter, the serial decomposer calculates the remaining memory capacity of the static memory segment starting from the first starting end; the serial decomposer performs a first serial decomposition on the input instruction according to the remaining memory capacity of the static memory segment and the memory capacity required by the shared operands to obtain a first serial sub-instruction; and the serial decomposer performs a second serial decomposition on the first serial sub-instruction to obtain the serial sub-instructions according to the memory capacity of the loop memory segment and the memory capacity required by the other operands.

F18. The fractal calculating device of F14, where the processor further includes a decoder configured to decode the plurality of sub-instructions; in the process of decoding the plurality of sub-instructions, the decoder allocates memory space for the other operands from a sub-memory block corresponding to the count value of the first counter in the loop memory segment.

F19. The fractal calculating device of F16, where the serial sub-instructions include a head instruction and a main body instruction, where the head instruction is configured to load the shared operands, and records the address of the memory space allocated for the shared operands; and the main body instruction is configured to load the other operands and perform calculations on the shared operands and other operands.

F20. The fractal calculating device of F16 or F19, where the processor in any one calculating node controls the next layer of calculating node to execute operations corresponding to the serial sub-instructions of any one calculating node in a plurality of stages in a pipeline manner; where the plurality of stages include: ID, data LD, operation EX, operation RD, and data WB, and the pipeline propagates in the order of: ID, data LD, operation EX, operation RD, and data WB.

F21. The fractal calculating device of F20, where any calculating node also includes a local functional unit a second memory controller (DMA), where the processor includes a decoder, a reduction controller unit, where the decoder is used for instruction decoding, the DMA is used for data loading, in other words, the DMA loads the operand of the input instruction to the memory component; the next layer of calculating node is used to perform operation execution according to operands and decoded instructions to obtain an execution result; the reduction control unit is used to control the local functional unit to reduce the execution results to obtain a calculation result of the input instruction; and the DMA is also used to write the calculation result back to the memory component of the upper layer of calculating node of any calculating node.

F22. The fractal calculating device of F21, where the loop memory segment includes a plurality of sub-memory blocks, and in the process of the pipeline propagation, the DMA, the next layer of calculating node, and the local functional unit use the plurality of sub-memory blocks sequentially and cyclically.

F23. The fractal calculating device of F22, where the memory capacities of the plurality of sub-memory blocks are the same.

G1. A fractal calculating device comprising multiple layers of calculation units, where each layer of calculation units comprises a serial decomposing unit configured to receive an upper layer of fractal instruction from an upper layer of calculation units and decompose the upper layer of fractal instruction into a plurality of serial sub-instructions, an instruction decoding unit configured to decode the plurality of serial sub-instructions into local fractal instructions according to the hardware resources of the calculation units, and an operation execution unit configured to issue the local fractal instructions to a lower layer of calculation units to generate a calculation result.

G2. The fractal calculating device of G1, where the serial decomposition unit includes: an instruction queue for temporarily storing an upper layer of fractal instructions; a serial decomposer for obtaining the upper layer of fractal instruction from the instruction queue and decomposing the fractal instruction into a plurality of serial sub-instructions; and a sub-instruction queue for temporarily storing the plurality of serial sub-instructions.

G3. The fractal calculating device of G2, where the instruction decoding unit includes: a down-layer decoder configured to sequentially obtain a plurality of serial sub-instructions from the sub-instruction queue to generate a lower layer of instructions; and a parallel decomposer configured to decompose the lower layer of instructions into local fractal instructions in parallel.

G4. The fractal calculating device of G3, where the operation execution unit includes a plurality of fractal functional units configured to execute an issued task.

G5. The fractal calculating device of G4, where each layer of calculation units also include a local memory, and the hardware resources include one of the capacity limitation of the local memory, the ability of the serial decomposer to decompose the upper layer of fractal instructions, the calculation ability of the lower layer of calculation units, and the number of the fractal functional units.

G6. The fractal calculating device of G3, where the instruction decoding unit includes a reduction controller configured to decode the lower layer of instructions into local reduction instructions; each layer of calculation units also include an operation reduction unit that includes a local functional unit, where the operation reduction unit is configured to reduce the calculation result according to a local reduction instruction.

G7. The fractal calculating device of G5, where each layer of calculation units also include a data loading unit including a DMA (direct memory access) controller; the down-layer decoder generates a direct memory access instruction pointing to the local memory; and the DMA exchanges data between the local memory and the upper layer of memory according to the direct memory access instruction.

G8. The fractal calculating device of G7, where the data loading unit includes a DMA (direct memory access) configured to send the data stored in the local memory to the plurality of fractal functional units to execute the issued task.

G9. An integrated circuit device comprising the fractal calculating device of any one of G1-G8.

G10. A board card comprising the integrated circuit device of G9.

G11. A fractal calculating method, comprising: responding to an upper layer of fractal instruction from an upper layer of calculation units, and decomposing the upper layer of fractal instruction into a plurality of serial sub-instructions; decoding the plurality of serial sub-instructions into local fractal instructions according to the hardware resources of the calculation unit; and issuing the local fractal instructions to a lower layer of calculation units to generate a calculation result.

G12. The fractal calculating method of G11, where the hardware resources include one of the capacity limitation of the local memory, the ability to decompose the upper layer of fractal instruction, and the calculation ability of the lower layer of calculation units.

H1. A method for performing neural network calculations on input data according to an instruction, comprising: dividing the instruction into a plurality of fractal instructions; dividing the input data into a plurality of pieces of fractal data, where each fractal data corresponds to a fractal instruction; creating a plurality of local instructions of a fractal reconfigurable instruction set; decomposing each fractal instruction into an ordered set, where the ordered set is formed by sequentially arranging at least one of the plurality of local instructions; executing the local instructions in the ordered set of corresponding fractal instructions on the fractal data to generate intermediate data; and reducing the intermediate data to complete the neural network calculations.

H2. The method of H1, where the fractal reconfigurable instruction set includes a data relocation category, and the data relocation category includes following local instructions; display tensor move (tmove).

H3. The method of H1, where the fractal reconfigurable instruction set includes a calculation category, and the calculation category includes following local instructions: element-wise nonlinear transformation (veltw), vector addition (vadd), scalar addition (sadd), mixed addition (vsadd), horizontal maximization (hmax) and matrix multiplication (mmul).

H4. The method of H1, where the fractal reconfigurable instruction set includes a logic category, and the logic category includes following local instructions: exclusive OR (vxor, sxor) and greater than comparison (vgt, sgt).

H5. The method of H1, where the fractal reconfigurable instruction set includes a miscellaneous category, and the miscellaneous category include following local instructions: a randomly generated vector (vmg), a category count (vpopcnt), and a combined ordinal sequence (vmerge).

H6. The method of H1, where the fractal instructions include a deep learning category, and the deep learning category includes following local instructions: convolution (Cv2D. Cv3D), pooling (Max2D, Min2D. Avg2D), and local response normalization (Lrn).

H7. The method of H1, where the fractal instructions include a linear algebm category, and the linear algebra category includes following local instructions: matrix multiplication (MatMul) and Euclidean distance (EuclidianID).

H8. The method of H1, where the fractal instructions include a sorting category, and the sorting category includes a local instruction of SortID.

H9. The method of H1, where the fractal instructions include a count category, and the count category includes a local instruction of CountID.

H10. The method of H1, where the fractal instructions include a reduction category, and the reduction category includes following local instructions: binary element pointing (AddID, SubID, MulID), unary element pointing (ActID), horizontal (HSumID, HProdID), and merge (MergeID).

H11. A fractal calculating device, comprising a plurality of calculation units with a same structure, where each layer of calculation units include: a decoding controller configured to divide the instruction into a plurality of fractal instructions, divide the input data into a plurality of pieces of fractal data, where each fractal data corresponds to a fractal instruction; a local memory configured to provide a plurality of local instructions of a fractal reconfigurable instruction set; a decoder configured to decompose each fractal instruction into an ordered set, where the ordered set is formed by sequentially arranging at least one of the plurality of local instructions: a fractal functional unit configured to execute the local instructions in the ordered set of corresponding fractal instructions on the fractal data to generate intermediate data; and a local functional unit configured to reduce the intermediate data to complete the neural network calculations.

I1. A fractal calculating device for executing specific operations according to instructions, comprising a plurality of middle layer of calculation units, where each calculation unit in the middle layer includes: a controller configured to decompose the instruction into a plurality of fractal instructions, where each fractal instruction performs a specific operation, a plurality of fractal functional units, where each fractal functional unit sends one of the plurality of fractal instructions respectively to a middle-layer calculation unit of a next layer, a leaf calculation unit including a controller, where the leaf calculation unit is configured to decompose the fractal instructions into local instructions: and a functional unit configured to execute the local instructions.

I2. The fractal calculating device of I1, where the controller of the middle-layer calculation units includes a decoder, and the decoder includes: a parallel decomposition stack for temporarily storing a lower layer of instructions: a serial decomposition stack for temporarily storing the instructions; and a decoding controller connected to the serial decomposition stack and the parallel decomposition stack; where when the decoding controller is electrically connected to the parallel decomposition stack, the decoding controller fetches the lower layer of instructions from the parallel decomposition stack and decomposes the instructions into fractal instructions; and when the decoding controller is electrically connected to the serial decomposition stack, the decoding controller fetches the instruction from the serial decomposition stack and decomposes the instructions into serial sub-instructions.

I3. The fractal calculating device of I2, where the decoder further includes: a multiplexer connected to the parallel decomposition stack and the serial decomposition stack for selecting one of the instruction and the lower layer of instructions and input the selected instruction to the decoding controller.

I4. The fractal calculating device of I3, where the priority that the parallel decomposition stack is electrically connected to the decoding controller is higher than the priority that the serial decomposition stack is electrically connected to the decoding controller.

I5. The fractal calculating device of I2, where the decoder further includes:
a demultiplexer connected to the decoding controller, where, when the decoding controller is electrically connected to the parallel decomposition stack, the decoding controller is connected to the plurality of fractal functional units.

I6. The fractal calculating device of I5, where the controller of the middle layer of calculation units further includes a sub-instruction queue, when the decoding controller is electrically connected to the serial decomposition stack, the decoding controller sends the serial sub-instructions to the sub-instruction queue.

I8. The fractal calculating device of I6, where the controller of the middle layer of calculation units further includes a down-layer decoder for sequentially obtaining a plurality of serial sub-instructions from the sub-instruction queue to generate a lower layer of instructions.

I8. The fractal calculating device of I2, where the specific operation is to perform calculations on data, and the decoding controller decomposes the data according to a pivot value.

I9. The fractal calculating device of I8, where the data is in N dimensions, and the decoding controller provides N decomposition methods and selects to decompose according to the i-th dimension, where N and i are positive integers, and i is not greater than N.

I10. The fractal calculating device of I9, where the pivot value is between a maximum value and a minimum value of the i dimension, and the decoding controller divides the data into two pieces of data based on the pivot value.

I11. The fractal calculating device of I10, where the pivot value is a median value between the minimum value and the maximum value.

I12. The fractal calculating device of I10, where the pivot value is determined according to the calculation power of the plurality of fractal functional units.

I13. The fractal calculating device of I10, where the pivot value is randomly generated.

I14. The fractal calculating device of I8, where the data is input data or weight data.

I15. The fractal calculating device of I1, where the local instructions include display tensor movement (tmove).

I16. The fractal calculating device of I1, where the local instructions include one of element-directed nonlinear transformation (veltw), vector addition (vadd), scalar addition (sadd), mixed addition (vsadd), horizontal maximization (hmax), and matrix multiplication (mmul).

I17. The fractal calculating device of I1, where the local instructions include one of exclusive OR (vxor, sxor) and greater than comparison (vgt, sgt).

I18. The fractal calculating device of I1, where the local instructions include one of a randomly generated vector (vrng), a category count (vpopcnt), and a combined ordinal sequence (vmerge).

I19. The fractal calculating device of I1, where the fractal instructions include one of convolution (Cv2D. Cv3D), pooling (Max2D, Min2D. Avg2D), and local response normalization (Lm).

I20. The fractal calculating device of I1, where the fractal instructions include one of matrix multiplication (MatMul) and Euclidean distance (EuclidianID).

I21. The fractal calculating device of I1, where the fractal instructions include Sort ID.

I22. The fractal calculating device of I1, where the fractal instructions include CountID.

I23. The fractal calculating device of I1, where the fractal instructions include one of binary element pointing (AddID, SubID, MulID), unary element pointing (ActID), horizontal (HSumID, HProdID), and merge (MergeID).

I24. An integrated circuit device comprising the fractal calculating device of any one of I1-I23.

I25. A board card comprising the integrated circuit device of I24.

The embodiments of the present disclosure have been described in detail above. Specific embodiments have been used in the specification to explain the principles and implementation manners of the present disclosure. The descriptions of the above embodiments are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

What is claimed is:

1. A fractal calculating device, comprising a plurality of layers of calculation units, wherein each layer of calculation units includes:
a serial decomposing unit configured to receive an upper layer of fractal instruction from an upper layer of calculation units and decompose the upper layer of fractal instruction into a plurality of serial sub-instructions;
an instruction decoding unit configured to decode the plurality of serial sub-instructions into local fractal instructions according to hardware resources of the calculation units; and
an operation execution unit configured to issue the local fractal instructions to a lower layer of calculation units to generate a calculation result,
wherein the serial decomposition unit includes:
an instruction queue configured to temporarily store the upper layer of fractal instruction;
a serial decomposer configured to obtain the upper layer of fractal instruction from the instruction queue and decompose the fractal instruction into a plurality of serial sub-instructions; and
a sub-instruction queue configured to temporarily store the plurality of serial sub-instructions,
wherein the instruction decoding unit includes:
a down-layer decoder configured to sequentially obtain a plurality of serial sub-instructions from the sub-instruction queue to generate a lower layer of instructions; and
a parallel decomposer configured to decompose the lower layer of instructions into local fractal instructions in parallel.

2. The fractal calculating device of claim 1, wherein the operation execution unit includes a plurality of fractal functional units configured to execute an issued task.

3. The fractal calculating device of claim 2, wherein each layer of calculation units also include a local memory, and the hardware resources include one of the capacity limitation of the local memory, the ability of the serial decomposer to decompose the upper layer of fractal instructions, the calculation ability of the lower layer of calculation units, and the number of the fractal functional units.

4. The fractal calculating device of claim 3, wherein each layer of calculation units also include a data loading unit which includes a DMA (direct memory access) controller; the down-layer decoder generates a direct memory access instruction pointing to the local memory; and the DMA exchanges data between the local memory and an upper layer of memory according to the direct memory access instruction.

5. The fractal calculating device of claim 4, wherein the data loading unit includes a DMA configured to send the data stored in the local memory to the plurality of fractal functional units to execute the issued task.

6. The fractal calculating device of claim 1, wherein the instruction decoding unit includes a reduction controller configured to decode the lower layer of instructions into local reduction instructions; each layer of calculation units also include an operation reduction unit which includes a local functional unit, where the operation reduction unit is configured to reduce the calculation result according to the local reduction instructions.

7. An integrated circuit device comprising the fractal calculating device of claim 1.

8. A board card comprising the integrated circuit device of claim 7.

9. A fractal calculating method, comprising:
in response to an upper layer of fractal instruction from an upper layer of calculation units, decomposing the upper layer of fractal instruction into a plurality of serial sub-instructions;

decoding the plurality of serial sub-instructions into local fractal instructions according to hardware resources of the calculation units; and issuing the local fractal instructions to a lower layer of calculation units to generate a calculation result, wherein the decomposing the upper layer of fractal instruction into the plurality of serial sub-instructions includes:

temporarily storing the upper layer of fractal instruction;

obtaining the upper layer of fractal instruction from the instruction queue and decompose the fractal instruction into a plurality of serial sub-instructions; and temporarily storing the plurality of serial sub-instructions, wherein decoding the plurality of serial sub-instructions into local fractal instructions according to hardware resources of the calculation units includes:

sequentially obtaining a plurality of serial sub-instructions from the sub-instruction queue to generate a lower layer of instructions; and decomposing the lower layer of instructions into local fractal instructions in parallel.

10. The fractal calculating method of claim 9, wherein the hardware resources include one of the capacity limitation of the local memory, the ability to decompose the upper layer of fractal instruction, and the calculation ability of the lower layer of calculation units.

* * * * *